US012598547B2

(12) United States Patent
Qiao et al.

(10) Patent No.: US 12,598,547 B2
(45) Date of Patent: **\*Apr. 7, 2026**

---

(54) SUPPORT FOR L2TP TUNNELING

(71) Applicant: Ofinno, LLC, Reston, VA (US)

(72) Inventors: Weihua Qiao, Herndon, VA (US);
Esmael Hejazi Dinan, McLean, VA
(US); Kyungmin Park, Vienna, VA
(US); Peyman Talebi Fard, Vienna, VA
(US); Jinsook Ryu, Oakton, VA (US);
Taehun Kim, Fairfax, VA (US)

(73) Assignee: Ofinno, LLC, Reston, VA (US)

( * ) Notice: Subject to any disclaimer, the term of this
patent is extended or adjusted under 35
U.S.C. 154(b) by 5 days.

This patent is subject to a terminal dis-
claimer.

(21) Appl. No.: 18/734,607

(22) Filed: Jun. 5, 2024

(65) Prior Publication Data

US 2024/0323823 A1 Sep. 26, 2024

Related U.S. Application Data

(63) Continuation of application No. 17/962,263, filed on
Oct. 7, 2022, now Pat. No. 12,010,610, which is a
continuation of application No.
PCT/US2021/065400, filed on Dec. 28, 2021.

(60) Provisional application No. 63/131,402, filed on Dec.
29, 2020.

(51) Int. Cl.
*H04W 48/16* (2009.01)
*H04W 76/12* (2018.01)

(52) U.S. Cl.
CPC ........... *H04W 48/16* (2013.01); *H04W 76/12*
(2018.02)

(58) Field of Classification Search
CPC .... H04W 48/16; H04W 76/12; H04W 84/042
USPC .................................................. 370/329, 328
See application file for complete search history.

(56) References Cited

U.S. PATENT DOCUMENTS

| | | | |
|---|---|---|---|
| 11,343,653 B2 | 5/2022 | Talebi Fard et al. | |
| 11,356,513 B2 | 6/2022 | Dodd-Noble et al. | |
| 11,470,657 B2 | 10/2022 | Youn et al. | |
| 2019/0306251 A1 | 10/2019 | Talebi Fard et al. | |
| 2019/0313468 A1 | 10/2019 | Talebi Fard et al. | |

(Continued)

FOREIGN PATENT DOCUMENTS

| | | |
|---|---|---|
| CN | 102111326 B | 6/2014 |
| WO | 2020/093790 A1 | 5/2020 |

(Continued)

OTHER PUBLICATIONS

3GPP TS 23.501 V16.7.0 (Dec. 2020); Technical Specification; 3rd
Generation Partnership Project; Technical Specification Group Ser-
vices and System Aspects; System architecture for the 5G System
(5GS); Stage 2; (Release 16).

(Continued)

*Primary Examiner* — Chuck Huynh
(74) *Attorney, Agent, or Firm* — Alex S. Osterlind;
Kavon Nasabzadeh; Jacob L. Mangan

(57) ABSTRACT

A network repository function (NRF) receives, from a
session management function (SMF), a discovery request
for at least one user plane function (UPF) that supports a
layer 2 tunneling protocol (L2TP) tunnel. The NRF deter-
mines, in response to the discovery request, a first UPF that
supports the L2TP tunnel. The NRF transmits, to the SMF,
a discovery response comprising an identity of the first UPF
that supports the L2TP tunnel.

20 Claims, 25 Drawing Sheets

(56) References Cited

U.S. PATENT DOCUMENTS

| | | | |
|---|---|---|---|
| 2020/0228605 A1 | 7/2020 | Dodd-Noble et al. | |
| 2021/0029628 A1 | 1/2021 | Kim et al. | |
| 2021/0144790 A1* | 5/2021 | Faccin | H04W 76/18 |
| 2022/0264690 A1 | 8/2022 | Zhu et al. | |
| 2022/0321475 A1 | 10/2022 | Thiebaut et al. | |

FOREIGN PATENT DOCUMENTS

| | | | |
|---|---|---|---|
| WO | 2020/253736 A1 | 12/2020 | |
| WO | 2022/068219 A1 | 4/2022 | |
| WO | WO-2022139470 A1 * | 6/2022 | H04W 4/06 |

OTHER PUBLICATIONS

3GPP TS 23.502 V16.7.0 (Dec. 2020); Technical Specification; 3rd Generation Partnership Project; Technical Specification Group Services and System Aspects; Procedures for the 5G System (5GS); Stage 2; (Release 16).

3GPP TS 23.503 V16.7.0 (Dec. 2020); Technical Specification; 3rd Generation Partnership Project; Technical Specification Group Services and System Aspects; Policy and charging control framework for the 5G System (5GS); Stage 2; (Release 16).

3GPP TS 29.061 V14.3.0 (Mar. 2017); Technical Specification; 3rd Generation Partnership Project; Technical Specification Group Core Network and Terminals; Interworking between the Public Land Mobile Network (PLMN) supporting packet based services and; Packet Data Networks (PDN); (Release 14).

3GPP TS 29.244 V16.6.0 (Dec. 2020); Technical Specification; 3rd Generation Partnership Project; Technical Specification Group Core Network and Terminals; Interface between the Control Plane and the User Plane Nodes; Stage 3; (Release 16).

3GPP TS 29.510 V17.0.0 (Dec. 2020); Technical Specification; 3rd Generation Partnership Project; Technical Specification Group Core Network and Terminals; 5G System; Network Function Repository Services; Stage 3; (Release 17).

C4-192470; was C4-192360; 3GPP TSG-CT WG4 Meeting #91; Reno, US; May 13-17, 2019; CR-Form-v12.0; Change Request; 29.510 CR 0154; rev 5; Current version: 15.3.0.

C4-205789; was C4-205692; 3GPP TSG-CT WG4 Meeting #101e; E-Meeting, Nov. 3-13, 2020; CR-Form-v12.0; Change Request; 29.510 CR 0407; rev 3; Current version: 16.5.0.

3GPP TS 29.561 V16.3.0 (Mar. 2020); Technical Specification; 3rd Generation Partnership Project; Technical Specification Group Core Network and Terminals; 5G System; Interworking between 5G Network and external Data Networks; Stage 3; (Release 16).

C4-205478; 3GPP TSG-CT WG4 Meeting #101e; E-meeting, Nov. 3, 2020-Nov. 13, 2020; Title: LS on Support of L2TP on SGi/N6 with Control and User Plane Separation; Release: Rel-17; Work Item: BEst Practice of PFCP (BEPoP).

C4-205509; 3GPP TSG-CT WG4 Meeting #101e; E-meeting, Nov. 3, 2020-Nov. 13, 2020; Source: Ericsson, ZTE; Title: KI on UPF Support for L2TP; Spec: 3GPP TR 29.820; Agenda item: 6.1.3; Document for: Agreement.

C4-205791; was C4-205607; 3GPP TSG-CT WG4 Meeting #101e; E-Meeting, Nov. 3-13, 2020; Source: ZTE; Title: Solution for L2TP tunnel setup; Spec: 3GPP TR29.820; Agenda item: 6.1.3; Document for: Approval.

CP-201357; (revision of CP-201076); 3GPP TSG-CT Meeting #88e; E-Meeting, Jun. 29-Jul. 1, 2020; Source: 3GPP TSG CT WG4; Title: New WID on BEst Practice of PFCP; Document for: Approval; Agenda Item: 17.2.

S2-160841; (revision of S2-154454, 255, 768); SA WG2 Meeting #113; Jan. 25-29, 2016, Saint Kitts, KN; CR-Form-v11.1; Change Request; 23.401 CR 2934; rev 6; Current version: 13.5.0.

S2-1911270; (revision of S2-1910599); 3GPP TSG-WG SA2 Meeting #136; Reno, NV, USA, Nov. 18-22, 2019; CR-Form-v12.0; Change Request; 23.501 CR 1710; rev 4; Current version: 16.2.0.

S2-2009331; 3GPP TSG-SA WG2 Meeting #142E; Nov. 16-20, 2020, Electronic, Elbonia; Title: LS Response on Support of L2TP in PFCP; Response to: S2-2008496 / C4-205478; Release: Release-17; Work Item: BEPoP.

L2TP Access Concentrator; P-GW Administration Guide, StarOS Release 21.20; Oct. 8, 2021.

Layer 2 Tunneling Protocol—Wikipedia; Retrieved Dec. 9, 2020; https://en.wikipedia.org/wiki/Layer_2_Tunneling_Protocol.

Townsley et al.; Layer Two Tunneling Protocol "L2TP"; Network Working Group; Request for Comments: 2661; Category: Standards Track; Aug. 1999.

Zorn et al.; RADIUS Attributes for Tunnel Protocol Support; Network Working Group; Request for Comments: 2868; Updates: RFC 2865; Category: Informational; Jun. 2000.

Lau et al.; Layer Two Tunneling Protocol—Version 3 (L2TPv3); Network Working Group; Request for Comments: 3931; Category: Standards Track; Mar. 2005.

TR-456 AGF Functional Requirements; Issue: 01; Technical Report; Jul. 2020; The Broadband Forum.

International Search Report for International Application No. PCT/US2021/065400, mailed Jun. 20, 2022.

S2-1901726; 3GPP TSG-SA WG2 Meeting #131; Santa Cruz, Tenerife, Spain, Feb. 25-Mar. 1, 2019; Change Request; 23.502; CR 0971; rev 4; Current version: 15.4.1.

* cited by examiner

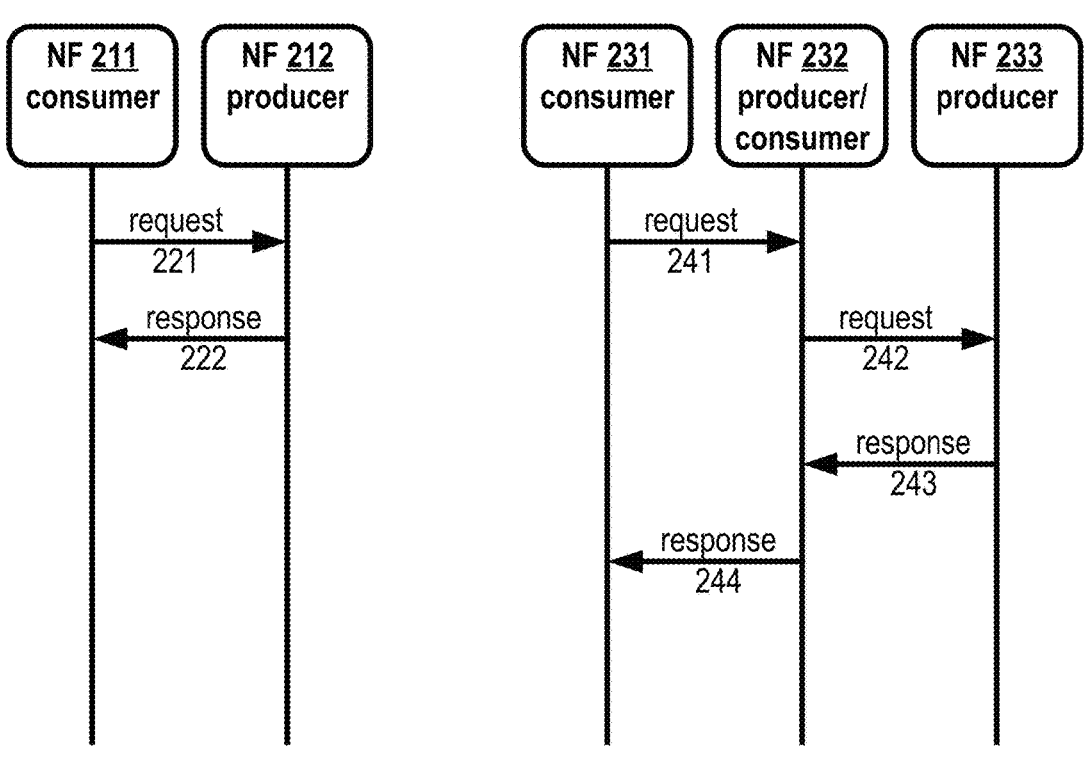
FIG. 2A
FIG. 2B
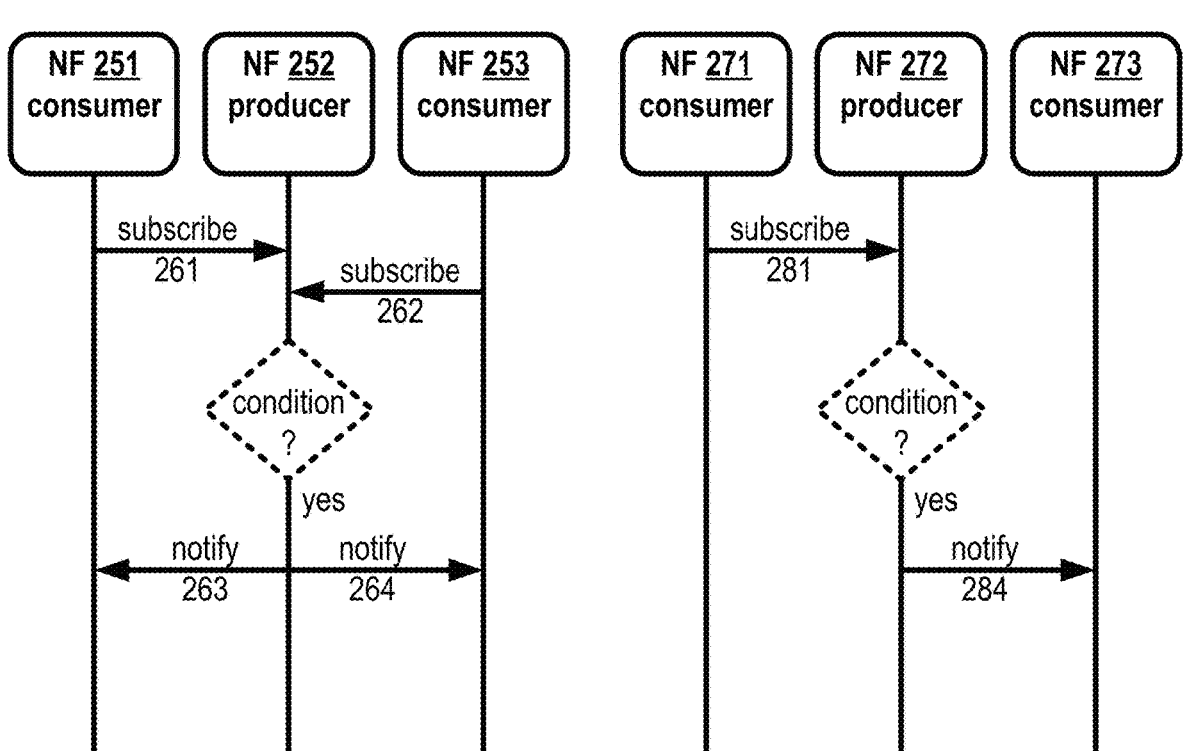
FIG. 2C
FIG. 2D

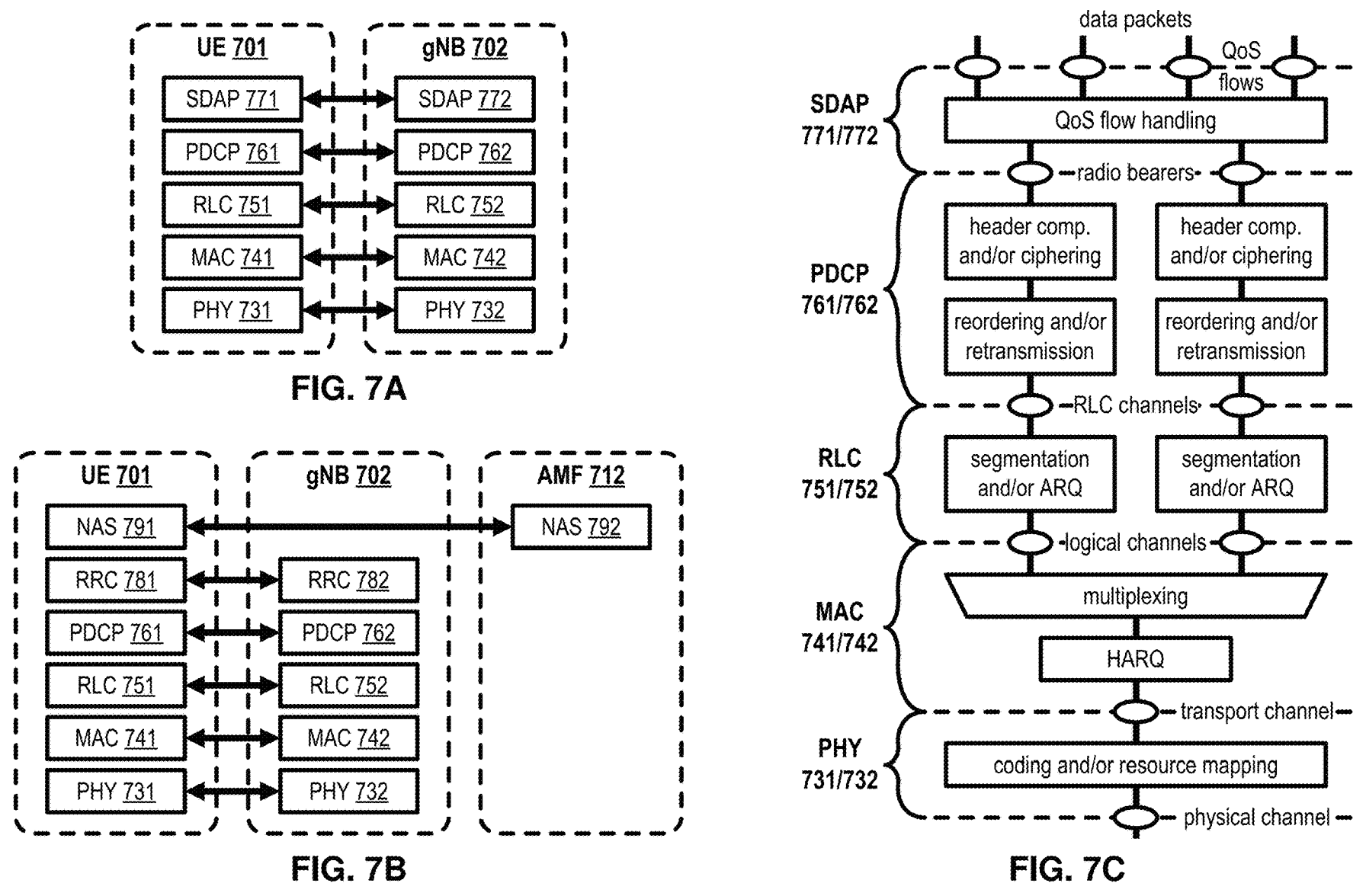

SDAP 771/772: data packets — QoS flows — QoS flow handling — radio bearers

PDCP 761/762: header comp. and/or ciphering — reordering and/or retransmission — header comp. and/or ciphering — reordering and/or retransmission — RLC channels

RLC 751/752: segmentation and/or ARQ — segmentation and/or ARQ — logical channels

MAC 741/742: multiplexing — HARQ — transport channel

PHY 731/732: coding and/or resource mapping — physical channel

FIG. 7C

FIG. 7A gNB 702: SDAP 772 | PDCP 762 | RLC 752 | MAC 742 | PHY 732

UE 701: SDAP 771 | PDCP 761 | RLC 751 | MAC 741 | PHY 731

FIG. 7B

AMF 712: NAS 792 gNB 702: RRC 782 | PDCP 762 | RLC 752 | MAC 742 | PHY 732

UE 701: NAS 791 | RRC 781 | PDCP 761 | RLC 751 | MAC 741 | PHY 731

| Attribute Name | Data type | P | Cardinality | Description |
|---|---|---|---|---|
| sNssaiUpfinfoList | array(SnssaiUpfinfoItem) | M | 1...N | List of parameters supported by the UPF per S-NSSAI |
| smfServingArea | array(string) | O | 1...N | The SMG service area(s) the UPF can serve. If not provided, the UPF can serve any SMF service area. |
| interfaceUpfinfoList | array(InterfaceUpfinfoItem) | O | 1...N | List of User Plane interfaces configured on the UPF. When this IE is provided in the NF Discovery response, the NF service consumer (e.g., SMF) may use this information for UPF selection. |
| iwkEpsInd | boolean | O | 0...1 | Indicates whether interworking with EPS is supported by the UPF. True: Supported. False (default): Not Supported |
| pduSessionTypes | array(PduSessionType) | O | 1...N | List of PDU session type(s) supported by the UPF. The absence of this attribute indicates that the UPF can be selected for any PDU session type. |
| tunnelCapability | array(TunnelType) | O | 1...N | List of tunnel type(s) supported by the UPF, e.g., L2TPv2, L2TPv3, GRE, IP-in-IP, GTP. |
| establishedTunnelInfo rmation | array(EstablishedTun nel) | O | 1...N | List of established tunnel information |

FIG. 21

First CPF

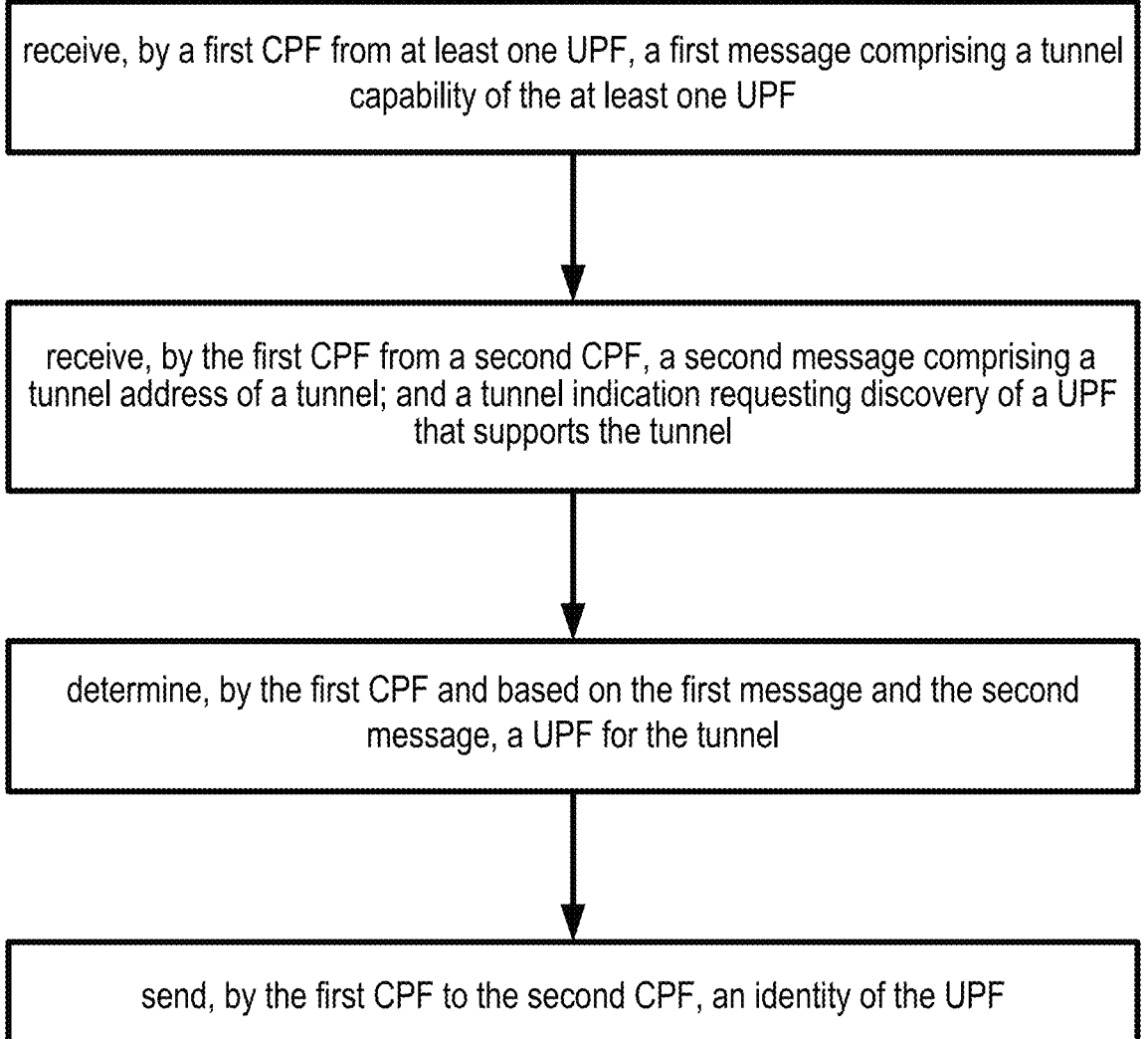

receive, by a first CPF from at least one UPF, a first message comprising a tunnel capability of the at least one UPF receive, by the first CPF from a second CPF, a second message comprising a tunnel address of a tunnel; and a tunnel indication requesting discovery of a UPF that supports the tunnel determine, by the first CPF and based on the first message and the second message, a UPF for the tunnel send, by the first CPF to the second CPF, an identity of the UPF

FIG. 22

SUPPORT FOR L2TP TUNNELING

CROSS-REFERENCE TO RELATED APPLICATIONS

This application is a continuation of U.S. patent application Ser. No. 17/962,263, filed Oct. 7, 2022, which is a continuation of International Application No. PCT/US2021/065400, filed Dec. 28, 2021, which claims the benefit of U.S. Provisional Application No. 63/131,402, filed Dec. 29, 2020, all of which are hereby incorporated by reference in their entireties.

BRIEF DESCRIPTION OF THE DRAWINGS

Examples of several of the various embodiments of the present disclosure are described herein with reference to the drawings.

FIG. 2A, FIG. 2B, FIG. 2C, and FIG. 2D illustrate various examples of a framework for a service-based architecture within a core network.

FIG. 7A, FIG. 7B, and FIG. 7C illustrate a user plane protocol stack, a control plane protocol stack, and services provided between protocol layers of the user plane protocol stack.

FIG. 14A, FIG. 14B, FIG. 14C, and FIG. 14D illustrate various examples of physical core network deployments, each having one or more network functions or portions thereof.

FIG. 21 is an example diagram depicting a UPF information parameter as per an aspect of an embodiment of the present disclosure.

FIG. 22 is an example diagram depicting the procedures of a first control plane function as per an aspect of an embodiment of the present disclosure.

DETAILED DESCRIPTION

Figures 1A, 1B:
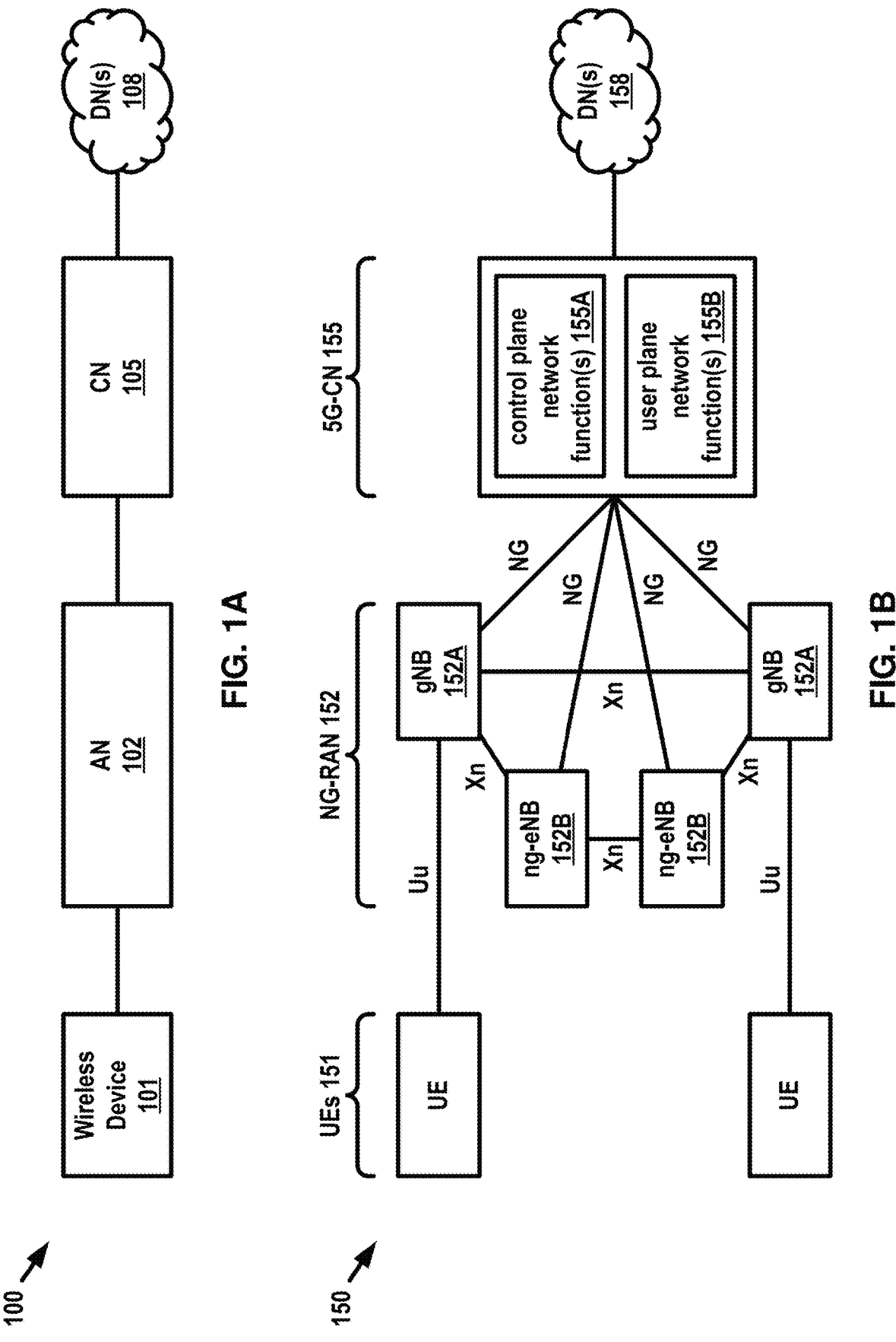
FIG. 1A and FIG. 1B illustrate example communication networks including an access network and a core network.

In the present disclosure, various embodiments are presented as examples of how the disclosed techniques may be implemented and/or how the disclosed techniques may be practiced in environments and scenarios. It will be apparent to persons skilled in the relevant art that various changes in form and detail can be made therein without departing from the scope. In fact, after reading the description, it will be apparent to one skilled in the relevant art how to implement alternative embodiments. The present embodiments should not be limited by any of the described exemplary embodiments. The embodiments of the present disclosure will be described with reference to the accompanying drawings. Limitations, features, and/or elements from the disclosed example embodiments may be combined to create further embodiments within the scope of the disclosure. Any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have one or more specific capabilities. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, those wireless devices or base stations may perform based on older releases of LTE or 5G technology.

In this disclosure, "a" and "an" and similar phrases refer to a single instance of a particular element, but should not be interpreted to exclude other instances of that element. For example, a bicycle with two wheels may be described as having "a wheel". Any term that ends with the suffix "(s)" is to be interpreted as "at least one" and/or "one or more." In this disclosure, the term "may" is to be interpreted as "may, for example." In other words, the term "may" is indicative that the phrase following the term "may" is an example of one of a multitude of suitable possibilities that may, or may not, be employed by one or more of the various embodiments. The terms "comprises" and "consists of", as used herein, enumerate one or more components of the element being described. The term "comprises" is interchangeable with "includes" and does not exclude unenumerated components from being included in the element being described. By contrast, "consists of" provides a complete enumeration of the one or more components of the element being described.

The phrases "based on", "in response to", "depending on", "employing", "using", and similar phrases indicate the presence and/or influence of a particular factor and/or condition on an event and/or action, but do not exclude unenumerated factors and/or conditions from also being present and/or influencing the event and/or action. For example, if action X is performed "based on" condition Y, this is to be interpreted as the action being performed "based at least on" condition Y. For example, if the performance of action X is performed when conditions Y and Z are both satisfied, then the performing of action X may be described as being "based on Y".

The term "configured" may relate to the capacity of a device whether the device is in an operational or non-operational state. Configured may refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, a parameter may comprise one or more information objects, and an information object may comprise one or more other objects. For example, if parameter J comprises parameter K, and parameter K comprises parameter L, and parameter L comprises parameter M, then J comprises L, and J comprises M. A parameter may be referred to as a field or information element. In an example embodiment, when one or more messages comprise a plurality of parameters, it implies that a parameter in the plurality of parameters is in at least one of the one or more messages, but does not have to be in each of the one or more messages.

This disclosure may refer to possible combinations of enumerated elements. For the sake of brevity and legibility, the present disclosure does not explicitly recite each and every permutation that may be obtained by choosing from a set of optional features. The present disclosure is to be interpreted as explicitly disclosing all such permutations. For example, the seven possible combinations of enumerated elements A, B, C consist of: (1) "A"; (2) "B"; (3) "C"; (4) "A and B"; (5) "A and C"; (6) "B and C"; and (7) "A, B, and C". For the sake of brevity and legibility, these seven possible combinations may be described using any of the following interchangeable formulations: "at least one of A, B, and C"; "at least one of A, B, or C"; "one or more of A, B, and C"; "one or more of A, B, or C"; "A, B, and/or C". It will be understood that impossible combinations are excluded. For example, "X and/or not-X" should be interpreted as "X or not-X". It will be further understood that these formulations may describe alternative phrasings of overlapping and/or synonymous concepts, for example, "identifier, identification, and/or ID number".

This disclosure may refer to sets and/or subsets. As an example, set X may be a set of elements comprising one or more elements. If every element of X is also an element of Y, then X may be referred to as a subset of Y. In this disclosure, only non-empty sets and subsets are considered. For example, if Y consists of the elements Y1, Y2, and Y3, then the possible subsets of Y are {Y1, Y2, Y3}, {Y1, Y2}, {Y1, Y3}, {Y2, Y3}, {Y1}, {Y2}, and {Y3}.

FIG. 1A illustrates an example of a communication network 100 in which embodiments of the present disclosure may be implemented. The communication network 100 may comprise, for example, a public land mobile network (PLMN) run by a network operator. As illustrated in FIG. 1A, the communication network 100 includes a wireless device 101, an access network (AN) 102, a core network (CN) 105, and one or more data network (DNs) 108.

The wireless device 101 may communicate with DNs 108 via AN 102 and CN 105. In the present disclosure, the term wireless device may refer to and encompass any mobile device or fixed (non-mobile) device for which wireless communication is needed or usable. For example, a wireless device may be a telephone, smart phone, tablet, computer, laptop, sensor, meter, wearable device, Internet of Things (IoT) device, vehicle road side unit (RSU), relay node, automobile, unmanned aerial vehicle, urban air mobility, and/or any combination thereof. The term wireless device encompasses other terminology, including user equipment (UE), user terminal (UT), access terminal (AT), mobile station, handset, wireless transmit and receive unit (WTRU), and/or wireless communication device.

The AN 102 may connect wireless device 101 to CN 105 in any suitable manner. The communication direction from the AN 102 to the wireless device 101 is known as the downlink and the communication direction from the wireless device 101 to AN 102 is known as the uplink. Downlink transmissions may be separated from uplink transmissions using frequency division duplexing (FDD), time-division duplexing (TDD), and/or some combination of the two duplexing techniques. The AN 102 may connect to wireless device 101 through radio communications over an air interface. An access network that at least partially operates over the air interface may be referred to as a radio access network (RAN). The CN 105 may set up one or more end-to-end connection between wireless device 101 and the one or more DNs 108. The CN 105 may authenticate wireless device 101 and provide charging functionality.

In the present disclosure, the term base station may refer to and encompass any element of AN 102 that facilitates communication between wireless device 101 and AN 102. Access networks and base stations have many different names and implementations. The base station may be a terrestrial base station fixed to the earth. The base station may be a mobile base station with a moving coverage area. The base station may be in space, for example, on board a satellite. For example, WiFi and other standards may use the term access point. As another example, the Third-Generation Partnership Project (3GPP) has produced specifications for three generations of mobile networks, each of which uses different terminology. Third Generation (3G) and/or Universal Mobile Telecommunications System (UMTS) standards may use the term Node B. 4G, Long Term Evolution (LTE), and/or Evolved Universal Terrestrial Radio Access (E-UTRA) standards may use the term Evolved Node B (eNB). 5G and/or New Radio (NR) standards may describe AN 102 as a next-generation radio access network (NG-RAN) and may refer to base stations as Next Generation eNB (ng-eNB) and/or Generation Node B (gNB). Future standards (for example, 6G, 7G, 8G) may use new terminology to refer to the elements which implement the methods described in the present disclosure (e.g., wireless devices, base stations, ANs, CNs, and/or components thereof). A base station may be implemented as a repeater or relay node used to extend the coverage area of a donor node. A repeater node may amplify and rebroadcast a radio signal received from a donor node. A relay node may perform the same/similar functions as a repeater node but may decode the radio signal received from the donor node to remove noise before amplifying and rebroadcasting the radio signal.

The AN 102 may include one or more base stations, each having one or more coverage areas. The geographical size and/or extent of a coverage area may be defined in terms of a range at which a receiver of AN 102 can successfully receive transmissions from a transmitter (e.g., wireless device 101) operating within the coverage area (and/or vice-versa). The coverage areas may be referred to as sectors or cells (although in some contexts, the term cell refers to the carrier frequency used in a particular coverage area, rather than the coverage area itself). Base stations with large coverage areas may be referred to as macrocell base stations. Other base stations cover smaller areas, for example, to provide coverage in areas with weak macrocell coverage, or to provide additional coverage in areas with high traffic (sometimes referred to as hotspots). Examples of small cell base stations include, in order of decreasing coverage area, microcell base stations, picocell base stations, and femtocell base stations or home base stations. Together, the coverage areas of the base stations may provide radio coverage to wireless device 101 over a wide geographic area to support wireless device mobility.

A base station may include one or more sets of antennas for communicating with the wireless device 101 over the air interface. Each set of antennas may be separately controlled by the base station. Each set of antennas may have a corresponding coverage area. As an example, a base station may include three sets of antennas to respectively control three coverage areas on three different sides of the base station. The entirety of the base station (and its corresponding antennas) may be deployed at a single location. Alternatively, a controller at a central location may control one or more sets of antennas at one or more distributed locations. The controller may be, for example, a baseband processing unit that is part of a centralized or cloud RAN architecture. The baseband processing unit may be either centralized in a pool of baseband processing units or virtualized. A set of antennas at a distributed location may be referred to as a remote radio head (RRH).

FIG. 1B illustrates another example communication network 150 in which embodiments of the present disclosure may be implemented. The communication network 150 may comprise, for example, a PLMN run by a network operator. As illustrated in FIG. 1B, communication network 150 includes UEs 151, a next generation radio access network (NG-RAN) 152, a 5G core network (5G-CN) 155, and one or more DNs 158. The NG-RAN 152 includes one or more base stations, illustrated as generation node Bs (gNBs) 152A and next generation evolved Node Bs (ng eNBs) 152B. The 5G-CN 155 includes one or more network functions (NFs), including control plane functions 155A and user plane functions 155B. The one or more DNs 158 may comprise public DNS (e.g., the Internet), private DNS, and/or intra-operator DNs. Relative to corresponding components illustrated in FIG. 1A, these components may represent specific implementations and/or terminology.

The base stations of the NG-RAN 152 may be connected to the UEs 151 via Uu interfaces. The base stations of the NG-RAN 152 may be connected to each other via Xn interfaces. The base stations of the NG-RAN 152 may be connected to 5G CN 155 via NG interfaces. The Uu interface may include an air interface. The NG and Xn interfaces may include an air interface, or may consist of direct physical connections and/or indirect connections over an underlying transport network (e.g., an internet protocol (IP) transport network).

Each of the Uu, Xn, and NG interfaces may be associated with a protocol stack. The protocol stacks may include a user plane (UP) and a control plane (CP). Generally, user plane data may include data pertaining to users of the UEs 151, for example, internet content downloaded via a web browser application, sensor data uploaded via a tracking application, or email data communicated to or from an email server. Control plane data, by contrast, may comprise signaling and messages that facilitate packaging and routing of user plane data so that it can be exchanged with the DN(s). The NG interface, for example, may be divided into an NG user plane interface (NG-U) and an NG control plane interface (NG-C). The NG-U interface may provide delivery of user plane data between the base stations and the one or more user plane network functions 155B. The NG-C interface may be used for control signaling between the base stations and the one or more control plane network functions 155A. The NG-C interface may provide, for example, NG interface management, UE context management, UE mobility management, transport of NAS messages, paging, PDU session management, and configuration transfer and/or warning message transmission. In some cases, the NG-C interface may support transmission of user data (for example, a small data transmission for an IoT device).

One or more of the base stations of the NG-RAN 152 may be split into a central unit (CU) and one or more distributed units (DUs). A CU may be coupled to one or more DUs via an F1 interface. The CU may handle one or more upper layers in the protocol stack and the DU may handle one or more lower layers in the protocol stack. For example, the CU may handle RRC, PDCP, and SDAP, and the DU may handle RLC, MAC, and PHY. The one or more DUs may be in geographically diverse locations relative to the CU and/or each other. Accordingly, the CU/DU split architecture may permit increased coverage and/or better coordination.

The gNBs 152A and ng-eNBs 152B may provide different user plane and control plane protocol termination towards the UEs 151. For example, the gNB 154A may provide new radio (NR) protocol terminations over a Uu interface associated with a first protocol stack. The ng-eNBs 152B may provide Evolved UMTS Terrestrial Radio Access (E-UTRA) protocol terminations over a Uu interface associated with a second protocol stack.

The 5G-CN 155 may authenticate UEs 151, set up end-to-end connections between UEs 151 and the one or more DNs 158, and provide charging functionality. The 5G-CN 155 may be based on a service-based architecture, in which the NFs making up the 5G-CN 155 offer services to each other and to other elements of the communication network 150 via interfaces. The 5G-CN 155 may include any number of other NFs and any number of instances of each NF.

FIG. 2A, FIG. 2B, FIG. 2C, and FIG. 2D illustrate various examples of a framework for a service-based architecture within a core network. In a service-based architecture, a service may be sought by a service consumer and provided by a service producer. Prior to obtaining a particular service, an NF may determine where such as service can be obtained. To discover a service, the NF may communicate with a network repository function (NRF). As an example, an NF that provides one or more services may register with a network repository function (NRF). The NRF may store data relating to the one or more services that the NF is prepared to provide to other NFs in the service-based architecture. A consumer NF may query the NRF to discover a producer NF (for example, by obtaining from the NRF a list of NF instances that provide a particular service).

In the example of FIG. 2A, an NF 211 (a consumer NF in this example) may send a request 221 to an NF 212 (a producer NF). The request 221 may be a request for a particular service and may be sent based on a discovery that NF 212 is a producer of that service. The request 221 may comprise data relating to NF 211 and/or the requested service. The NF 212 may receive request 221, perform one or more actions associated with the requested service (e.g., retrieving data), and provide a response 221. The one or more actions performed by the NF 212 may be based on request data included in the request 221, data stored by NF 212, and/or data retrieved by NF 212. The response 222 may notify NF 211 that the one or more actions have been completed. The response 222 may comprise response data relating to NF 212, the one or more actions, and/or the requested service.

In the example of FIG. 2B, an NF 231 sends a request 241 to an NF 232. In this example, part of the service produced by NF 232 is to send a request 242 to an NF 233. The NF 233 may perform one or more actions and provide a response 243 to NF 232. Based on response 243, NF 232 may send a response 244 to NF 231. It will be understood from FIG. 2B that a single NF may perform the role of producer of services, consumer of services, or both. A particular NF service may include any number of nested NF services produced by one or more other NFs.

FIG. 2C illustrates examples of subscribe-notify interactions between a consumer NF and a producer NF. In FIG. 2C, an NF 251 sends a subscription 261 to an NF 252. An NF 253 sends a subscription 262 to the NF 252. Two NFs are shown in FIG. 2C for illustrative purposes (to demonstrate that the NF 252 may provide multiple subscription services to different NFs), but it will be understood that a subscribe-notify interaction only requires one subscriber. The NFs 251, 253 may be independent from one another. For example, the NFs 251, 253 may independently discover NF 252 and/or independently determine to subscribe to the service offered by NF 252. In response to receipt of a subscription, the NF 252 may provide a notification to the subscribing NF. For example, NF 252 may send a notification 263 to NF 251 based on subscription 261 and may send a notification 264 to NF 253 based on subscription 262.

As shown in the example illustration of FIG. 2C, the sending of the notifications 263, 264 may be based on a determination that a condition has occurred. For example, the notifications 263, 264 may be based on a determination that a particular event has occurred, a determination that a particular condition is outstanding, and/or a determination that a duration of time associated with the subscription has elapsed (for example, a period associated with a subscription for periodic notifications). As shown in the example illustration of FIG. 2C, NF 252 may send notifications 263, 264 to NFs 251, 253 simultaneously and/or in response to the same condition. However, it will be understood that the NF 252 may provide notifications at different times and/or in response to different notification conditions. In an example, the NF 251 may request a notification when a certain parameter, as measured by the NF 252, exceeds a first threshold, and the NF 252 may request a notification when the parameter exceeds a second threshold different from the first threshold. In an example, a parameter of interest and/or a corresponding threshold may be indicated in the subscriptions 261, 262.

FIG. 2D illustrates another example of a subscribe-notify interaction. In FIG. 2D, an NF 271 sends a subscription 281 to an NF 272. In response to receipt of subscription 281 and/or a determination that a notification condition has occurred, NF 272 may send a notification 284. The notification 284 may be sent to an NF 273. Unlike the example in FIG. 2C (in which a notification is sent to the subscribing NF), FIG. 2D demonstrates that a subscription and its corresponding notification may be associated with different NFs. For example, NF 271 may subscribe to the service provided by NF 272 on behalf of NF 273.

Figure 3:
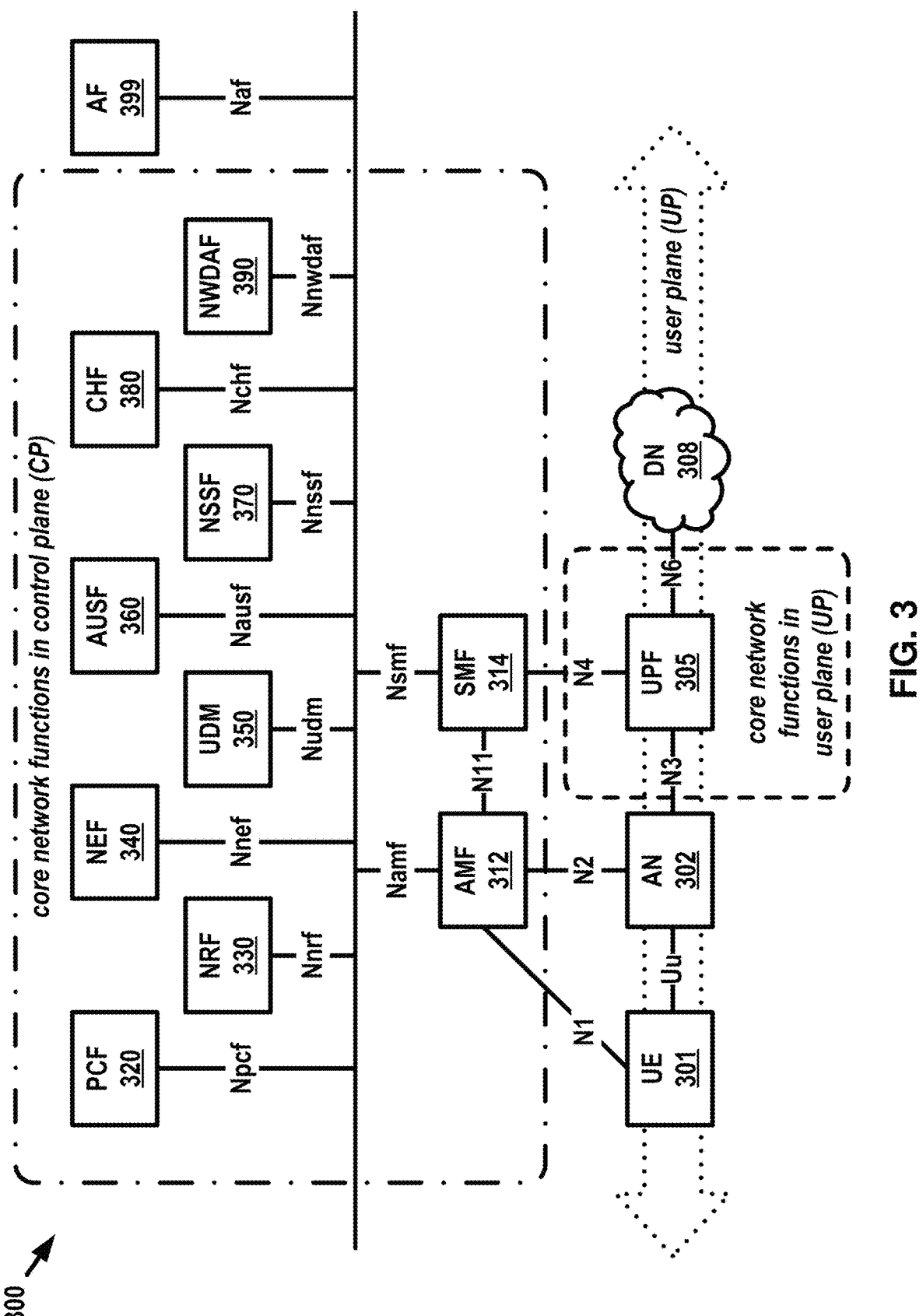
FIG. 3 illustrates an example communication network including core network functions.

FIG. 3 illustrates another example communication network 300 in which embodiments of the present disclosure may be implemented. Communication network 300 includes a user equipment (UE) 301, an access network (AN) 302, and a data network (DN) 308. The remaining elements depicted in FIG. 3 may be included in and/or associated with a core network. Each element of the core network may be referred to as a network function (NF).

The NFs depicted in FIG. 3 include a user plane function (UPF) 305, an access and mobility management function (AMF) 312, a session management function (SMF) 314, a policy control function (PCF) 320, a network repository function (NRF) 330, a network exposure function (NEF) 340, a unified data management (UDM) 350, an authentication server function (AUSF) 360, a network slice selection function (NSSF) 370, a charging function (CHF) 380, a network data analytics function (NWDAF) 390, and an application function (AF) 399. The UPF 305 may be a user-plane core network function, whereas the NFs 312, 314, and 320-390 may be control-plane core network functions. Although not shown in the example of FIG. 3, the core network may include additional instances of any of the NFs depicted and/or one or more different NF types that provide different services. Other examples of NF type include a gateway mobile location center (GMLC), a location management function (LMF), an operations, administration, and maintenance function (OAM), a public warning system (PWS), a short message service function (SMSF), a unified data repository (UDR), and an unstructured data storage function (UDSF).

Each element depicted in FIG. 3 has an interface with at least one other element. The interface may be a logical connection rather than, for example, a direct physical connection. Any interface may be identified using a reference point representation and/or a service-based representation. In a reference point representation, the letter 'N' is followed by a numeral, indicating an interface between two specific elements. For example, as shown in FIG. 3, AN 302 and UPF 305 interface via 'N3', whereas UPF 305 and DN 308 interface via 'N6'. By contrast, in a service-based representation, the letter 'N' is followed by letters. The letters identify an NF that provides services to the core network. For example, PCF 320 may provide services via interface 'Npcf'. The PCF 320 may provide services to any NF in the core network via 'Npcf'. Accordingly, a service-based representation may correspond to a bundle of reference point representations. For example, the Npcf interface between PCF 320 and the core network generally may correspond to an N7 interface between PCF 320 and SMF 314, an N30 interface between PCF 320 and NEF 340, etc.

The UPF 305 may serve as a gateway for user plane traffic between AN 302 and DN 308. The UE 301 may connect to UPF 305 via a Uu interface and an N3 interface (also described as NG-U interface). The UPF 305 may connect to DN 308 via an N6 interface. The UPF 305 may connect to one or more other UPFs (not shown) via an N9 interface. The UE 301 may be configured to receive services through a protocol data unit (PDU) session, which is a logical connection between UE 301 and DN 308. The UPF 305 (or a plurality of UPFs if desired) may be selected by SMF 314 to handle a particular PDU session between UE 301 and DN 308. The SMF 314 may control the functions of UPF 305 with respect to the PDU session. The SMF 314 may connect to UPF 305 via an N4 interface. The UPF 305 may handle any number of PDU sessions associated with any number of UEs (via any number of ANs). For purposes of handling the one or more PDU sessions, UPF 305 may be controlled by any number of SMFs via any number of corresponding N4 interfaces.

The AMF 312 depicted in FIG. 3 may control UE access to the core network. The UE 301 may register with the network via AMF 312. It may be necessary for UE 301 to register prior to establishing a PDU session. The AMF 312 may manage a registration area of UE 301, enabling the network to track the physical location of UE 301 within the network. For a UE in connected mode, AMF 312 may manage UE mobility, for example, handovers from one AN or portion thereof to another. For a UE in idle mode, AMF 312 may perform registration updates and/or page the UE to transition the UE to connected mode.

The AMF 312 may receive, from UE 301, non-access stratum (NAS) messages transmitted in accordance with NAS protocol. NAS messages relate to communications between UE 301 and the core network. Although NAS messages may be relayed to AMF 312 via AN 302, they may be described as communications via the N1 interface. NAS messages may facilitate UE registration and mobility management, for example, by authenticating, identifying, configuring, and/or managing a connection of UE 301. NAS messages may support session management procedures for maintaining user plane connectivity and quality of service (QoS) of a session between UE 301 and DN 309. If the NAS message involves session management, AMF 312 may send the NAS message to SMF 314. NAS messages may be used to transport messages between UE 301 and other components of the core network (e.g., core network components other than AMF 312 and SMF 314). The AMF 312 may act on a particular NAS message itself, or alternatively, forward the NAS message to an appropriate core network function (e.g., SMF 314, etc.)

The SMF 314 depicted in FIG. 3 may establish, modify, and/or release a PDU session based on messaging received UE 301. The SMF 314 may allocate, manage, and/or assign an IP address to UE 301, for example, upon establishment of a PDU session. There may be multiple SMFs in the network, each of which may be associated with a respective group of wireless devices, base stations, and/or UPFs. A UE with multiple PDU sessions may be associated with a different SMF for each PDU session. As noted above, SMF 314 may select one or more UPFs to handle a PDU session and may control the handling of the PDU session by the selected UPF by providing rules for packet handling (PDR, FAR, QER, etc.). Rules relating to QoS and/or charging for a particular PDU session may be obtained from PCF 320 and provided to UPF 305.

The PCF 320 may provide, to other NFs, services relating to policy rules. The PCF 320 may use subscription data and information about network conditions to determine policy rules and then provide the policy rules to a particular NF which may be responsible for enforcement of those rules. Policy rules may relate to policy control for access and mobility, and may be enforced by the AMF. Policy rules may relate to session management, and may be enforced by the SMF 314. Policy rules may be, for example, network-specific, wireless device-specific, session-specific, or data flow-specific.

The NRF 330 may provide service discovery. The NRF 330 may belong to a particular PLMN. The NRF 330 may maintain NF profiles relating to other NFs in the communication network 300. The NF profile may include, for example, an address, PLMN, and/or type of the NF, a slice identifier, a list of the one or more services provided by the NF, and the authorization required to access the services.

The NEF 340 depicted in FIG. 3 may provide an interface to external domains, permitting external domains to selectively access the control plane of the communication network 300. The external domain may comprise, for example, third-party network functions, application functions, etc. The NEF 340 may act as a proxy between external elements and network functions such as AMF 312, SMF 314, PCF 320, UDM 350, etc. As an example, NEF 340 may determine a location or reachability status of UE 301 based on reports from AMF 312, and provide status information to an external element. As an example, an external element may provide, via NEF 340, information that facilitates the setting of parameters for establishment of a PDU session. The NEF 340 may determine which data and capabilities of the control plane are exposed to the external domain. The NEF 340 may provide secure exposure that authenticates and/or authorizes an external entity to which data or capabilities of the communication network 300 are exposed. The NEF 340 may selectively control the exposure such that the internal architecture of the core network is hidden from the external domain.

The UDM 350 may provide data storage for other NFs. The UDM 350 may permit a consolidated view of network information that may be used to ensure that the most relevant information can be made available to different NFs from a single resource. The UDM 350 may store and/or retrieve information from a unified data repository (UDR). For example, UDM 350 may obtain user subscription data relating to UE 301 from the UDR.

The AUSF 360 may support mutual authentication of UE 301 by the core network and authentication of the core network by UE 301. The AUSF 360 may perform key agreement procedures and provide keying material that can be used to improve security.

The NSSF 370 may select one or more network slices to be used by the UE 301. The NSSF 370 may select a slice based on slice selection information. For example, the NSSF 370 may receive Single Network Slice Selection Assistance Information (S-NSSAI) and map the S-NSSAI to a network slice instance identifier (NSI).

The CHF 380 may control billing-related tasks associated with UE 301. For example, UPF 305 may report traffic usage associated with UE 301 to SMF 314. The SMF 314 may collect usage data from UPF 305 and one or more other UPFs. The usage data may indicate how much data is exchanged, what DN the data is exchanged with, a network slice associated with the data, or any other information that may influence billing. The SMF 314 may share the collected usage data with the CHF. The CHF may use the collected usage data to perform billing-related tasks associated with UE 301. The CHF may, depending on the billing status of UE 301, instruct SMF 314 to limit or influence access of UE 301 and/or to provide billing-related notifications to UE 301.

The NWDAF 390 may collect and analyze data from other network functions and offer data analysis services to other network functions. As an example, NWDAF 390 may collect data relating to a load level for a particular network slice instance from UPF 305, AMF 312, and/or SMF 314. Based on the collected data, NWDAF 390 may provide load level data to the PCF 320 and/or NSSF 370, and/or notify the PC 220 and/or NSSF 370 if load level for a slice reaches and/or exceeds a load level threshold.

The AF 399 may be outside the core network, but may interact with the core network to provide information relating to the QoS requirements or traffic routing preferences associated with a particular application. The AF 399 may access the core network based on the exposure constraints imposed by the NEF 340. However, an operator of the core network may consider the AF 399 to be a trusted domain that can access the network directly.

Figure 4A:
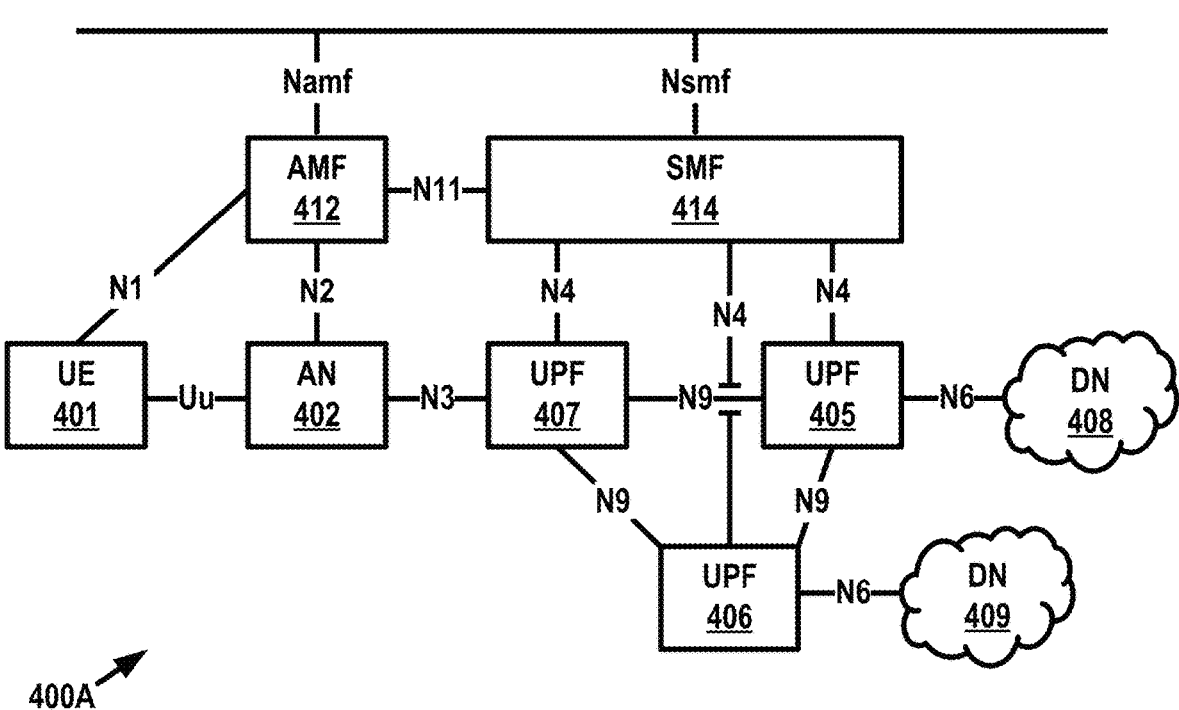
FIG. 4A and FIG. 4B illustrate example of core network architecture with multiple user plane functions and untrusted access.
Figure 4B:
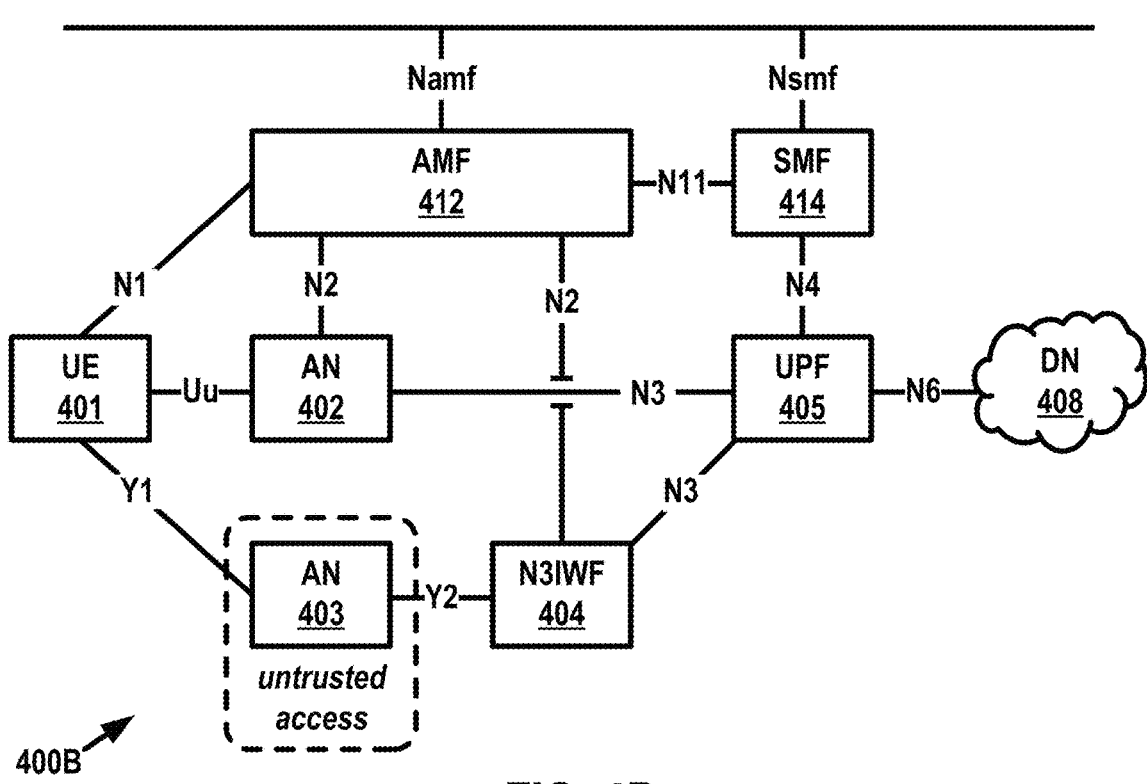
Figure 5:
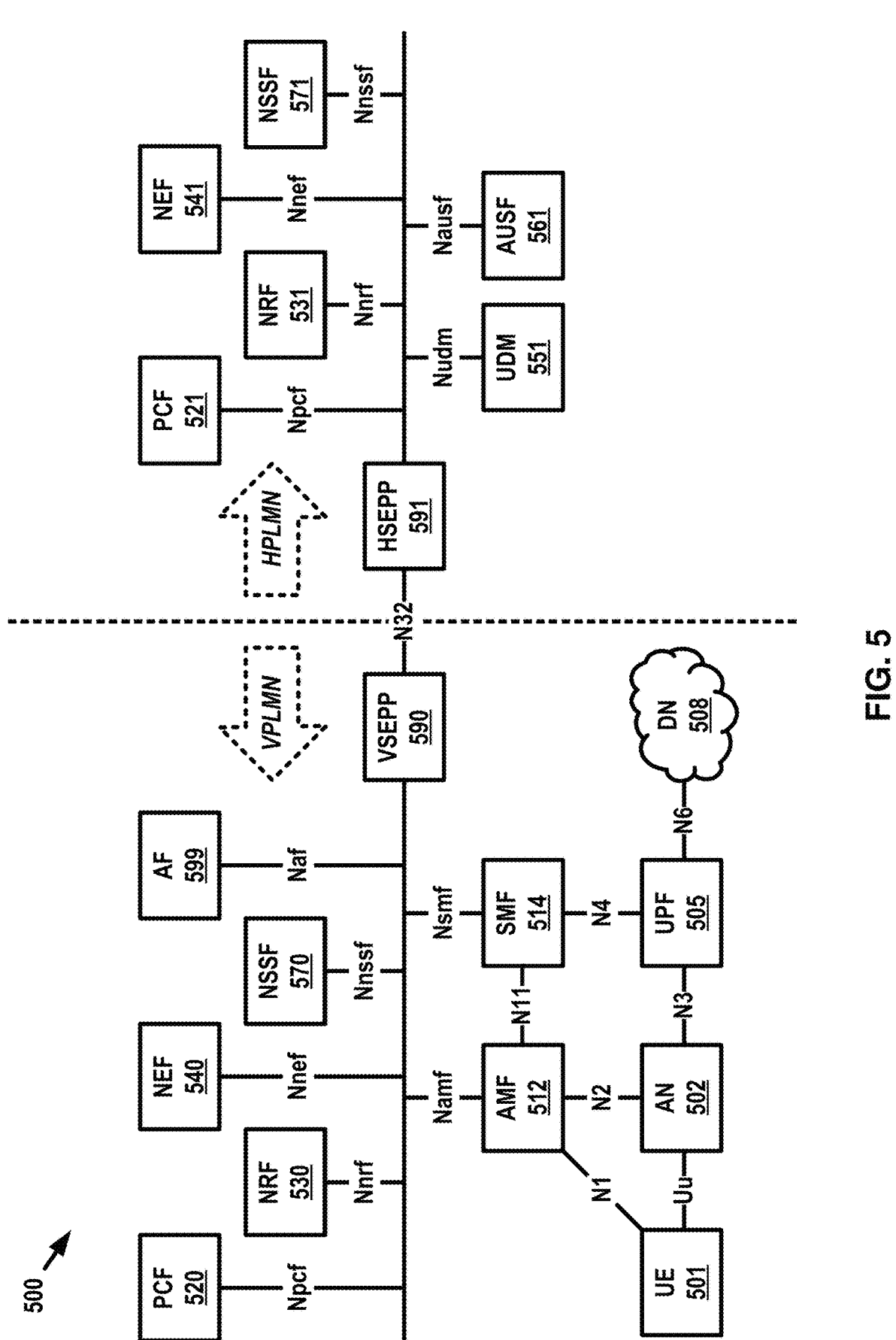
FIG. 5 illustrates an example of a core network architecture for a roaming scenario.

FIGS. 4A, 4B, and 5 illustrate other examples of core network architectures that are analogous in some respects to the core network architecture 300 depicted in FIG. 3. For conciseness, some of the core network elements depicted in FIG. 3 are omitted. Many of the elements depicted in FIGS. 4A, 4B, and 5 are analogous in some respects to elements depicted in FIG. 3. For conciseness, some of the details relating to their functions or operation are omitted.

FIG. 4A illustrates an example of a core network architecture 400A comprising an arrangement of multiple UPFs. Core network architecture 400A includes a UE 401, an AN 402, an AMF 412, and an SMF 414. Unlike previous examples of core network architectures described above, FIG. 4A depicts multiple UPFs, including a UPF 405, a UPF 406, and a UPF 407, and multiple DNs, including a DN 408 and a DN 409. Each of the multiple UPFs 405, 406, 407 may communicate with the SMF 414 via an N4 interface. The DNs 408, 409 communicate with the UPFs 405, 406, respectively, via N6 interfaces. As shown in FIG. 4A, the multiple UPFs 405, 406, 407 may communicate with one another via N9 interfaces.

The UPFs 405, 406, 407 may perform traffic detection, in which the UPFs identify and/or classify packets. Packet identification may be performed based on packet detection rules (PDR) provided by the SMF 414. A PDR may include packet detection information comprising one or more of: a source interface, a UE IP address, core network (CN) tunnel information (e.g., a CN address of an N3/N9 tunnel corresponding to a PDU session), a network instance identifier, a quality of service flow identifier (QFI), a filter set (for example, an IP packet filter set or an ethernet packet filter set), and/or an application identifier.

In addition to indicating how a particular packet is to be detected, a PDR may further indicate rules for handling the packet upon detection thereof. The rules may include, for example, forwarding action rules (FARs), multi-access rules (MARs), usage reporting rules (URRs), QoS enforcement rules (QERs), etc. For example, the PDR may comprise one or more FAR identifiers, MAR identifiers, URR identifiers, and/or QER identifiers. These identifiers may indicate the rules that are prescribed for the handling of a particular detected packet.

The UPF 405 may perform traffic forwarding in accordance with a FAR. For example, the FAR may indicate that a packet associated with a particular PDR is to be forwarded, duplicated, dropped, and/or buffered. The FAR may indicate a destination interface, for example, "access" for downlink or "core" for uplink. If a packet is to be buffered, the FAR may indicate a buffering action rule (BAR). As an example, UPF 405 may perform data buffering of a certain number downlink packets if a PDU session is deactivated.

The UPF 405 may perform QoS enforcement in accordance with a QER. For example, the QER may indicate a guaranteed bitrate that is authorized and/or a maximum bitrate to be enforced for a packet associated with a particular PDR. The QER may indicate that a particular guaranteed and/or maximum bitrate may be for uplink packets and/or downlink packets. The UPF 405 may mark packets belonging to a particular QoS flow with a corresponding QFI. The marking may enable a recipient of the packet to determine a QoS of the packet.

The UPF 405 may provide usage reports to the SMF 414 in accordance with a URR. The URR may indicate one or more triggering conditions for generation and reporting of the usage report, for example, immediate reporting, periodic reporting, a threshold for incoming uplink traffic, or any other suitable triggering condition. The URR may indicate a method for measuring usage of network resources, for example, data volume, duration, and/or event.

As noted above, the DNs 408, 409 may comprise public DNS (e.g., the Internet), private DNs (e.g., private, internal corporate-owned DNs), and/or intra-operator DNs. Each DN may provide an operator service and/or a third-party service. The service provided by a DN may be the Internet, an IP multimedia subsystem (IMS), an augmented or virtual reality network, an edge computing or mobile edge computing (MEC) network, etc. Each DN may be identified using a data network name (DNN). The UE 401 may be configured to establish a first logical connection with DN 408 (a first PDU session), a second logical connection with DN 409 (a second PDU session), or both simultaneously (first and second PDU sessions).

Each PDU session may be associated with at least one UPF configured to operate as a PDU session anchor (PSA, or "anchor"). The anchor may be a UPF that provides an N6 interface with a DN.

In the example of FIG. 4A, UPF 405 may be the anchor for the first PDU session between UE 401 and DN 408, whereas the UPF 406 may be the anchor for the second PDU session between UE 401 and DN 409. The core network may use the anchor to provide service continuity of a particular PDU session (for example, IP address continuity) as UE 401 moves from one access network to another. For example, suppose that UE 401 establishes a PDU session using a data path to the DN 408 using an access network other than AN 402. The data path may include UPF 405 acting as anchor. Suppose further that the UE 401 later moves into the coverage area of the AN 402. In such a scenario, SMF 414 may select a new UPF (UPF 407) to bridge the gap between the newly-entered access network (AN 402) and the anchor UPF (UPF 405). The continuity of the PDU session may be preserved as any number of UPFs are added or removed from the data path. When a UPF is added to a data path, as shown in FIG. 4A, it may be described as an intermediate UPF and/or a cascaded UPF.

As noted above, UPF 406 may be the anchor for the second PDU session between UE 401 and DN 409. Although the anchor for the first and second PDU sessions are associated with different UPFs in FIG. 4A, it will be understood that this is merely an example. It will also be understood that multiple PDU sessions with a single DN may correspond to any number of anchors. When there are multiple UPFs, a UPF at the branching point (UPF 407 in FIG. 4) may operate as an uplink classifier (UL-CL). The UL-CL may divert uplink user plane traffic to different UPFs.

The SMF 414 may allocate, manage, and/or assign an IP address to UE 401, for example, upon establishment of a PDU session. The SMF 414 may maintain an internal pool of IP addresses to be assigned. The SMF 414 may, if necessary, assign an IP address provided by a dynamic host configuration protocol (DHCP) server or an authentication, authorization, and accounting (AAA) server. IP address management may be performed in accordance with a session and service continuity (SSC) mode. In SSC mode 1, an IP address of UE 401 may be maintained (and the same anchor UPF may be used) as the wireless device moves within the network. In SSC mode 2, the IP address of UE 401 changes as UE 401 moves within the network (e.g., the old IP address and UPF may be abandoned and a new IP address and anchor UPF may be established). In SSC mode 3, it may be possible to maintain an old IP address (similar to SSC mode 1) temporarily while establishing a new IP address (similar to SSC mode 2), thus combining features of SSC modes 1 and 2. Applications that are sensitive to IP address changes may operate in accordance with SSC mode 1.

UPF selection may be controlled by SMF 414. For example, upon establishment and/or modification of a PDU session between UE 401 and DN 408, SMF 414 may select UPF 405 as the anchor for the PDU session and/or UPF 407 as an intermediate UPF. Criteria for UPF selection include path efficiency and/or speed between AN 402 and DN 408. The reliability, load status, location, slice support and/or other capabilities of candidate UPFs may also be considered.

FIG. 4B illustrates an example of a core network architecture 400B that accommodates untrusted access. Similar to FIG. 4A, UE 401 as depicted in FIG. 4B connects to DN 408 via AN 402 and UPF 405. The AN 402 and UPF 405 constitute trusted (e.g., 3GPP) access to the DN 408. By contrast, UE 401 may also access DN 408 using an untrusted access network, AN 403, and a non-3GPP interworking function (N3IWF) 404.

The AN 403 may be, for example, a wireless land area network (WLAN) operating in accordance with the IEEE 802.11 standard. The UE 401 may connect to AN 403, via an interface Y1, in whatever manner is prescribed for AN 403. The connection to AN 403 may or may not involve authentication. The UE 401 may obtain an IP address from AN 403. The UE 401 may determine to connect to core network 400B and select untrusted access for that purpose. The AN 403 may communicate with N3IWF 404 via a Y2 interface. After selecting untrusted access, the UE 401 may provide N3IWF 404 with sufficient information to select an AMF. The selected AMF may be, for example, the same AMF that is used by UE 401 for 3GPP access (AMF 412 in the present example). The N3IWF 404 may communicate with AMF 412 via an N2 interface. The UPF 405 may be selected and N3IWF 404 may communicate with UPF 405 via an N3 interface. The UPF 405 may be a PDU session anchor (PSA) and may remain the anchor for the PDU session even as UE 401 shifts between trusted access and untrusted access.

FIG. 5 illustrates an example of a core network architecture 500 in which a UE 501 is in a roaming scenario. In a roaming scenario, UE 501 is a subscriber of a first PLMN (a home PLMN, or HPLMN) but attaches to a second PLMN (a visited PLMN, or VPLMN). Core network architecture 500 includes UE 501, an AN 502, a UPF 505, and a DN 508. The AN 502 and UPF 505 may be associated with a VPLMN. The VPLMN may manage the AN 502 and UPF 505 using core network elements associated with the VPLMN, including an AMF 512, an SMF 514, a PCF 520, an NRF 530, an NEF 540, and an NSSF 570. An AF 599 may be adjacent the core network of the VPLMN.

The UE 501 may not be a subscriber of the VPLMN. The AMF 512 may authorize UE 501 to access the network based on, for example, roaming restrictions that apply to UE 501. In order to obtain network services provided by the VPLMN, it may be necessary for the core network of the VPLMN to interact with core network elements of a HPLMN of UE 501, in particular, a PCF 521, an NRF 531, an NEF 541, a UDM 551, and/or an AUSF 561. The VPLMN and HPLMN may communicate using an N32 interface connecting respective security edge protection proxies (SEPPs). In FIG. 5, the respective SEPPs are depicted as a VSEPP 590 and an HSEPP 591.

The VSEPP 590 and the HSEPP 591 communicate via an N32 interface for defined purposes while concealing information about each PLMN from the other. The SEPPs may apply roaming policies based on communications via the N32 interface. The PCF 520 and PCF 521 may communicate via the SEPPs to exchange policy-related signaling. The NRF 530 and NRF 531 may communicate via the SEPPs to enable service discovery of NFs in the respective PLMNs. The VPLMN and HPLMN may independently maintain NEF 540 and NEF 541. The NSSF 570 and NSSF 571 may communicate via the SEPPs to coordinate slice selection for UE 501. The HPLMN may handle all authentication and subscription related signaling. For example, when the UE 501 registers or requests service via the VPLMN, the VPLMN may authenticate UE 501 and/or obtain subscription data of UE 501 by accessing, via the SEPPs, the UDM 551 and AUSF 561 of the HPLMN.

The core network architecture 500 depicted in FIG. 5 may be referred to as a local breakout configuration, in which UE 501 accesses DN 508 using one or more UPFs of the VPLMN (i.e., UPF 505). However, other configurations are possible. For example, in a home-routed configuration (not shown in FIG. 5), UE 501 may access a DN using one or more UPFs of the HPLMN. In the home-routed configuration, an N9 interface may run parallel to the N32 interface, crossing the frontier between the VPLMN and the HPLMN to carry user plane data. One or more SMFs of the respective PLMNs may communicate via the N32 interface to coordinate session management for UE 501. The SMFs may control their respective UPFs on either side of the frontier.

Figure 6:
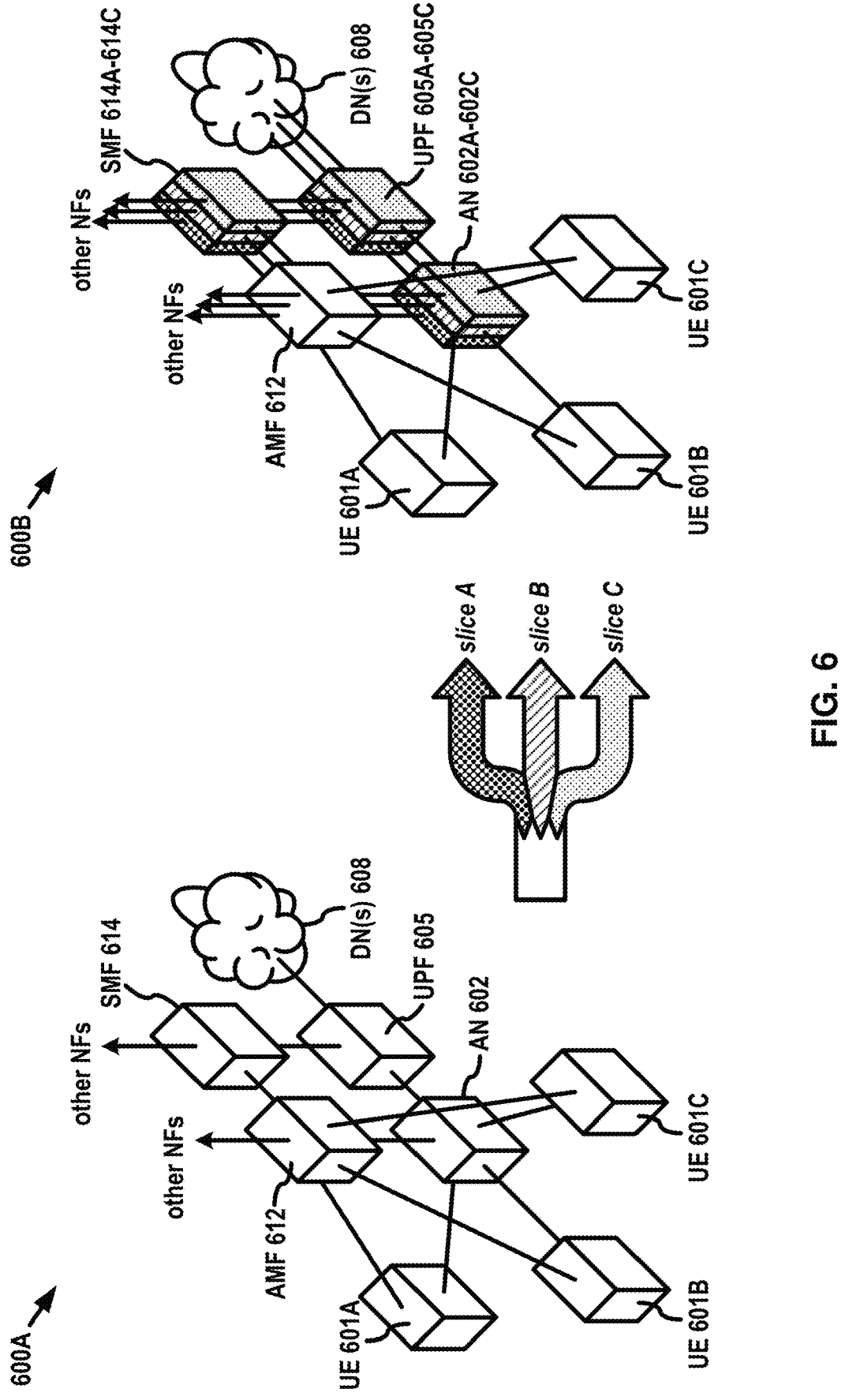
FIG. 6 illustrates an example of network slicing.

FIG. 6 illustrates an example of network slicing. Network slicing may refer to division of shared infrastructure (e.g., physical infrastructure) into distinct logical networks. These distinct logical networks may be independently controlled, isolated from one another, and/or associated with dedicated resources.

Network architecture 600A illustrates an un-sliced physical network corresponding to a single logical network. The network architecture 600A comprises a user plane wherein UEs 601A, 601B, 601C (collectively, UEs 601) have a physical and logical connection to a DN 608 via an AN 602 and a UPF 605. The network architecture 600A comprises a control plane wherein an AMF 612 and a SMF 614 control various aspects of the user plane.

The network architecture 600A may have a specific set of characteristics (e.g., relating to maximum bit rate, reliability, latency, bandwidth usage, power consumption, etc.). This set of characteristics may be affected by the nature of the network elements themselves (e.g., processing power, availability of free memory, proximity to other network elements, etc.) or the management thereof (e.g., optimized to maximize bit rate or reliability, reduce latency or power bandwidth usage, etc.). The characteristics of network architecture 600A may change over time, for example, by upgrading equipment or by modifying procedures to target a particular characteristic. However, at any given time, network architecture 600A will have a single set of characteristics that may or may not be optimized for a particular use case. For example, UEs 601A, 601B, 601C may have different requirements, but network architecture 600A can only be optimized for one of the three.

Network architecture 600B is an example of a sliced physical network divided into multiple logical networks. In FIG. 6, the physical network is divided into three logical networks, referred to as slice A, slice B, and slice C. For example, UE 601A may be served by AN 602A, UPF 605A, AMF 612, and SMF 614A. UE 601B may be served by AN 602B, UPF 605B, AMF 612, and SMF 614B. UE 601C may be served by AN 602C, UPF 605C, AMF 612, and SMF 614C. Although the respective UEs 601 communicate with different network elements from a logical perspective, these network elements may be deployed by a network operator using the same physical network elements.

Each network slice may be tailored to network services having different sets of characteristics. For example, slice A may correspond to enhanced mobile broadband (eMBB) service. Mobile broadband may refer to internet access by mobile users, commonly associated with smartphones. Slice B may correspond to ultra-reliable low-latency communication (URLLC), which focuses on reliability and speed. Relative to eMBB, URLLC may improve the feasibility of use cases such as autonomous driving and telesurgery. Slice C may correspond to massive machine type communication (mMTC), which focuses on low-power services delivered to a large number of users. For example, slice C may be optimized for a dense network of battery-powered sensors that provide small amounts of data at regular intervals. Many mMTC use cases would be prohibitively expensive if they operated using an eMBB or URLLC network.

If the service requirements for one of the UEs 601 changes, then the network slice serving that UE can be updated to provide better service. Moreover, the set of network characteristics corresponding to eMBB, URLLC, and mMTC may be varied, such that differentiated species of eMBB, URLLC, and mMTC are provided. Alternatively, network operators may provide entirely new services in response to, for example, customer demand.

In FIG. 6, each of the UEs 601 has its own network slice. However, it will be understood that a single slice may serve any number of UEs and a single UE may operate using any number of slices. Moreover, in the example network architecture 600B, the AN 602, UPF 605 and SMF 614 are separated into three separate slices, whereas the AMF 612 is unsliced. However, it will be understood that a network operator may deploy any architecture that selectively utilizes any mix of sliced and unsliced network elements, with different network elements divided into different numbers of slices. Although FIG. 6 only depicts three core network functions, it will be understood that other core network functions may be sliced as well. A PLMN that supports multiple network slices may maintain a separate network repository function (NFR) for each slice, enabling other NFs to discover network services associated with that slice.

Network slice selection may be controlled by an AMF, or alternatively, by a separate network slice selection function (NSSF). For example, a network operator may define and implement distinct network slice instances (NSIs). Each NSI may be associated with single network slice selection assistance information (S-NSSAI). The S-NSSAI may include a particular slice/service type (SST) indicator (indicating eMBB, URLLC, mMTC, etc.). as an example, a particular tracking area may be associated with one or more configured S-NSSAIs. UEs may identify one or more requested and/or subscribed S-NSSAIs (e.g., during registration). The network may indicate to the UE one or more allowed and/or rejected S-NSSAIS.

The S-NSSAI may further include a slice differentiator (SD) to distinguish between different tenants of a particular slice and/or service type. For example, a tenant may be a customer (e.g., vehicle manufacture, service provider, etc.) of a network operator that obtains (for example, purchases) guaranteed network resources and/or specific policies for handling its subscribers. The network operator may configure different slices and/or slice types, and use the SD to determine which tenant is associated with a particular slice.

FIG. 7A, FIG. 7B, and FIG. 7C illustrate a user plane (UP) protocol stack, a control plane (CP) protocol stack, and services provided between protocol layers of the UP protocol stack.

The layers may be associated with an open system interconnection (OSI) model of computer networking functionality. In the OSI model, layer 1 may correspond to the bottom layer, with higher layers on top of the bottom layer. Layer 1 may correspond to a physical layer, which is concerned with the physical infrastructure used for transfer of signals (for example, cables, fiber optics, and/or radio frequency transceivers). In New Radio (NR), layer 1 may comprise a physical layer (PHY). Layer 2 may correspond to a data link layer. Layer 2 may be concerned with packaging of data (into, e.g., data frames) for transfer, between nodes of the network, using the physical infrastructure of layer 1. In NR, layer 2 may comprise a media access control layer (MAC), a radio link control layer (RLC), a packet data convergence layer (PDCP), and a service data application protocol layer (SDAP).

Layer 3 may correspond to a network layer. Layer 3 may be concerned with routing of the data which has been packaged in layer 2. Layer 3 may handle prioritization of data and traffic avoidance. In NR, layer 3 may comprise a radio resource control layer (RRC) and a non-access stratum layer (NAS). Layers 4 through 7 may correspond to a transport layer, a session layer, a presentation layer, and an application layer. The application layer interacts with an end user to provide data associated with an application. In an example, an end user implementing the application may generate data associated with the application and initiate sending of that information to a targeted data network (e.g., the Internet, an application server, etc.). Starting at the application layer, each layer in the OSI model may manipulate and/or repackage the information and deliver it to a lower layer. At the lowest layer, the manipulated and/or repackaged information may be exchanged via physical infrastructure (for example, electrically, optically, and/or electromagnetically). As it approaches the targeted data network, the information will be unpackaged and provided to higher and higher layers, until it once again reaches the application layer in a form that is usable by the targeted data network (e.g., the same form in which it was provided by the end user). To respond to the end user, the data network may perform this procedure in reverse.

FIG. 7A illustrates a user plane protocol stack. The user plane protocol stack may be a new radio (NR) protocol stack for a Uu interface between a UE 701 and a gNB 702. In layer 1 of the UP protocol stack, the UE 701 may implement PHY 731 and the gNB 702 may implement PHY 732. In layer 2 of the UP protocol stack, the UE 701 may implement MAC 741, RLC 751, PDCP 761, and SDAP 771. The gNB 702 may implement MAC 742, RLC 752, PDCP 762, and SDAP 772.

FIG. 7B illustrates a control plane protocol stack. The control plane protocol stack may be an NR protocol stack for the Uu interface between the UE 701 and the gNB 702 and/or an N1 interface between the UE 701 and an AMF 712. In layer 1 of the CP protocol stack, the UE 701 may implement PHY 731 and the gNB 702 may implement PHY 732. In layer 2 of the CP protocol stack, the UE 701 may implement MAC 741, RLC 751, PDCP 761, RRC 781, and NAS 791. The gNB 702 may implement MAC 742, RLC 752, PDCP 762, and RRC 782. The AMF 712 may implement NAS 792.

The NAS may be concerned with the non-access stratum, in particular, communication between the UE 701 and the core network (e.g., the AMF 712). Lower layers may be concerned with the access stratum, for example, communication between the UE 701 and the gNB 702. Messages sent between the UE 701 and the core network may be referred to as NAS messages. In an example, a NAS message may be relayed by the gNB 702, but the content of the NAS message (e.g., information elements of the NAS message) may not be visible to the gNB 702.

FIG. 7C illustrates an example of services provided between protocol layers of the NR user plane protocol stack illustrated in FIG. 7A. The UE 701 may receive services through a PDU session, which may be a logical connection between the UE 701 and a data network (DN). The UE 701 and the DN may exchange data packets associated with the PDU session. The PDU session may comprise one or more quality of service (QoS) flows. SDAP 771 and SDAP 772 may perform mapping and/or demapping between the one or more QoS flows of the PDU session and one or more radio bearers (e.g., data radio bearers). The mapping between the QoS flows and the data radio bearers may be determined in the SDAP 772 by the gNB 702, and the UE 701 may be notified of the mapping (e.g., based on control signaling and/or reflective mapping). For reflective mapping, the SDAP 772 of the gNB 220 may mark downlink packets with a QoS flow indicator (QFI) and deliver the downlink packets to the UE 701. The UE 701 may determine the mapping based on the QFI of the downlink packets.

PDCP 761 and PDCP 762 may perform header compression and/or decompression. Header compression may reduce the amount of data transmitted over the physical layer. The PDCP 761 and PDCP 762 may perform ciphering and/or deciphering. Ciphering may reduce unauthorized decoding of data transmitted over the physical layer (e.g., intercepted on an air interface), and protect data integrity (e.g., to ensure control messages originate from intended sources). The PDCP 761 and PDCP 762 may perform retransmissions of undelivered packets, in-sequence delivery and reordering of packets, duplication of packets, and/or identification and removal of duplicate packets. In a dual connectivity scenario, PDCP 761 and PDCP 762 may perform mapping between a split radio bearer and RLC channels.

RLC 751 and RLC 752 may perform segmentation, retransmission through Automatic Repeat Request (ARQ). The RLC 751 and RLC 752 may perform removal of duplicate data units received from MAC 741 and MAC 742, respectively. The RLCs 213 and 223 may provide RLC channels as a service to PDCPs 214 and 224, respectively.

MAC 741 and MAC 742 may perform multiplexing and/or demultiplexing of logical channels. MAC 741 and MAC 742 may map logical channels to transport channels. In an example, UE 701 may, in MAC 741, multiplex data units of one or more logical channels into a transport block. The UE 701 may transmit the transport block to the gNB 702 using PHY 731. The gNB 702 may receive the transport block using PHY 732 and demultiplex data units of the transport blocks back into logical channels. MAC 741 and MAC 742 may perform error correction through Hybrid Automatic Repeat Request (HARQ), logical channel prioritization, and/or padding.

PHY 731 and PHY 732 may perform mapping of transport channels to physical channels. PHY 731 and PHY 732 may perform digital and analog signal processing functions (e.g., coding/decoding and modulation/demodulation) for sending and receiving information (e.g., transmission via an air interface). PHY 731 and PHY 732 may perform multi-antenna mapping.

Figure 8:
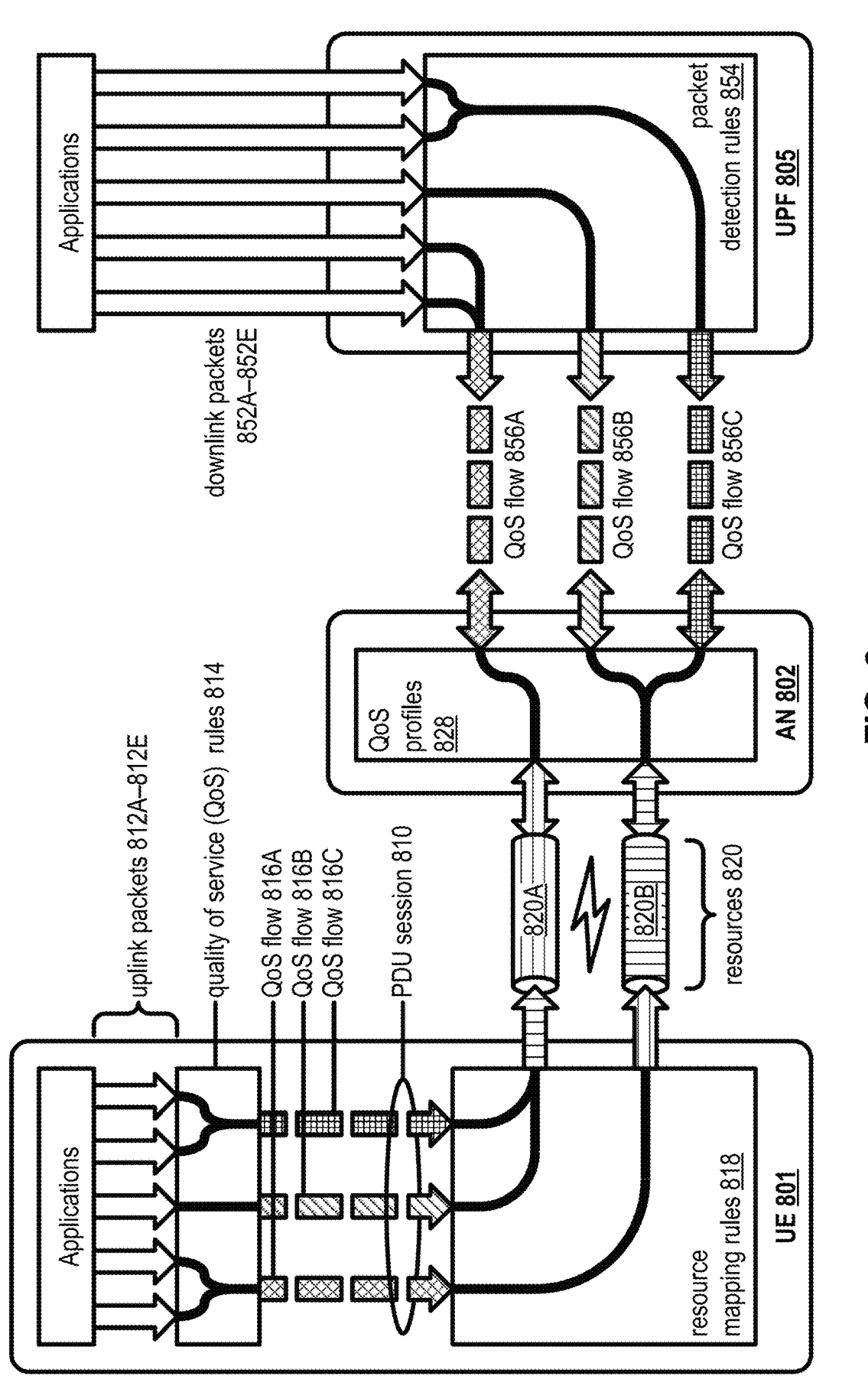
FIG. 8 illustrates an example of a quality of service model for data exchange.

FIG. 8 illustrates an example of a quality of service (QoS) model for differentiated data exchange. In the QoS model of FIG. 8, there are a UE 801, a AN 802, and a UPF 805. The QoS model facilitates prioritization of certain packet or protocol data units (PDUs), also referred to as packets. For example, higher-priority packets may be exchanged faster and/or more reliably than lower-priority packets. The network may devote more resources to exchange of high-QoS packets.

In the example of FIG. 8, a PDU session 810 is established between UE 801 and UPF 805. The PDU session 810 may be a logical connection enabling the UE 801 to exchange data with a particular data network (for example, the Internet). The UE 801 may request establishment of the PDU session 810. At the time that the PDU session 810 is established, the UE 801 may, for example, identify the targeted data network based on its data network name (DNN). The PDU session 810 may be managed, for example, by a session management function (SMF, not shown). In order to facilitate exchange of data associated with the PDU session 810, between the UE 801 and the data network, the SMF may select the UPF 805 (and optionally, one or more other UPFs, not shown).

One or more applications associated with UE 801 may generate uplink packets 812A-812E associated with the PDU session 810. In order to work within the QoS model, UE 801 may apply QoS rules 814 to uplink packets 812A-812E. The QoS rules 814 may be associated with PDU session 810 and may be determined and/or provided to the UE 801 when PDU session 810 is established and/or modified. Based on QoS rules 814, UE 801 may classify uplink packets 812A-812E, map each of the uplink packets 812A-812E to a QoS flow, and/or mark uplink packets 812A-812E with a QoS flow indicator (QFI). As a packet travels through the network, and potentially mixes with other packets from other UEs having potentially different priorities, the QFI indicates how the packet should be handled in accordance with the QoS model. In the present illustration, uplink packets 812A, 812B are mapped to QoS flow 816A, uplink packet 812C is mapped to QoS flow 816B, and the remaining packets are mapped to QoS flow 816C.

The QoS flows may be the finest granularity of QoS differentiation in a PDU session. In the figure, three QoS flows 816A-816C are illustrated. However, it will be understood that there may be any number of QoS flows. Some QoS flows may be associated with a guaranteed bit rate (GBR QoS flows) and others may have bit rates that are not guaranteed (non-GBR QoS flows). QoS flows may also be subject to per-UE and per-session aggregate bit rates. One of the QoS flows may be a default QoS flow. The QoS flows may have different priorities. For example, QoS flow 816A may have a higher priority than QoS flow 816B, which may have a higher priority than QoS flow 816C. Different priorities may be reflected by different QoS flow characteristics. For example, QoS flows may be associated with flow bit rates. A particular QoS flow may be associated with a guaranteed flow bit rate (GFBR) and/or a maximum flow bit rate (MFBR). QoS flows may be associated with specific packet delay budgets (PDBs), packet error rates (PERs), and/or maximum packet loss rates. QoS flows may also be subject to per-UE and per-session aggregate bit rates.

In order to work within the QoS model, UE 801 may apply resource mapping rules 818 to the QoS flows 816A-816C. The air interface between UE 801 and AN 802 may be associated with resources 820. In the present illustration, QoS flow 816A is mapped to resource 820A, whereas QoS flows 816B, 816C are mapped to resource 820B. The resource mapping rules 818 may be provided by the AN 802. In order to meet QoS requirements, the resource mapping rules 818 may designate more resources for relatively high-priority QoS flows. With more resources, a high-priority QoS flow such as QoS flow 816A may be more likely to obtain the high flow bit rate, low packet delay budget, or other characteristic associated with QoS rules 814. The resources 820 may comprise, for example, radio bearers. The radio bearers (e.g., data radio bearers) may be established between the UE 801 and the AN 802. The radio bearers in 5G, between the UE 801 and the AN 802, may be distinct from bearers in LTE, for example, Evolved Packet System (EPS) bearers between a UE and a packet data network gateway (PGW), S1 bearers between an eNB and a serving gateway (SGW), and/or an S5/S8 bearer between an SGW and a PGW.

Once a packet associated with a particular QoS flow is received at AN 802 via resource 820A or resource 820B, AN 802 may separate packets into respective QoS flows 856A-856C based on QoS profiles 828. The QoS profiles 828 may be received from an SMF. Each QoS profile may correspond to a QFI, for example, the QFI marked on the uplink packets 812A-812E. Each QoS profile may include QoS parameters such as 5G QoS identifier (5QI) and an allocation and retention priority (ARP). The QoS profile for non-GBR QoS flows may further include additional QoS parameters such as a reflective QoS attribute (RQA). The QoS profile for GBR QoS flows may further include additional QoS parameters such as a guaranteed flow bit rate (GFBR), a maximum flow bit rate (MFBR), and/or a maximum packet loss rate. The 5QI may be a standardized 5QI which have one-to-one mapping to a standardized combination of 5G QoS characteristics per well-known services. The 5QI may be a dynamically assigned 5QI which the standardized 5QI values are not defined. The 5QI may represent 5G QoS characteristics. The 5QI may comprise a resource type, a default priority level, a packet delay budget (PDB), a packet error rate (PER), a maximum data burst volume, and/or an averaging window. The resource type may indicate a non-GBR QoS flow, a GBR QoS flow or a delay-critical GBR QoS flow. The averaging window may represent a duration over which the GFBR and/or MFBR is calculated. ARP may be a priority level comprising pre-emption capability and a pre-emption vulnerability. Based on the ARP, the AN 802 may apply admission control for the QoS flows in a case of resource limitations.

The AN 802 may select one or more N3 tunnels 850 for transmission of the QoS flows 856A-856C. After the packets are divided into QoS flows 856A-856C, the packet may be sent to UPF 805 (e.g., towards a DN) via the selected one or more N3 tunnels 850. The UPF 805 may verify that the QFIs of the uplink packets 812A-812E are aligned with the QoS rules 814 provided to the UE 801. The UPF 805 may measure and/or count packets and/or provide packet metrics to, for example, a PCF.

The figure also illustrates a process for downlink. In particular, one or more applications may generate downlink packets 852A-852E. The UPF 805 may receive downlink packets 852A-852E from one or more DNs and/or one or more other UPFs. As per the QoS model, UPF 805 may apply packet detection rules (PDRs) 854 to downlink packets 852A-852E. Based on PDRs 854, UPF 805 may map packets 852A-852E into QoS flows. In the present illustration, downlink packets 852A, 852B are mapped to QoS flow 856A, downlink packet 852C is mapped to QoS flow 856B, and the remaining packets are mapped to QoS flow 856C.

The QoS flows 856A-856C may be sent to AN 802. The AN 802 may apply resource mapping rules to the QoS flows 856A-856C. In the present illustration, QoS flow 856A is mapped to resource 820A, whereas QoS flows 856B, 856C are mapped to resource 820B. In order to meet QoS requirements, the resource mapping rules may designate more resources to high-priority QoS flows.

FIGS. 9A-9D illustrate example states and state transitions of a wireless device (e.g., a UE). At any given time, the wireless device may have a radio resource control (RRC) state, a registration management (RM) state, and a connection management (CM) state.

Figure 9A:
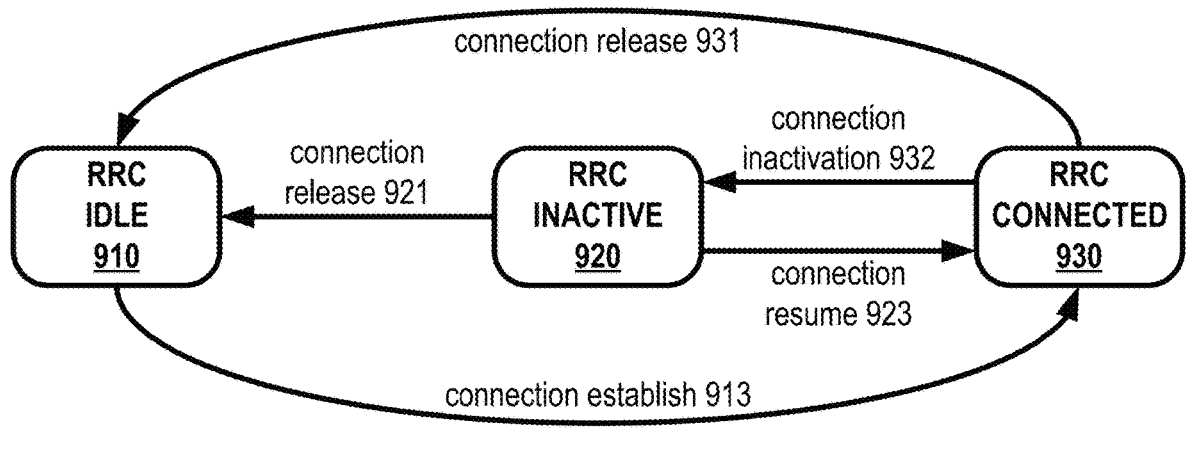
FIG. 9A, FIG. 9B, FIG. 9C, and FIG. 9D illustrate example states and state transitions of a wireless device.

FIG. 9A is an example diagram showing RRC state transitions of a wireless device (e.g., a UE). The UE may be in one of three RRC states: RRC idle 910, (e.g., RRC_IDLE), RRC inactive 920 (e.g., RRC_INACTIVE), or RRC connected 930 (e.g., RRC_CONNECTED). The UE may implement different RAN-related control-plane procedures depending on its RRC state. Other elements of the network, for example, a base station, may track the RRC state of one or more UEs and implement RAN-related control-plane procedures appropriate to the RRC state of each.

In RRC connected 930, it may be possible for the UE to exchange data with the network (for example, the base station). The parameters necessary for exchange of data may be established and known to both the UE and the network. The parameters may be referred to and/or included in an RRC context of the UE (sometimes referred to as a UE context). These parameters may include, for example: one or more AS contexts; one or more radio link configuration parameters; bearer configuration information (e.g., relating to a data radio bearer, signaling radio bearer, logical channel, QoS flow, and/or PDU session); security information; and/or PHY, MAC, RLC, PDCP, and/or SDAP layer configuration information. The base station with which the UE is connected may store the RRC context of the UE.

While in RRC connected 930, mobility of the UE may be managed by the access network, whereas the UE itself may manage mobility while in RRC idle 910 and/or RRC inactive 920. While in RRC connected 930, the UE may manage mobility by measuring signal levels (e.g., reference signal levels) from a serving cell and neighboring cells and reporting these measurements to the base station currently serving the UE. The network may initiate handover based on the reported measurements. The RRC state may transition from RRC connected 930 to RRC idle 910 through a connection release procedure 930 or to RRC inactive 920 through a connection inactivation procedure 932.

In RRC idle 910, an RRC context may not be established for the UE. In RRC idle 910, the UE may not have an RRC connection with a base station. While in RRC idle 910, the UE may be in a sleep state for a majority of the time (e.g., to conserve battery power). The UE may wake up periodically (e.g., once in every discontinuous reception cycle) to monitor for paging messages from the access network. Mobility of the UE may be managed by the UE through a procedure known as cell reselection. The RRC state may transition from RRC idle 910 to RRC connected 930 through a connection establishment procedure 913, which may involve a random access procedure, as discussed in greater detail below.

In RRC inactive 920, the RRC context previously established is maintained in the UE and the base station. This may allow for a fast transition to RRC connected 930 with reduced signaling overhead as compared to the transition from RRC idle 910 to RRC connected 930. The RRC state may transition to RRC connected 930 through a connection resume procedure 923. The RRC state may transition to RRC idle 910 though a connection release procedure 921 that may be the same as or similar to connection release procedure 931.

An RRC state may be associated with a mobility management mechanism. In RRC idle 910 and RRC inactive 920, mobility may be managed by the UE through cell reselection. The purpose of mobility management in RRC idle 910 and/or RRC inactive 920 is to allow the network to be able to notify the UE of an event via a paging message without having to broadcast the paging message over the entire mobile communications network. The mobility management mechanism used in RRC idle 910 and/or RRC inactive 920 may allow the network to track the UE on a cell-group level so that the paging message may be broadcast over the cells of the cell group that the UE currently resides within instead of the entire communication network. Tracking may be based on different granularities of grouping. For example, there may be three levels of cell-grouping granularity: individual cells; cells within a RAN area identified by a RAN area identifier (RAI); and cells within a group of RAN areas, referred to as a tracking area and identified by a tracking area identifier (TAI).

Tracking areas may be used to track the UE at the CN level. The CN may provide the UE with a list of TAIs associated with a UE registration area. If the UE moves, through cell reselection, to a cell associated with a TAI not included in the list of TAIs associated with the UE registration area, the UE may perform a registration update with the CN to allow the CN to update the UE's location and provide the UE with a new the UE registration area.

RAN areas may be used to track the UE at the RAN level. For a UE in RRC inactive 920 state, the UE may be assigned a RAN notification area. A RAN notification area may comprise one or more cell identities, a list of RAIs, and/or a list of TAIs. In an example, a base station may belong to one or more RAN notification areas. In an example, a cell may belong to one or more RAN notification areas. If the UE moves, through cell reselection, to a cell not included in the RAN notification area assigned to the UE, the UE may perform a notification area update with the RAN to update the UE's RAN notification area.

A base station storing an RRC context for a UE or a last serving base station of the UE may be referred to as an anchor base station. An anchor base station may maintain an RRC context for the UE at least during a period of time that the UE stays in a RAN notification area of the anchor base station and/or during a period of time that the UE stays in RRC inactive 920.

Figure 9B:
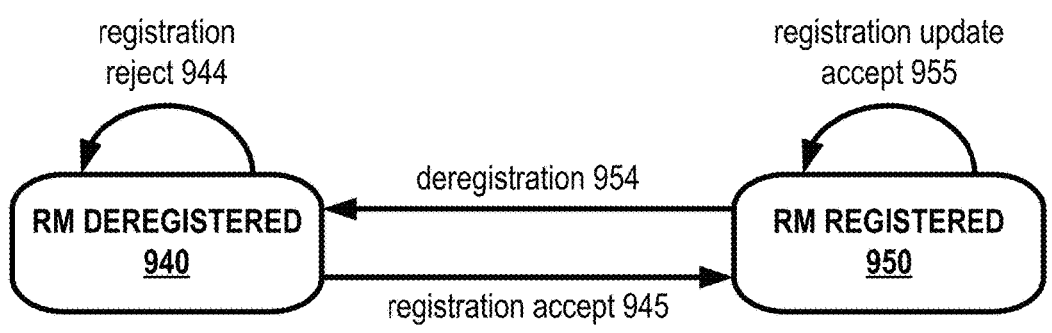

FIG. 9B is an example diagram showing registration management (RM) state transitions of a wireless device (e.g., a UE). The states are RM deregistered 940, (e.g., RM-DEREGISTERED) and RM registered 950 (e.g., RM-REGISTERED).

In RM deregistered 940, the UE is not registered with the network, and the UE is not reachable by the network. In order to be reachable by the network, the UE must perform an initial registration. As an example, the UE may register with an AMF of the network. If registration is rejected (registration reject 944), then the UE remains in RM deregistered 940. If registration is accepted (registration accept 945), then the UE transitions to RM registered 950. While the UE is RM registered 950, the network may store, keep, and/or maintain a UE context for the UE. The UE context may be referred to as wireless device context. The UE context corresponding to network registration (maintained by the core network) may be different from the RRC context corresponding to RRC state (maintained by an access network, e.g., a base station). The UE context may comprise a UE identifier and a record of various information relating to the UE, for example, UE capability information, policy information for access and mobility management of the UE, lists of allowed or established slices or PDU sessions, and/or a registration area of the UE (i.e., a list of tracking areas covering the geographical area where the wireless device is likely to be found).

While the UE is RM registered 950, the network may store the UE context of the UE, and if necessary use the UE context to reach the UE. Moreover, some services may not be provided by the network unless the UE is registered. The UE may update its UE context while remaining in RM registered 950 (registration update accept 955). For example, if the UE leaves one tracking area and enters another tracking area, the UE may provide a tracking area identifier to the network. The network may deregister the UE, or the UE may deregister itself (deregistration 954). For example, the network may automatically deregister the wireless device if the wireless device is inactive for a certain amount of time. Upon deregistration, the UE may transition to RM deregistered 940.

Figure 9C:
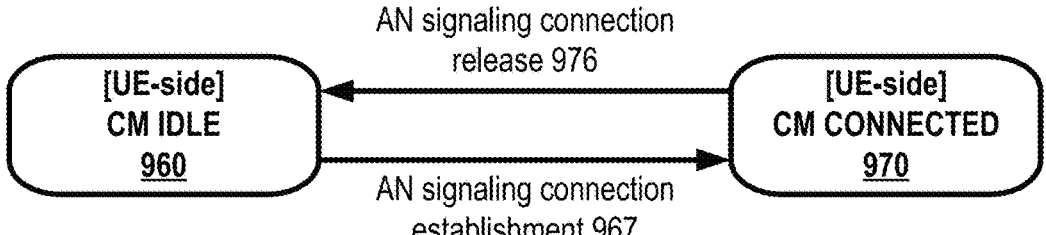

FIG. 9C is an example diagram showing connection management (CM) state transitions of a wireless device (e.g., a UE), shown from a perspective of the wireless device. The UE may be in CM idle 960 (e.g., CM-IDLE) or CM connected 970 (e.g., CM-CONNECTED).

In CM idle 960, the UE does not have a non access stratum (NAS) signaling connection with the network. As a result, the UE can not communicate with core network functions. The UE may transition to CM connected 970 by establishing an AN signaling connection (AN signaling connection establishment 967). This transition may be initiated by sending an initial NAS message. The initial NAS message may be a registration request (e.g., if the UE is RM deregistered 940) or a service request (e.g., if the UE is RM registered 950). If the UE is RM registered 950, then the UE may initiate the AN signaling connection establishment by sending a service request, or the network may send a page, thereby triggering the UE to send the service request.

In CM connected 970, the UE can communicate with core network functions using NAS signaling. As an example, the UE may exchange NAS signaling with an AMF for registration management purposes, service request procedures, and/or authentication procedures. As another example, the UE may exchange NAS signaling, with an SMF, to establish and/or modify a PDU session. The network may disconnect the UE, or the UE may disconnect itself (AN signaling connection release 976). For example, if the UE transitions to RM deregistered 940, then the UE may also transition to CM idle 960. When the UE transitions to CM idle 960, the network may deactivate a user plane connection of a PDU session of the UE.

Figure 9D:
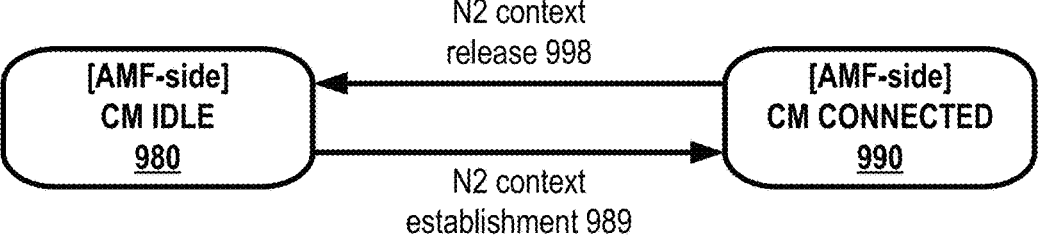

FIG. 9D is an example diagram showing CM state transitions of the wireless device (e.g., a UE), shown from a network perspective (e.g., an AMF). The CM state of the UE, as tracked by the AMF, may be in CM idle 980 (e.g., CM-IDLE) or CM connected 990 (e.g., CM-CONNECTED). When the UE transitions from CM idle 980 to CM connected 990, the AMF many establish an N2 context of the UE (N2 context establishment 989). When the UE transitions from CM connected 990 to CM idle 980, the AMF many release the N2 context of the UE (N2 context release 998).

Figure 10:
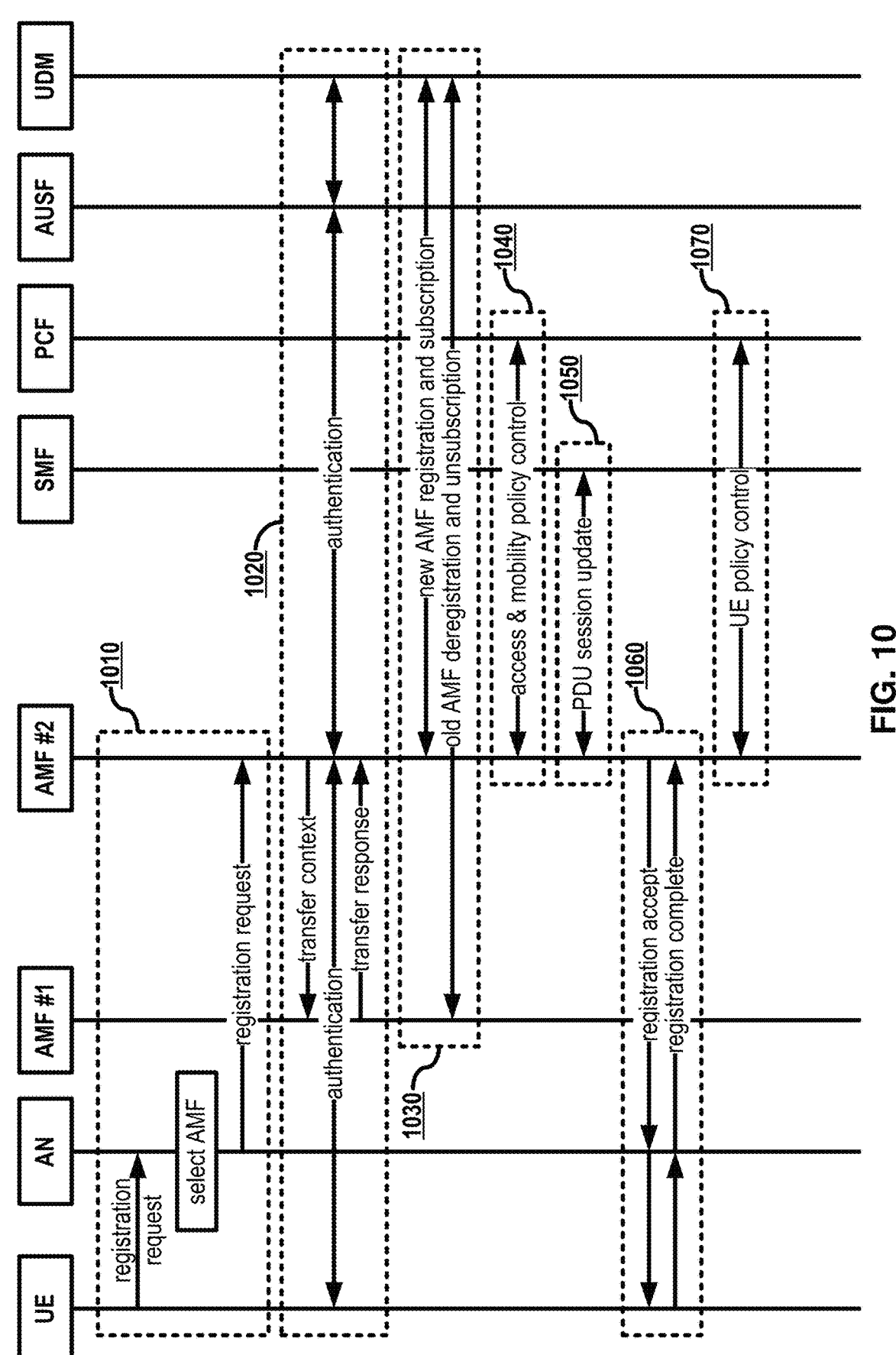
FIG. 10 illustrates an example of a registration procedure for a wireless device.
Figure 11:
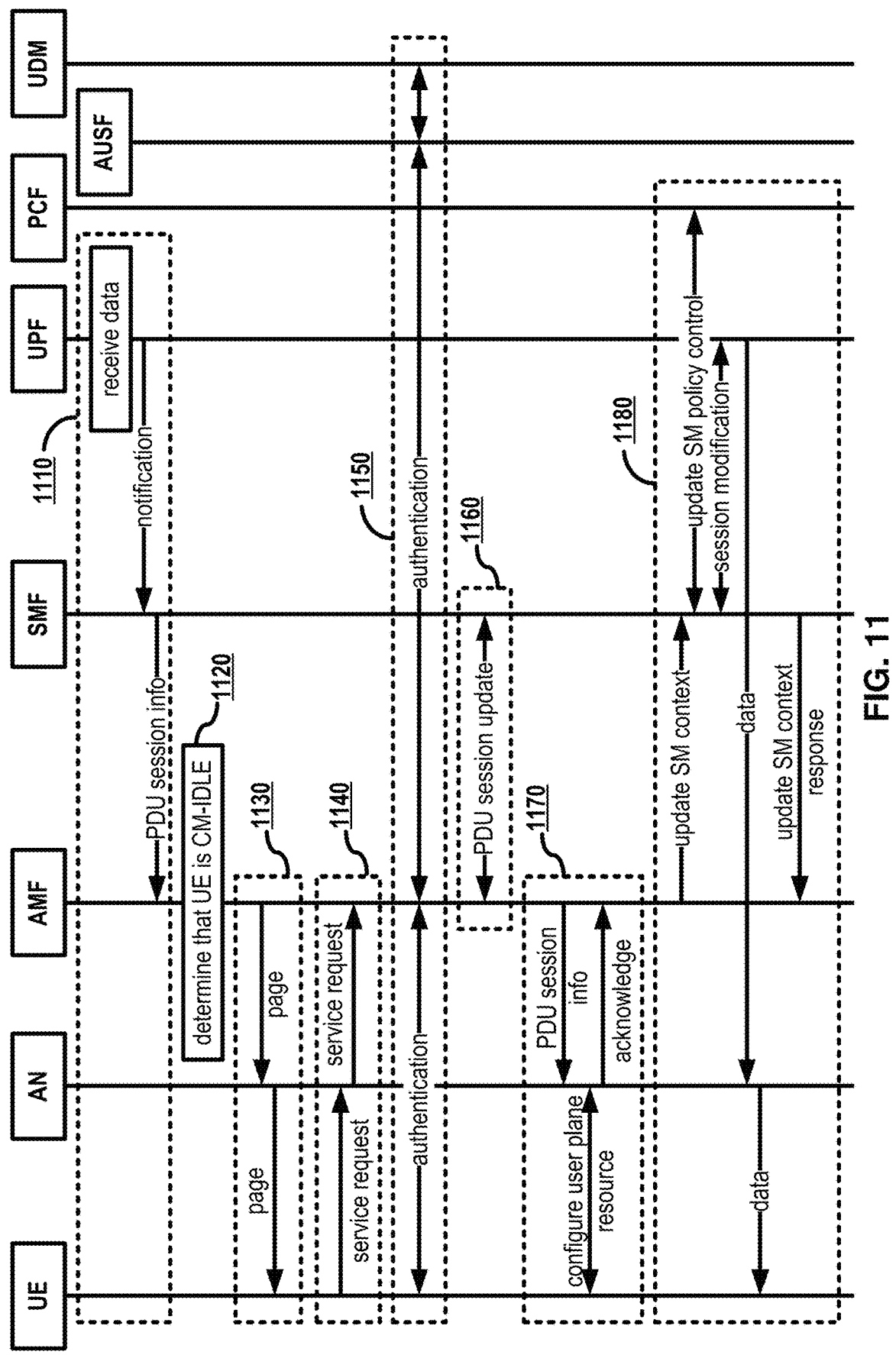
FIG. 11 illustrates an example of a service request procedure for a wireless device.
Figure 12:
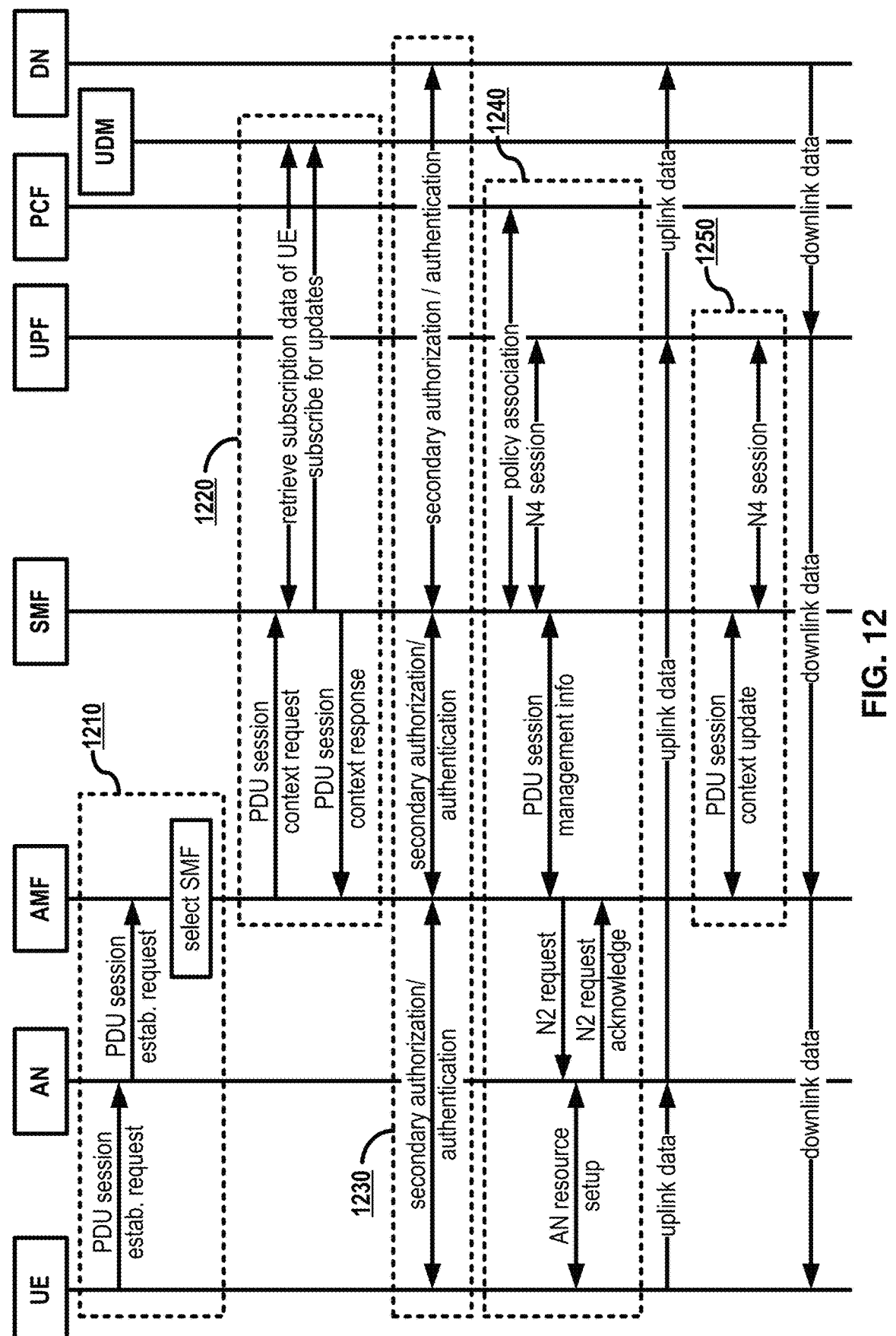
FIG. 12 illustrates an example of a protocol data unit session establishment procedure for a wireless device.

FIGS. 10-12 illustrate example procedures for registering, service request, and PDU session establishment of a UE.

FIG. 10 illustrates an example of a registration procedure for a wireless device (e.g., a UE). Based on the registration procedure, the UE may transition from, for example, RM deregistered 940 to RM registered 950.

Registration may be initiated by a UE for the purposes of obtaining authorization to receive services, enabling mobility tracking, enabling reachability, or other purposes. The UE may perform an initial registration as a first step toward connection to the network (for example, if the UE is powered on, airplane mode is turned off, etc.). Registration may also be performed periodically to keep the network informed of the UE's presence (for example, while in CM-IDLE state), or in response to a change in UE capability or registration area. Deregistration (not shown in FIG. 10) may be performed to stop network access.

At 1010, the UE transmits a registration request to an AN. As an example, the UE may have moved from a coverage area of a previous AMF (illustrated as AMF #1) into a coverage area of a new AMF (illustrated as AMF #2). The registration request may be a NAS message. The registration request may include a UE identifier. The AN may select an AMF for registration of the UE. For example, the AN may select a default AMF. For example, the AN may select an AMF that is already mapped to the UE (e.g., a previous AMF). The NAS registration request may include a network slice identifier and the AN may select an AMF based on the requested slice. After the AMF is selected, the AN may send the registration request to the selected AMF.

At 1020, the AMF that receives the registration request (AMF #2) performs a context transfer. The context may be a UE context, for example, an RRC context for the UE. As an example, AMF #2 may send AMF #1 a message requesting a context of the UE. The message may include the UE identifier. The message may be a Namf_Communication_UEContextTransfer message. AMF #1 may send to AMF #2 a message that includes the requested UE context. This message may be a Namf_Communication_UEContext-Transfer message. After the UE context is received, the AMF #2 may coordinate authentication of the UE. After authentication is complete, AMF #2 may send to AMF #1 a message indicating that the UE context transfer is complete. This message may be a Namf_Communication_UEContext-Transfer Response message.

Authentication may require participation of the UE, an AUSF, a UDM and/or a UDR (not shown). For example, the AMF may request that the AUSF authenticate the UE. For example, the AUSF may execute authentication of the UE. For example, the AUSF may get authentication data from UDM. For example, the AUSF may send a subscription permanent identifier (SUPI) to the AMF based on the authentication being successful. For example, the AUSF may provide an intermediate key to the AMF. The intermediate key may be used to derive an access-specific security key for the UE, enabling the AMF to perform security context management (SCM). The AUSF may obtain subscription data from the UDM. The subscription data may be based on information obtained from the UDM (and/or the UDR). The subscription data may include subscription identifiers, security credentials, access and mobility related subscription data and/or session related data.

At 1030, the new AMF, AMF #2, registers and/or subscribes with the UDM. AMF #2 may perform registration using a UE context management service of the UDM (Nudm_UECM). AMF #2 may obtain subscription information of the UE using a subscriber data management service of the UDM (Nudm_SDM). AMF #2 may further request that the UDM notify AMF #2 if the subscription information of the UE changes. As the new AMF registers and subscribes, the old AMF, AMF #1, may deregister and unsubscribe. After deregistration, AMF #1 is free of responsibility for mobility management of the UE.

At 1040, AMF #2 retrieves access and mobility (AM) policies from the PCF. As an example, the AMF #2 may provide subscription data of the UE to the PCF. The PCF may determine access and mobility policies for the UE based on the subscription data, network operator data, current network conditions, and/or other suitable information. For example, the owner of a first UE may purchase a higher level of service than the owner of a second UE. The PCF may provide the rules associated with the different levels of service. Based on the subscription data of the respective UEs, the network may apply different policies which facilitate different levels of service.

For example, access and mobility policies may relate to service area restrictions, RAT/frequency selection priority (RFSP, where RAT stands for radio access technology), authorization and prioritization of access type (e.g., LTE versus NR), and/or selection of non-3GPP access (e.g., Access Network Discovery and Selection Policy (ANDSP)). The service area restrictions may comprise a list of tracking areas where the UE is allowed to be served (or forbidden from being served). The access and mobility policies may include a UE route selection policy (URSP)) that influences routing to an established PDU session or a new PDU session. As noted above, different policies may be obtained and/or enforced based on subscription data of the UE, location of the UE (i.e., location of the AN and/or AMF), or other suitable factors.

At 1050, AMF #2 may update a context of a PDU session. For example, if the UE has an existing PDU session, the AMF #2 may coordinate with an SMF to activate a user plane connection associated with the existing PDU session. The SMF may update and/or release a session management context of the PDU session (Nsmf_PDUSession_UpdateSMContext, Nsmf_PDUSession_ReleaseSMContext).

At 1060, AMF #2 sends a registration accept message to the AN, which forwards the registration accept message to the UE. The registration accept message may include a new UE identifier and/or a new configured slice identifier. The UE may transmit a registration complete message to the AN, which forwards the registration complete message to the AMF #2. The registration complete message may acknowledge receipt of the new UE identifier and/or new configured slice identifier.

At 1070, AMF #2 may obtain UE policy control information from the PCF. The PCF may provide an access network discovery and selection policy (ANDSP) to facilitate non-3GPP access. The PCF may provide a UE route selection policy (URSP) to facilitate mapping of particular data traffic to particular PDU session connectivity parameters. As an example, the URSP may indicate that data traffic associated with a particular application should be mapped to a particular SSC mode, network slice, PDU session type, or preferred access type (3GPP or non-3GPP).

FIG. 11 illustrates an example of a service request procedure for a wireless device (e.g., a UE). The service request procedure depicted in FIG. 11 is a network-triggered service request procedure for a UE in a CM-IDLE state. However, other service request procedures (e.g., a UE-triggered service request procedure) may also be understood by reference to FIG. 11, as will be discussed in greater detail below.

At 1110, a UPF receives data. The data may be downlink data for transmission to a UE. The data may be associated with an existing PDU session between the UE and a DN. The data may be received, for example, from a DN and/or another UPF. The UPF may buffer the received data. In response to the receiving of the data, the UPF may notify an SMF of the received data. The identity of the SMF to be notified may be determined based on the received data. The notification may be, for example, an N4 session report. The notification may indicate that the UPF has received data associated with the UE and/or a particular PDU session associated with the UE. In response to receiving the notification, the SMF may send PDU session information to an AMF. The PDU session information may be sent in an N1N2 message transfer for forwarding to an AN. The PDU session information may include, for example, UPF tunnel endpoint information and/or QoS information.

At 1120, the AMF determines that the UE is in a CM-IDLE state. The determining at 1120 may be in response to the receiving of the PDU session information. Based on the determination that the UE is CM-IDLE, the service request procedure may proceed to 1130 and 1140, as depicted in FIG. 11. However, if the UE is not CM-IDLE (e.g., the UE is CM-CONNECTED), then 1130 and 1140 may be skipped, and the service request procedure may proceed directly to 1150.

At 1130, the AMF pages the UE. The paging at 1130 may be performed based on the UE being CM-IDLE. To perform the paging, the AMF may send a page to the AN. The page may be referred to as a paging or a paging message. The page may be an N2 request message. The AN may be one of a plurality of ANs in a RAN notification area of the UE. The AN may send a page to the UE. The UE may be in a coverage area of the AN and may receive the page.

At 1140, the UE may request service. The UE may transmit a service request to the AMF via the AN. As depicted in FIG. 11, the UE may request service at 1140 in response to receiving the paging at 1130. However, as noted above, this is for the specific case of a network-triggered service request procedure. In some scenarios (for example, if uplink data becomes available at the UE), then the UE may commence a UE-triggered service request procedure. The UE-triggered service request procedure may commence starting at 1140.

At 1150, the network may authenticate the UE. Authentication may require participation of the UE, an AUSF, and/or a UDM, for example, similar to authentication described elsewhere in the present disclosure. In some cases (for example, if the UE has recently been authenticated), the authentication at 1150 may be skipped.

At 1160, the AMF and SMF may perform a PDU session update. As part of the PDU session update, the SMF may provide the AMF with one or more UPF tunnel endpoint identifiers. In some cases (not shown in FIG. 11), it may be necessary for the SMF to coordinate with one or more other SMFs and/or one or more other UPFs to set up a user plane.

At 1170, the AMF may send PDU session information to the AN. The PDU session information may be included in an N2 request message. Based on the PDU session information, the AN may configure a user plane resource for the UE. To configure the user plane resource, the AN may, for example, perform an RRC reconfiguration of the UE. The AN may acknowledge to the AMF that the PDU session information has been received. The AN may notify the AMF that the user plane resource has been configured, and/or provide information relating to the user plane resource configuration.

In the case of a UE-triggered service request procedure, the UE may receive, at 1170, a NAS service accept message from the AMF via the AN. After the user plane resource is configured, the UE may transmit uplink data (for example, the uplink data that caused the UE to trigger the service request procedure).

At 1180, the AMF may update a session management (SM) context of the PDU session. For example, the AMF may notify the SMF (and/or one or more other associated SMFs) that the user plane resource has been configured, and/or provide information relating to the user plane resource configuration. The AMF may provide the SMF (and/or one or more other associated SMFs) with one or more AN tunnel endpoint identifiers of the AN. After the SM context update is complete, the SMF may send an update SM context response message to the AMF.

Based on the update of the session management context, the SMF may update a PCF for purposes of policy control. For example, if a location of the UE has changed, the SMF may notify the PCF of the UE's new location.

Based on the update of the session management context, the SMF and UPF may perform a session modification. The session modification may be performed using N4 session modification messages. After the session modification is complete, the UPF may transmit downlink data (for example, the downlink data that caused the UPF to trigger the network-triggered service request procedure) to the UE. The transmitting of the downlink data may be based on the one or more AN tunnel endpoint identifiers of the AN.

FIG. 12 illustrates an example of a protocol data unit (PDU) session establishment procedure for a wireless device (e.g., a UE). The UE may determine to transmit the PDU session establishment request to create a new PDU session, to hand over an existing PDU session to a 3GPP network, or for any other suitable reason.

At 1210, the UE initiates PDU session establishment. The UE may transmit a PDU session establishment request to an AMF via an AN. The PDU session establishment request may be a NAS message. The PDU session establishment request may indicate: a PDU session ID; a requested PDU session type (new or existing); a requested DN (DNN); a requested network slice (S-NSSAI); a requested SSC mode;

and/or any other suitable information. The PDU session ID may be generated by the UE. The PDU session type may be, for example, an Internet Protocol (IP)-based type (e.g., IPv4, IPv6, or dual stack IPv4/IPv6), an Ethernet type, or an unstructured type.

The AMF may select an SMF based on the PDU session establishment request. In some scenarios, the requested PDU session may already be associated with a particular SMF. For example, the AMF may store a UE context of the UE, and the UE context may indicate that the PDU session ID of the requested PDU session is already associated with the particular SMF. In some scenarios, the AMF may select the SMF based on a determination that the SMF is prepared to handle the requested PDU session. For example, the requested PDU session may be associated with a particular DNN and/or S-NSSAI, and the SMF may be selected based on a determination that the SMF can manage a PDU session associated with the particular DNN and/or S-NSSAI.

At 1220, the network manages a context of the PDU session. After selecting the SMF at 1210, the AMF sends a PDU session context request to the SMF. The PDU session context request may include the PDU session establishment request received from the UE at 1210. The PDU session context request may be a Nsmf_PDUSession_CreateSM-Context Request and/or a Nsmf_PDUSession_UpdateSM-Context Request. The PDU session context request may indicate identifiers of the UE; the requested DN; and/or the requested network slice. Based on the PDU session context request, the SMF may retrieve subscription data from a UDM. The subscription data may be session management subscription data of the UE. The SMF may subscribe for updates to the subscription data, so that the PCF will send new information if the subscription data of the UE changes. After the subscription data of the UE is obtained, the SMF may transmit a PDU session context response to the AMG. The PDU session context response may be a Nsmf_P-DUSession_CreateSMContext Response and/or a Nsmf_P-DUSession_UpdateSMContext Response. The PDU session context response may include a session management context ID.

At 1230, secondary authorization/authentication may be performed, if necessary. The secondary authorization/authentication may involve the UE, the AMF, the SMF, and the DN. The SMF may access the DN via a Data Network Authentication, Authorization and Accounting (DN AAA) server.

At 1240, the network sets up a data path for uplink data associated with the PDU session. The SMF may select a PCF and establish a session management policy association. Based on the association, the PCF may provide an initial set of policy control and charging rules (PCC rules) for the PDU session. When targeting a particular PDU session, the PCF may indicate, to the SMF, a method for allocating an IP address to the PDU Session, a default charging method for the PDU session, an address of the corresponding charging entity, triggers for requesting new policies, etc. The PCF may also target a service data flow (SDF) comprising one or more PDU sessions. When targeting an SDF, the PCF may indicate, to the SMF, policies for applying QoS requirements, monitoring traffic (e.g., for charging purposes), and/or steering traffic (e.g., by using one or more particular N6 interfaces).

The SMF may determine and/or allocate an IP address for the PDU session. The SMF may select one or more UPFs (a single UPF in the example of FIG. 12) to handle the PDU session. The SMF may send an N4 session message to the selected UPF. The N4 session message may be an N4

Session Establishment Request and/or an N4 Session Modification Request. The N4 session message may include packet detection, enforcement, and reporting rules associated with the PDU session. In response, the UPF may acknowledge by sending an N4 session establishment response and/or an N4 session modification response.

The SMF may send PDU session management information to the AMF. The PDU session management information may be a Namf_Communication_N1N2MessageTransfer message. The PDU session management information may include the PDU session ID. The PDU session management information may be a NAS message. The PDU session management information may include N1 session management information and/or N2 session management information. The N1 session management information may include a PDU session establishment accept message. The PDU session establishment accept message may include tunneling endpoint information of the UPF and quality of service (QoS) information associated with the PDU session.

The AMF may send an N2 request to the AN. The N2 request may include the PDU session establishment accept message. Based on the N2 request, the AN may determine AN resources for the UE. The AN resources may be used by the UE to establish the PDU session, via the AN, with the DN. The AN may determine resources to be used for the PDU session and indicate the determined resources to the UE. The AN may send the PDU session establishment accept message to the UE. For example, the AN may perform an RRC reconfiguration of the UE. After the AN resources are set up, the AN may send an N2 request acknowledge to the AMF. The N2 request acknowledge may include N2 session management information, for example, the PDU session ID and tunneling endpoint information of the AN.

After the data path for uplink data is set up at 1240, the UE may optionally send uplink data associated with the PDU session. As shown in FIG. 12, the uplink data may be sent to a DN associated with the PDU session via the AN and the UPF.

At 1250, the network may update the PDU session context. The AMF may transmit a PDU session context update request to the SMF. The PDU session context update request may be a Nsmf_PDUSession_UpdateSMContext Request. The PDU session context update request may include the N2 session management information received from the AN. The SMF may acknowledge the PDU session context update. The acknowledgement may be a Nsmf_P-DUSession_UpdateSMContext Response. The acknowledgement may include a subscription requesting that SMF be notified of any UE mobility event. Based on the PDU session context update request, the SMF may send an N4 session message to the UPF. The N4 session message may be an N4 Session Modification Request. The N4 session message may include tunneling endpoint information of the AN. The N4 session message may include forwarding rules associated with the PDU session. In response, the UPF may acknowledge by sending an N4 session modification response.

After the UPF receives the tunneling endpoint information of the AN, the UPF may relay downlink data associated with the PDU session. As shown in FIG. 12, the downlink data may be received from a DN associated with the PDU session via the AN and the UPF.

Figure 13:
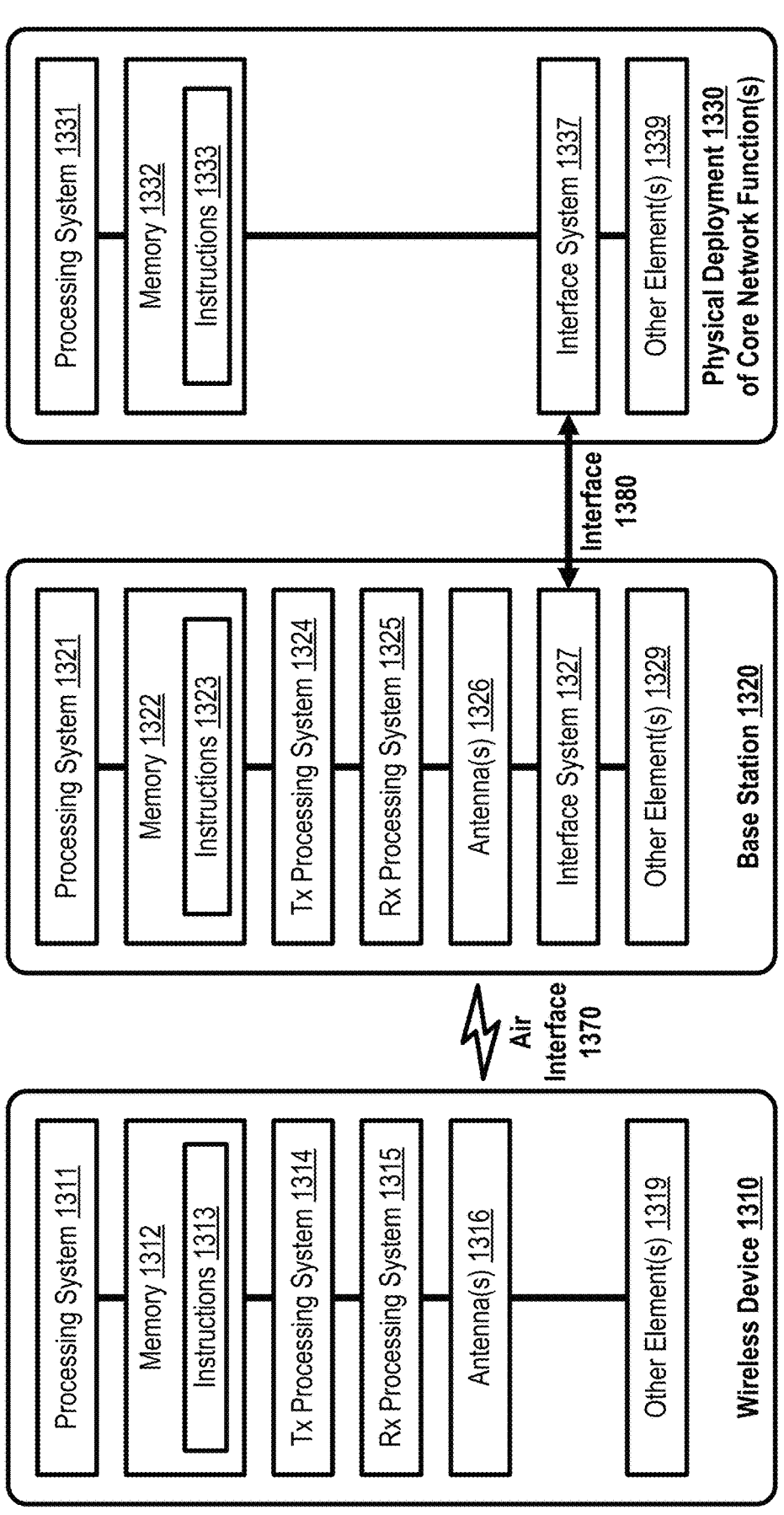
FIG. 13 illustrates examples of components of the elements in a communications network.

FIG. 13 illustrates examples of components of the elements in a communications network. FIG. 13 includes a wireless device 1310, a base station 1320, and a physical deployment of one or more network functions 1330 (henceforth "deployment 1330"). Any wireless device described in the present disclosure may have similar components and may be implemented in a similar manner as the wireless device 1310. Any other base station described in the present disclosure (or any portion thereof, depending on the architecture of the base station) may have similar components and may be implemented in a similar manner as the base station 1320. Any physical core network deployment in the present disclosure (or any portion thereof, depending on the architecture of the base station) may have similar components and may be implemented in a similar manner as the deployment 1330.

The wireless device 1310 may communicate with base station 1320 over an air interface 1370. The communication direction from wireless device 1310 to base station 1320 over air interface 1370 is known as uplink, and the communication direction from base station 1320 to wireless device 1310 over air interface 1370 is known as downlink. Downlink transmissions may be separated from uplink transmissions using FDD, TDD, and/or some combination of duplexing techniques. FIG. 13 shows a single wireless device 1310 and a single base station 1320, but it will be understood that wireless device 1310 may communicate with any number of base stations or other access network components over air interface 1370, and that base station 1320 may communicate with any number of wireless devices over air interface 1370.

The wireless device 1310 may comprise a processing system 1311 and a memory 1312. The memory 1312 may comprise one or more computer-readable media, for example, one or more non-transitory computer readable media. The memory 1312 may include instructions 1313. The processing system 1311 may process and/or execute instructions 1313. Processing and/or execution of instructions 1313 may cause wireless device 1310 and/or processing system 1311 to perform one or more functions or activities. The memory 1312 may include data (not shown). One of the functions or activities performed by processing system 1311 may be to store data in memory 1312 and/or retrieve previously-stored data from memory 1312. In an example, downlink data received from base station 1320 may be stored in memory 1312, and uplink data for transmission to base station 1320 may be retrieved from memory 1312. As illustrated in FIG. 13, the wireless device 1310 may communicate with base station 1320 using a transmission processing system 1314 and/or a reception processing system 1315. Alternatively, transmission processing system 1314 and reception processing system 1315 may be implemented as a single processing system, or both may be omitted and all processing in the wireless device 1310 may be performed by the processing system 1311. Although not shown in FIG. 13, transmission processing system 1314 and/or reception processing system 1315 may be coupled to a dedicated memory that is analogous to but separate from memory 1312, and comprises instructions that may be processed and/or executed to carry out one or more of their respective functionalities. The wireless device 1310 may comprise one or more antennas 1316 to access air interface 1370.

The wireless device 1310 may comprise one or more other elements 1319. The one or more other elements 1319 may comprise software and/or hardware that provide features and/or functionalities, for example, a speaker, a microphone, a keypad, a display, a touchpad, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, a global positioning sensor (GPS) and/or the like). The wireless device 1310 may receive user input data from and/or provide user output data to the one or more one or more other elements 1319. The one or more other elements 1319 may comprise a power source. The wireless device 1310 may receive power from the power source and may be configured to distribute the power to the other components in wireless device 1310. The power source may comprise one or more sources of power, for example, a battery, a solar cell, a fuel cell, or any combination thereof.

The wireless device 1310 may transmit uplink data to and/or receive downlink data from base station 1320 via air interface 1370. To perform the transmission and/or reception, one or more of the processing system 1311, transmission processing system 1314, and/or reception system 1315 may implement open systems interconnection (OSI) functionality. As an example, transmission processing system 1314 and/or reception system 1315 may perform layer 1 OSI functionality, and processing system 1311 may perform higher layer functionality. The wireless device 1310 may transmit and/or receive data over air interface 1370 using one or more antennas 1316. For scenarios where the one or more antennas 1316 include multiple antennas, the multiple antennas may be used to perform one or more multi-antenna techniques, such as spatial multiplexing (e.g., single-user multiple-input multiple output (MIMO) or multi-user MIMO), transmit/receive diversity, and/or beamforming.

The base station 1320 may comprise a processing system 1321 and a memory 1322. The memory 1322 may comprise one or more computer-readable media, for example, one or more non-transitory computer readable media. The memory 1322 may include instructions 1323. The processing system 1321 may process and/or execute instructions 1323. Processing and/or execution of instructions 1323 may cause base station 1320 and/or processing system 1321 to perform one or more functions or activities. The memory 1322 may include data (not shown). One of the functions or activities performed by processing system 1321 may be to store data in memory 1322 and/or retrieve previously-stored data from memory 1322. The base station 1320 may communicate with wireless device 1310 using a transmission processing system 1324 and a reception processing system 1325. Although not shown in FIG. 13, transmission processing system 1324 and/or reception processing system 1325 may be coupled to a dedicated memory that is analogous to but separate from memory 1322, and comprises instructions that may be processed and/or executed to carry out one or more of their respective functionalities. The wireless device 1320 may comprise one or more antennas 1326 to access air interface 1370.

The base station 1320 may transmit downlink data to and/or receive uplink data from wireless device 1310 via air interface 1370. To perform the transmission and/or reception, one or more of the processing system 1321, transmission processing system 1324, and/or reception system 1325 may implement OSI functionality. As an example, transmission processing system 1324 and/or reception system 1325 may perform layer 1 OSI functionality, and processing system 1321 may perform higher layer functionality. The base station 1320 may transmit and/or receive data over air interface 1370 using one or more antennas 1326. For scenarios where the one or more antennas 1326 include multiple antennas, the multiple antennas may be used to perform one or more multi-antenna techniques, such as spatial multiplexing (e.g., single-user multiple-input multiple output (MIMO) or multi-user MIMO), transmit/receive diversity, and/or beamforming.

The base station 1320 may comprise an interface system 1327. The interface system 1327 may communicate with one or more base stations and/or one or more elements of the core network via an interface 1380. The interface 1380 may be wired and/or wireless and interface system 1327 may include one or more components suitable for communicating via interface 1380. In FIG. 13, interface 1380 connects base station 1320 to a single deployment 1330, but it will be understood that wireless device 1310 may communicate with any number of base stations and/or CN deployments over interface 1380, and that deployment 1330 may communicate with any number of base stations and/or other CN deployments over interface 1380. The base station 1320 may comprise one or more other elements 1329 analogous to one or more of the one or more other elements 1319.

The deployment 1330 may comprise any number of portions of any number of instances of one or more network functions (NFs). The deployment 1330 may comprise a processing system 1331 and a memory 1332. The memory 1332 may comprise one or more computer-readable media, for example, one or more non-transitory computer readable media. The memory 1332 may include instructions 1333. The processing system 1331 may process and/or execute instructions 1333. Processing and/or execution of instructions 1333 may cause the deployment 1330 and/or processing system 1331 to perform one or more functions or activities. The memory 1332 may include data (not shown). One of the functions or activities performed by processing system 1331 may be to store data in memory 1332 and/or retrieve previously-stored data from memory 1332. The deployment 1330 may access the interface 1380 using an interface system 1337. The deployment 1330 may comprise one or more other elements 1339 analogous to one or more of the one or more other elements 1319.

One or more of the systems 1311, 1314, 1315, 1321, 1324, 1325, and/or 1331 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. One or more of the systems 1311, 1314, 1315, 1321, 1324, 1325, and/or 1331 may perform signal coding/processing, data processing, power control, input/output processing, and/or any other functionality that may enable wireless device 1310, base station 1320, and/or deployment 1330 to operate in a mobile communications system.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (e.g. hardware with a biological element) or a combination thereof, which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. It may be possible to implement modules using physical hardware that incorporates discrete or programmable analog, digital and/or quantum hardware. Examples of programmable hardware comprise computers, microcontrollers, microprocessors, DSPs, ASICs, FPGAs, and complex programmable logic devices (CPLDs). Computers, microcontrollers and microprocessors may be programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The mentioned technologies are often used in combination to achieve the result of a functional module.

The wireless device 1310, base station 1320, and/or deployment 1330 may implement timers and/or counters. A timer/counter may start at an initial value. As used herein, starting may comprise restarting. Once started, the timer/counter may run. Running of the timer/counter may be associated with an occurrence. When the occurrence occurs, the value of the timer/counter may change (for example, increment or decrement). The occurrence may be, for example, an exogenous event (for example, a reception of a signal, a measurement of a condition, etc.), an endogenous event (for example, a transmission of a signal, a calculation, a comparison, a performance of an action or a decision to so perform, etc.), or any combination thereof. In the case of a timer, the occurrence may be the passage of a particular amount of time. However, it will be understood that a timer may be described and/or implemented as a counter that counts the passage of a particular unit of time. A timer/counter may run in a direction of a final value until it reaches the final value. The reaching of the final value may be referred to as expiration of the timer/counter. The final value may be referred to as a threshold. A timer/counter may be paused, wherein the present value of the timer/counter is held, maintained, and/or carried over, even upon the occurrence of one or more occurrences that would otherwise cause the value of the timer/counter to change. The timer/counter may be un-paused or continued, wherein the value that was held, maintained, and/or carried over begins changing again when the one or more occurrence occur. A timer/counter may be set and/or reset. As used herein, setting may comprise resetting. When the timer/counter sets and/or resets, the value of the timer/counter may be set to the initial value. A timer/counter may be started and/or restarted. As used herein, starting may comprise restarting. In some embodiments, when the timer/counter restarts, the value of the timer/counter may be set to the initial value and the timer/counter may begin to run.

FIGS. 14A, 14B, 14C, and 14D illustrate various example arrangements of physical core network deployments, each having one or more network functions or portions thereof. The core network deployments comprise a deployment 1410, a deployment 1420, a deployment 1430, a deployment 1440, and/or a deployment 1450. Each deployment may be analogous to, for example, the deployment 1330 depicted in FIG. 13. In particular, each deployment may comprise a processing system for performing one or more functions or activities, memory for storing data and/or instructions, and an interface system for communicating with other network elements (for example, other core network deployments). Each deployment may comprise one or more network functions (NFs). The term NF may refer to a particular set of functionalities and/or one or more physical elements configured to perform those functionalities (e.g., a processing system and memory comprising instructions that, when executed by the processing system, cause the processing system to perform the functionalities). For example, in the present disclosure, when a network function is described as performing X, Y, and Z, it will be understood that this refers to the one or more physical elements configured to perform X, Y, and Z, no matter how or where the one or more physical elements are deployed. The term NF may refer to a network node, network element, and/or network device.

As will be discussed in greater detail below, there are many different types of NF and each type of NF may be associated with a different set of functionalities. A plurality of different NFs may be flexibly deployed at different locations (for example, in different physical core network deployments) or in a same location (for example, co-located in a same deployment). A single NF may be flexibly deployed at different locations (implemented using different physical core network deployments) or in a same location. Moreover, physical core network deployments may also implement one or more base stations, application functions (AFs), data networks (DNs), or any portions thereof. NFs may be implemented in many ways, including as network elements on dedicated or shared hardware, as software instances running on dedicated or shared hardware, or as virtualized functions instantiated on a platform (e.g., a cloud-based platform).

Figures 14A, 14B, 14C, 14D:
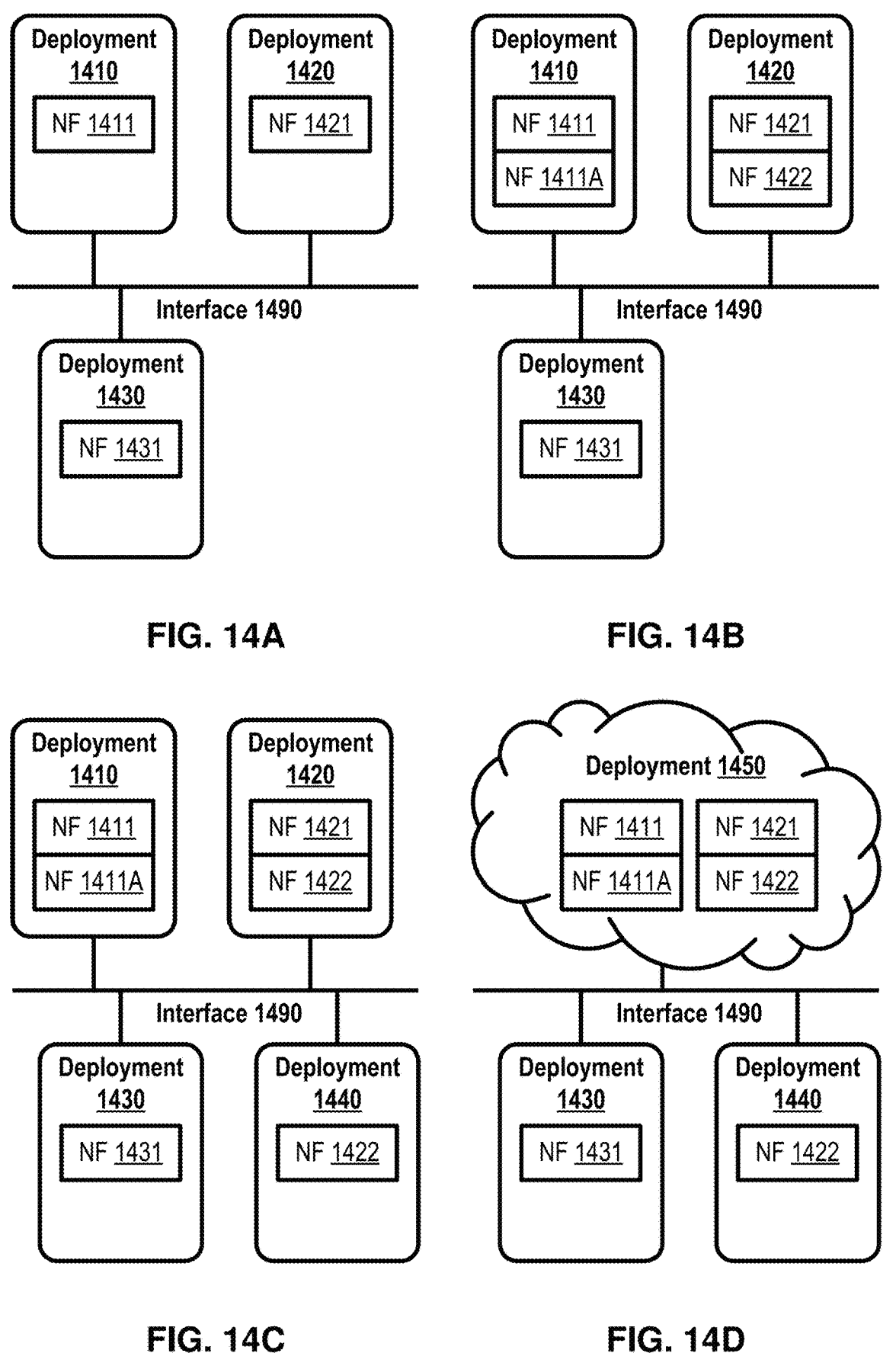

FIG. 14A illustrates an example arrangement of core network deployments in which each deployment comprises one network function. A deployment 1410 comprises an NF 1411, a deployment 1420 comprises an NF 1421, and a deployment 1430 comprises an NF 1431. The deployments 1410, 1420, 1430 communicate via an interface 1490. The deployments 1410, 1420, 1430 may have different physical locations with different signal propagation delays relative to other network elements. The diversity of physical locations of deployments 1410, 1420, 1430 may enable provision of services to a wide area with improved speed, coverage, security, and/or efficiency.

FIG. 14B illustrates an example arrangement wherein a single deployment comprises more than one NF. Unlike FIG. 14A, where each NF is deployed in a separate deployment, FIG. 14B illustrates multiple NFs in deployments 1410, 1420. In an example, deployments 1410, 1420 may implement a software-defined network (SDN) and/or a network function virtualization (NFV).

For example, deployment 1410 comprises an additional network function, NF 1411A. The NFs 1411, 1411A may consist of multiple instances of the same NF type, co-located at a same physical location within the same deployment 1410. The NFs 1411, 1411A may be implemented independently from one another (e.g., isolated and/or independently controlled). For example, the NFs 1411, 1411A may be associated with different network slices. A processing system and memory associated with the deployment 1410 may perform all of the functionalities associated with the NF 1411 in addition to all of the functionalities associated with the NF 1411A. In an example, NFs 1411, 1411A may be associated with different PLMNs, but deployment 1410, which implements NFs 1411, 1411A, may be owned and/or operated by a single entity.

Elsewhere in FIG. 14B, deployment 1420 comprises NF 1421 and an additional network function, NF 1422. The NFs 1421, 1422 may be different NF types. Similar to NFs 1411, 1411A, the NFs 1421, 1422 may be co-located within the same deployment 1420, but separately implemented. As an example, a first PLMN may own and/or operate deployment 1420 having NFs 1421, 1422. As another example, the first PLMN may implement NF 1421 and a second PLMN may obtain from the first PLMN (e.g., rent, lease, procure, etc.) at least a portion of the capabilities of deployment 1420 (e.g., processing power, data storage, etc.) in order to implement NF 1422. As yet another example, the deployment may be owned and/or operated by one or more third parties, and the first PLMN and/or second PLMN may procure respective portions of the capabilities of the deployment 1420. When multiple NFs are provided at a single deployment, networks may operate with greater speed, coverage, security, and/or efficiency.

FIG. 14C illustrates an example arrangement of core network deployments in which a single instance of an NF is implemented using a plurality of different deployments. In particular, a single instance of NF 1422 is implemented at deployments 1420, 1440. As an example, the functionality provided by NF 1422 may be implemented as a bundle or sequence of subservices. Each subservice may be implemented independently, for example, at a different deployment. Each subservices may be implemented in a different physical location. By distributing implementation of subservices of a single NF across different physical locations, the mobile communications network may operate with greater speed, coverage, security, and/or efficiency.

FIG. 14D illustrates an example arrangement of core network deployments in which one or more network functions are implemented using a data processing service. In FIG. 14D, NFs 1411, 1411A, 1421, 1422 are included in a deployment 1450 that is implemented as a data processing service. The deployment 1450 may comprise, for example, a cloud network and/or data center. The deployment 1450 may be owned and/or operated by a PLMN or by a non-PLMN third party. The NFs 1411, 1411A, 1421, 1422 that are implemented using the deployment 1450 may belong to the same PLMN or to different PLMNs. The PLMN(s) may obtain (e.g., rent, lease, procure, etc.) at least a portion of the capabilities of the deployment 1450 (e.g., processing power, data storage, etc.). By providing one or more NFs using a data processing service, the mobile communications network may operate with greater speed, coverage, security, and/or efficiency.

As shown in the figures, different network elements (e.g., NFs) may be located in different physical deployments, or co-located in a single physical deployment. It will be understood that in the present disclosure, the sending and receiving of messages among different network elements is not limited to inter-deployment transmission or intra-deployment transmission, unless explicitly indicated.

In an example, a deployment may be a 'black box' that is preconfigured with one or more NFs and preconfigured to communicate, in a prescribed manner, with other 'black box' deployments (e.g., via the interface 1490). Additionally or alternatively, a deployment may be configured to operate in accordance with open-source instructions (e.g., software) designed to implement NFs and communicate with other deployments in a transparent manner. The deployment may operate in accordance with open RAN (O-RAN) standards.

In an example, L2TP (L2TPv2 described in RFC 2661, L2TPv3 described in RFC 3931) started off as an extension to the PPP model by allowing L2 and PPP endpoints to reside on different devices interconnected by a packet-switched network. With L2TP, a user has an L2 connection to an access concentrator (e.g., modem bank, ADSL, DSLAM, etc.), and the concentrator then tunnels individual PPP frames to the Network Access Server (NAS).

Figure 15:
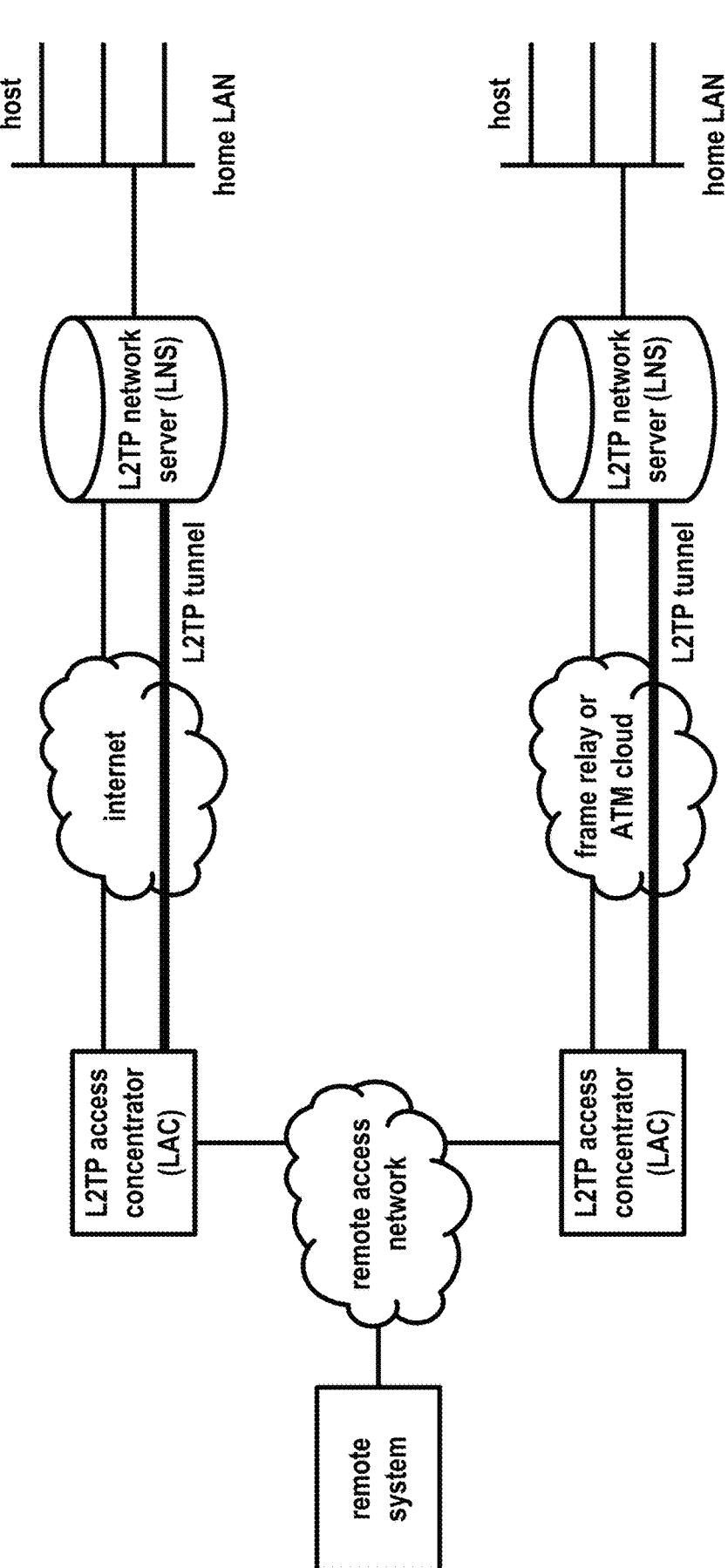
FIG. 15 illustrates an example communication system supporting a L2TP scenario.

L2TP may involve one or more concepts. In an example concept, an L2TP Access Concentrator (LAC) may be a node that acts as one side of an L2TP tunnel endpoint and may be a peer to the L2TP Network Server (LNS). The LAC may sit between an LNS and a remote system and forwards packets to and from each. In an example concept, an LNS may be node that acts as one side of an L2TP Tunnel endpoint and is a peer to the LAC. The LNS may be a logical termination point of a PPP session that is being tunneled from the remote system by the LAC. In an example concept, a Network Access Server (NAS) may be a device providing local network access to users across a remote access network (e.g., PSTN). A NAS may also serve as a LAC, LNS or both. FIG. 15 illustrates an example communication system, which comprises a typical L2TP scenario to tunnel PPP frames between the remote system and an LNS located at a home LAN. The remote system may initiate a PPP connection across the PSTN cloud to a LAC. The LAC may tunnel the PPP connection across the internet/frame relay/ATM cloud to an LNS, whereby access to a Home LAN may be obtained.

Figure 16A:
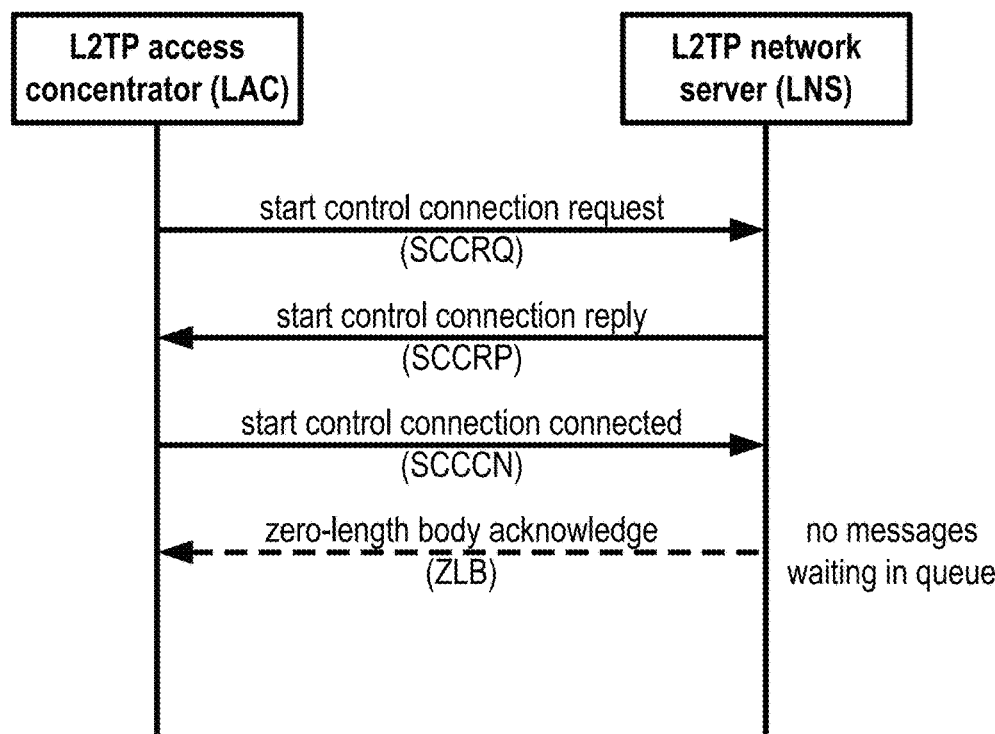
FIG. 16A illustrates an example call flow for L2TP Control Connection Setup procedure.
Figure 16B:
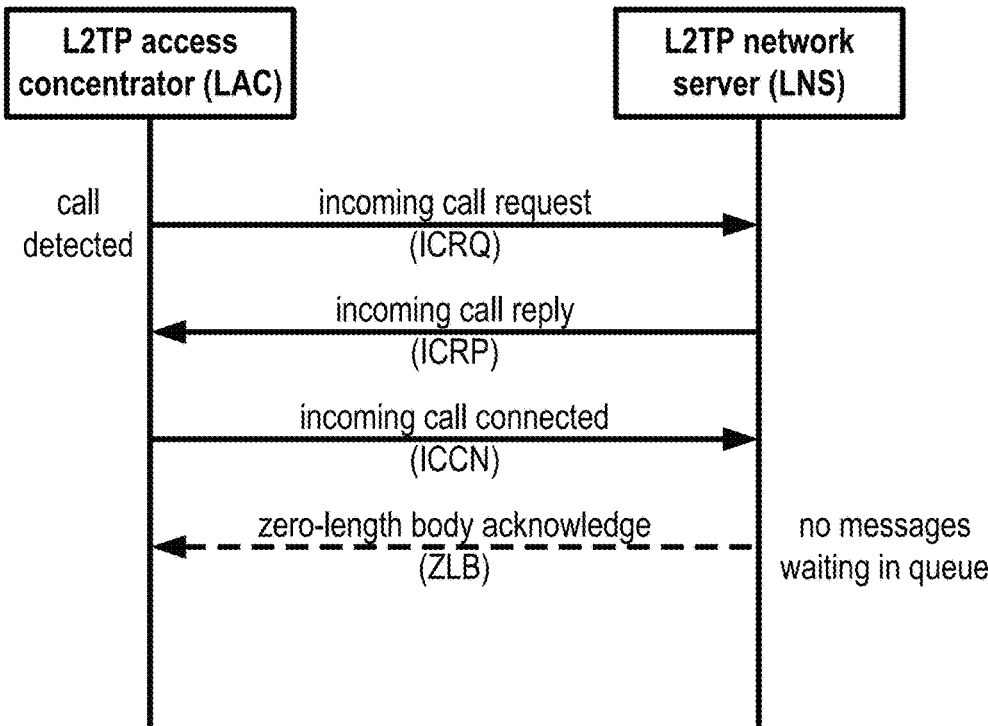
FIG. 16B illustrates an example call flow for L2TP Session Establishment.

In an example, L2TP control connection (L2TP Tunnel) setup messages may comprise: Start-Control-Connection-Request (SCCRQ), Start-Control-Connection-Reply (SC-CRP), Start-Control-Connection-Connected (SCCCN), and/or Zero-Length Body Acknowledge (ZLB Ack). The control connection may be teardown with Stop-Control-Connection-Notification (StopCCN) and ZLB Ack messages. FIG. 16A illustrates an example call flow for L2TP Control Connection Setup procedure. In an example, after control connection is started, the tunnel authentication may take place and the tunnel may be established. The L2TP session establishment phase may occur with message exchanges, for example, Incoming-Call-Request (ICRQ), Incoming-Call-Reply (ICRP), Incoming-Call-Connected (ICCN), and/or ZLB Ack messages as described in FIG. 16B. The session connection may be teardown with Call-Disconnect-Notify (CDN) and ZLB Ack messages. Finally, the LNS may trigger normal AAA or PPP authentication for the RADIUS server.

With 5G, more focus is on the industrial applications of mobile networks, and the use of L2TP and its practice may be expected to become even more common. The current ideology is that L2TP (mostly version 2/L2TPv2) may be still prevalent in the existing operator networks (by reusing existing infrastructure from old dial-up connectivity), where it may be possible for the UE to connect directly to the corporate network. In other words, this protocol (e.g., L2TPv2) is probably still used by many operators (in their LNS) to establish secured connection from the UE all the way into a third-party network, for example a corporate network. In addition, with mode corporate customers (like manufacturing, IoT, etc.), the need for L2TP (and similar) may be believed to increase further.

Figure 17:
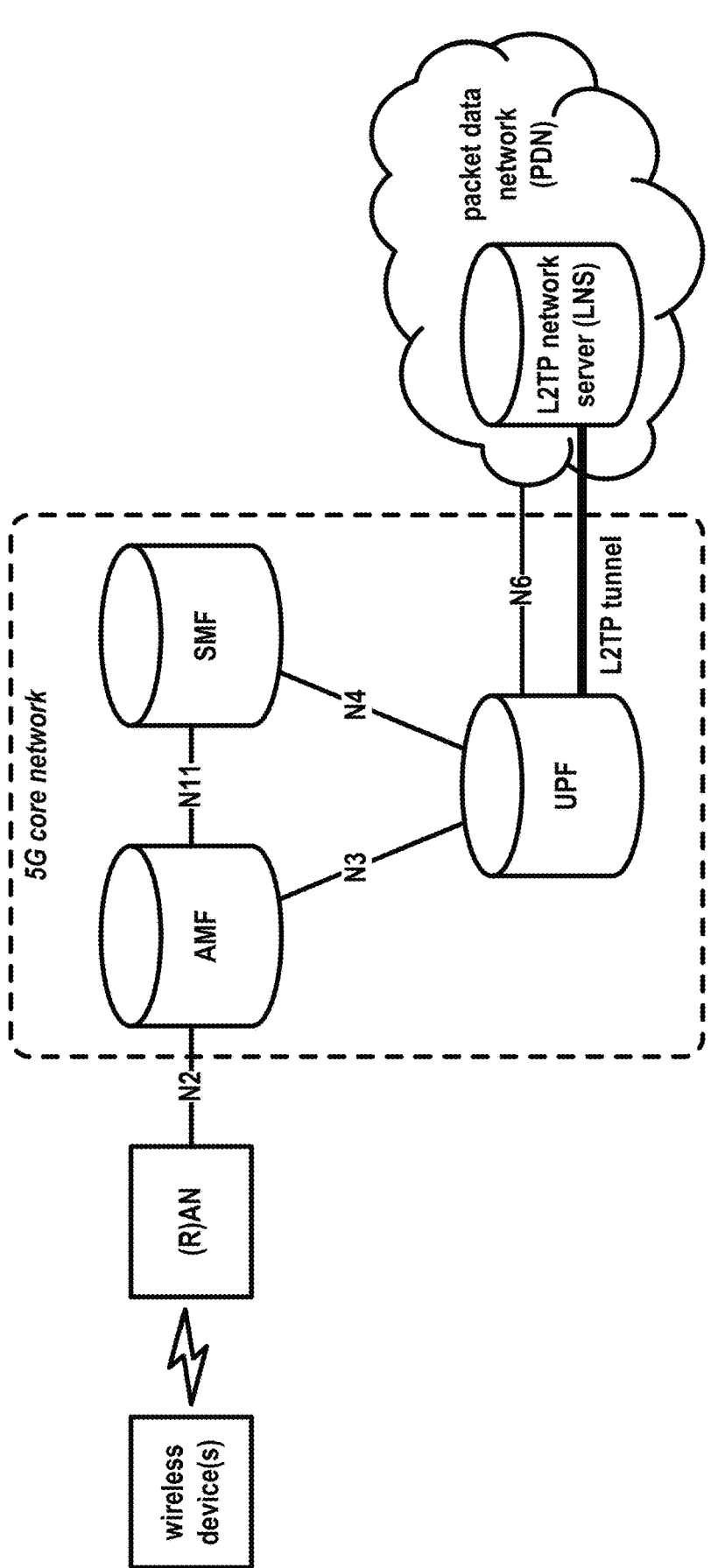
FIG. 17 illustrates an example network architecture of L2TP Tunnels with 5GC.

A scenario of using L2TP with 5GC may be illustrated in FIG. 17. PFCP (described in 3GPP TS 29.244) may be used on the N4 interface between SMF and UPF to configure the rules of packet detection, forwarding action, QoS enforcement, usage report and buffering for each PDU session.

After CP/UP separation, it may be difficult for the UP function to get necessary parameters (e.g., LNS IPs, username, password, etc.) to set up the L2TP tunnel to the third-party server. This information might be pre-configured on the CP, or the CP might receive it from an external server as described in RFC 2865.

In an example, there may be one or more key issues to be resolved. One example key issue may be that what information is required to be communicated from the CP to the UP to setup a L2TP control connection (an L2TP tunnel) and L2TP sessions (one L2TP session per PDU session/PDN connection) from the UP function to an LNS and how this information should be communicated considering the current security/authentication aspects of L2TP. One example key issue may be that whether and what are the impacts on CUPS interface if different versions of L2TP (L2TPv2/L2TPv3) is used to establishing L2TP control connection and sessions in the 5GS/EPS. One example key issue may be that whether and what enhancements (if any) are required to the PFCP protocol to be able to send this information, considering security aspects. One example key issue may be that how can the UP inform the CP in the 5GS about the failures related to an existing L2TP tunnel, and how L2TP sessions associated with the tunnel are affected. One example key issue may be that how to handle the use cases when the LNS assigns the UE IP address. One example key issue may be that whether and how to handle the possibility of multiple CP functions (e.g., pertaining to a PGW/SMF SET) creating L2TP sessions (corresponding to PDU sessions/PDN connections) over a L2TP tunnel, e.g., the L2TP tunnel is shared by multiple PDU sessions/PDN connections but controlled by different CP functions.

In an example, a UP Function can setup L2TP tunnel directly towards an L2TP server, upon instruction from the CP Function over Sx/N4 interface. In order to determine that the UP Function performs L2TP tunnel setup, feature negotiation on L2TP tunnel support may be needed, e.g., exchange L2TP tunnel support during PFCP Association Setup procedure.

To instruct the UP Function to setup L2TP tunnel towards the L2TP server, the CP function may take one or more actions. In an example action, the CP may provide instruction in the PFCP Session Establishment Request to request the UP Function to setup L2TP tunnel. Parameters for L2TP tunnel (e.g., L2TP version, LNS address, username/password, etc.) may be carried in the L2TP setup instruction. In an example action, the CP may provide instruction in the PFCP Session Deletion Request to request the UP Function to release L2TP tunnel. Upon instruction from the CP Function, the UP Function may take one or more actions. In an example action, according to the instruction from the CP Function, the UP may request the L2TP server to setup/release L2TP. In an example action, the UP may report the result of L2TP tunnel setup/release in PFCP Session Establishment/Deletion Response.

In an example, one L2TP tunnel between the UP Function and the L2TP server may be shared by multiple UEs requesting PDN connection/PDU session using the same parameter (e.g., APN/DNN and S-NSSAI). In this case, the UP Function may request the L2TP server to setup different L2TP session for each PDN connection/PDU session.

In an example, before the CP Function requests the UP Function to setup L2TP tunnel towards the L2TP server, the CP Function may need to know the L2TP support in the UP Function.

Figure 18:
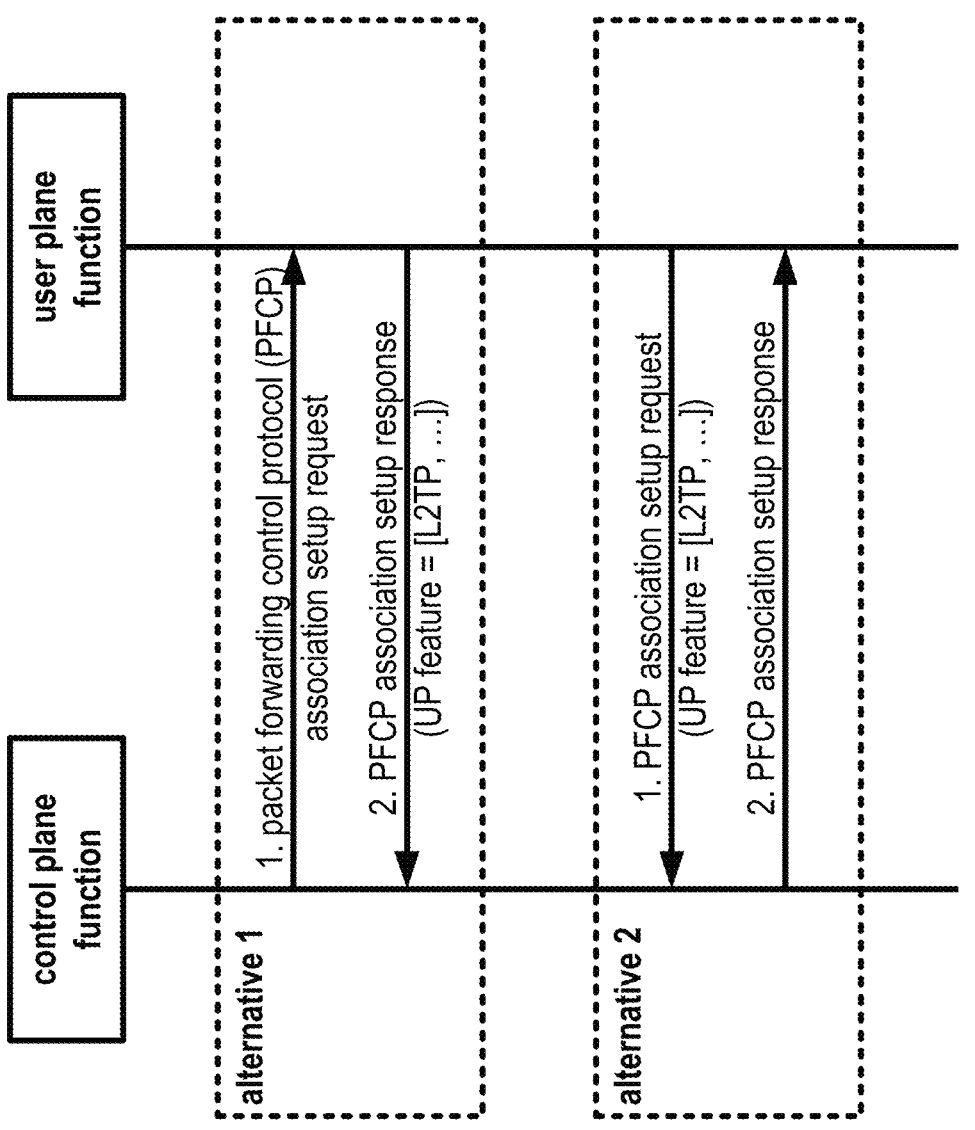
FIG. 18 illustrates an example call flow for L2TP support negotiation during a PFCP Association Setup procedure.

FIG. 18 illustrates an example call flow for L2TP support negotiation during a PFCP Association Setup procedure, which may comprise two example alternatives. For alternative 1, the UP Function may indicate L2TP support in PFCP Association Setup Response. In an example, the CP Function may send PFCP Association Setup Request to the UP Function. In an example, the UP Function may send PFCP Association Setup Response to the CP Function. Within the PFCP Association Setup Response message, the UP Function Features may be present and may indicate the L2TP support. For alternative 2, the UP Function may indicate L2TP support in PFCP Association Setup Request. In an example, the UP Function may send PFCP Association Setup Request to the CP Function. Within the PFCP Association Setup Request message, the UP Function Features may be present and may indicate the L2TP support. In an example, the CP Function may send PFCP Association Setup Response to the UP Function.

In an example, when the CP Function receives PDN connection/PDU session establishment request, if L2TP tunnel is determined to support the PDN connection/PDU session, the CP Function may request the UP Function to setup L2TP tunnel towards the L2TP server.

Figure 19A:
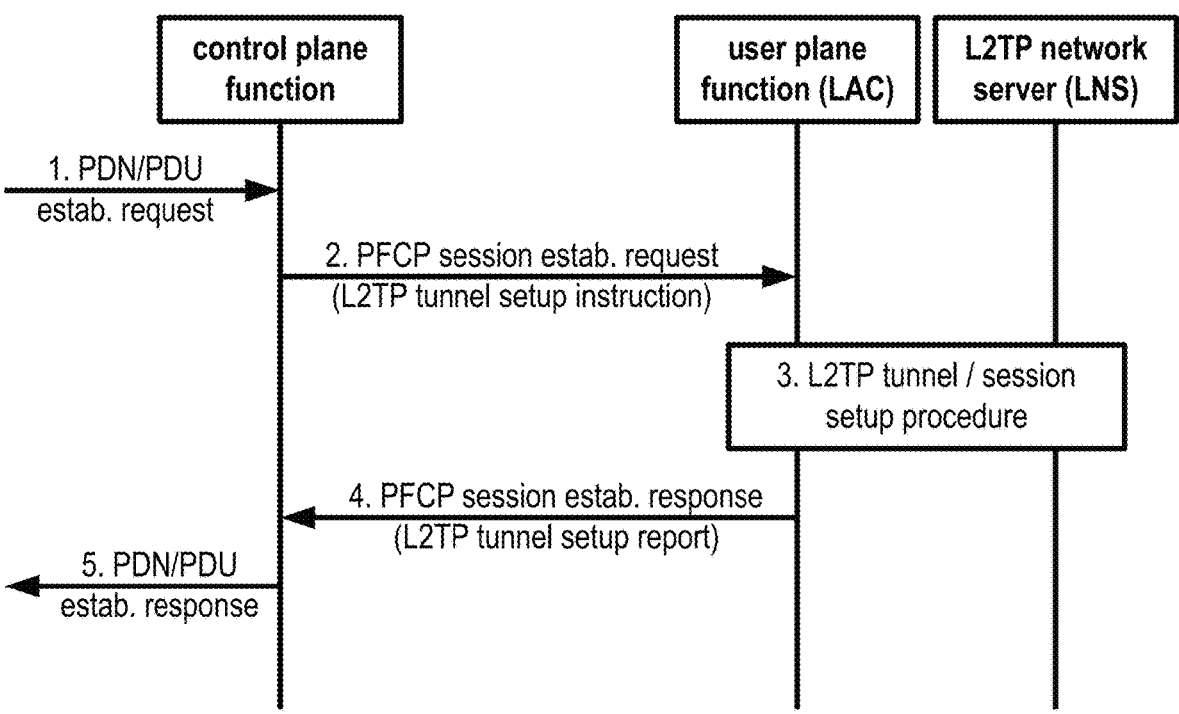
FIG. 19A illustrates an example call flow for L2TP tunnel setup during PFCP Session Establishment procedure.

FIG. 19A illustrates an example call flow for L2TP tunnel setup during PFCP Session Establishment procedure. In an example, the CP Function may receive PDN Connection Establishment Request/PDU Session Establishment Request from an SGW-C/AMF. In an example, the CP Function may determine L2TP tunnel is required for the PDN connection/PDU session based on local configuration (e.g., configuration per APN/DNN/S-NSSAI). In an example, the CP Function may send PFCP Session Establishment Request to the UP Function. An L2TP Tunnel Setup Instruction IE may be included in the request message to provide detail parameters (e.g., L2TP version, LNS address, username/password for authentication) for L2TP tunnel setup. In an example, as one L2TP tunnel may be shared by multiple UEs requesting PDN connection/PDU session with the same APN/DNN and S-NSSAI, the CP Function may provide L2TP Tunnel ID of an existing L2TP tunnel in the L2TP Tunnel Setup Instruction IE to the UP Function. If an existing L2TP Tunnel ID is provided, the UP Function may only setup new L2TP session within the existing L2TP tunnel. In an example, the UP Function may act as LAC requests the LNS to setup L2TP tunnel and L2TP session. If the L2TP Tunnel Setup Instruction indicates an existing L2TP Tunnel ID, the UP Function may only request new L2TP session setup within the existing L2TP tunnel. Otherwise, the UP Function may request L2TP tunnel and L2TP session setup. In an example, the UP Function may send PFCP Session Establishment Response to the CP Function, carrying the L2TP Tunnel Setup Report IE. The L2TP Tunnel Setup Report IE may include the following information: the success/failure of L2TP tunnel setup, L2TP Tunnel ID, L2TP Session ID, etc. In an example, the CP Function may send PDN Connection Establishment Response/PDU Session Establishment Response to the SGW-C/AMF.

In an example, when the PDN connection/PDU session is to be released, the CP Function may request the UP Function to release the L2TP tunnel/L2TP session.

Figure 19B:
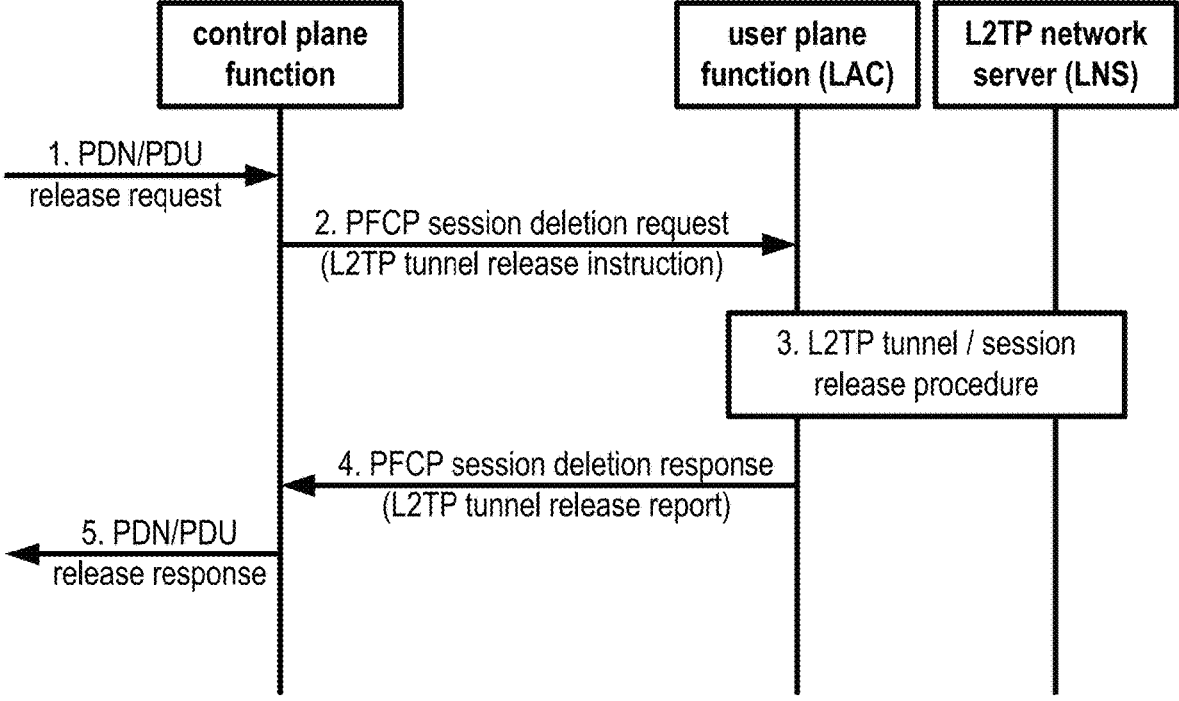
FIG. 19B illustrates an example call flow for L2TP tunnel release during PFCP Session Deletion procedure.

FIG. 19B illustrates an example call flow for L2TP tunnel release during PFCP Session Deletion procedure. In an example, the CP Function may receive PDN Connection Release Request/PDU Session Release Request from the SGW-C/AMF. In an example, the CP Function may send PFCP Session Deletion Request to the UP Function. An L2TP Tunnel Release Instruction IE may be included in the request message to provide detail parameters (e.g., L2TP Tunnel ID, L2TP Session ID, etc.) for L2TP tunnel release. In an example, the UP Function may act as LAC requests the LNS to release L2TP tunnel and L2TP session. In an example, if the L2TP Tunnel Release Instruction indicates an L2TP Tunnel ID and L2TP Session ID, the UP Function may request the LNS to release the indicated L2TP session within the indicated L2TP tunnel. If only L2TP tunnel ID is provided, the UP Function may request the LNS to release the indicated L2TP tunnel. In an example, the UP Function may send PFCP Session Deletion Response to the CP Function, carry the L2TP Tunnel Release Report IE. The L2TP Tunnel Release Report IE may include the following information: the success/failure of L2TP tunnel/session release, etc. In an example, the CP Function may send PDN Connection Release Response/PDU Session Release Response to the SGW-C/AMF.

In an example, the Sx/N4 interface may need to be enhanced to provide L2TP tunnel setup/release instruction to the UP Function. The behaviour of CP Function and UP Function may also need update. In an example, any IP packets between the UE and the L2TP server may be directly forwarded between the UP Function and the L2TP server, e.g., no need for additional forwarding between the CP Function and the UP Function.

In existing technologies, an SMF may facilitate a PDU session that is associated with a tunnel and/or associated with a UPF that is capable of supporting the tunnel. For example, the SMF may select a UPF that is associated with a tunnel and/or supports the tunneling capability. The tunnel may be, for example, an L2TP tunnel and the selected UPF may act as, for example, an L2TP access concentrator (LAC). In an example, during a PFCP association setup procedure, a UPF may indicate to an SMF whether the UPF is associated with a tunnel. If the UPF indicates that it is not associated with a tunnel, then the SMF may, for example, begin a second PFCP association setup procedure with a second UPF, a third procedure with a third UPF, etc., until a tunnel or tunneling-capable UPF is identified and selected. Implementation of existing technologies (e.g., based on trial-and-error methodologies) may result in increased signaling overhead within the network (e.g., caused by the commencement of multiple setup procedures with multiple UPFs) and/or increased delay experienced by the user (e.g., waiting for PDU session setup).

Example embodiments of the present disclosure implement an enhanced mechanism to select a UPF that supports a tunnel. Example embodiments of the present disclosure implement an enhanced mechanism to select a UPF based on a tunnel capability of a UPF. The selection may be at per node level. In an example embodiment of the present disclosure, a first control plane function may receive, from at least one UPF, a first message comprising a tunnel capability of the at least one UPF. The first control plane function may be, for example, an SMF, NRF, OAM, AAA, UDR, or other network function that provides control plane services. In an example, the first control plane function may receive a second message from a second control plane function. The second control plane function may be, for example, an SMF, NRF, OAM, AAA, UDR, or other network function that provides control plane services. In an example, the second message may comprise a tunnel address of a tunnel. In an example, the second message may comprise a tunnel indication requesting discovery of a UPF that supports a tunnel. In an example, based on the tunnel capability of the at least one UPF and the second message, the first control plane function may determine a UPF for the tunnel. In an example, the first control plane function may send an identity of the UPF to the second control function.

In an example, a capability may comprise an ability, a capacity, and/or a functionality, for example, an ability to provide, support, and/or perform a service and/or function. The capability may be an inherent capability (for example, pre-programmed or hard-wired to the network element) and/or a configured capability (for example, configured, enabled, and/or controlled by another network element). The capability may be associated with a particular network element (e.g., a wireless device, base station, and/or network function). For example, the network element may possess and/or be characterized by the capability. For example, the capability may distinguish the network from other similar network elements and/or similarly-situated network elements which are not able to provide, support, and/or perform a particular service and/or function (e.g., a first wireless device may possess a capability which is not possessed by other wireless devices). In an example, a network may be configured to accommodate a diversity of network elements having different respective capabilities. In an example, a network may determine the capabilities of diverse network elements and provide different services to network elements based on their differing capabilities.

Figure 20:
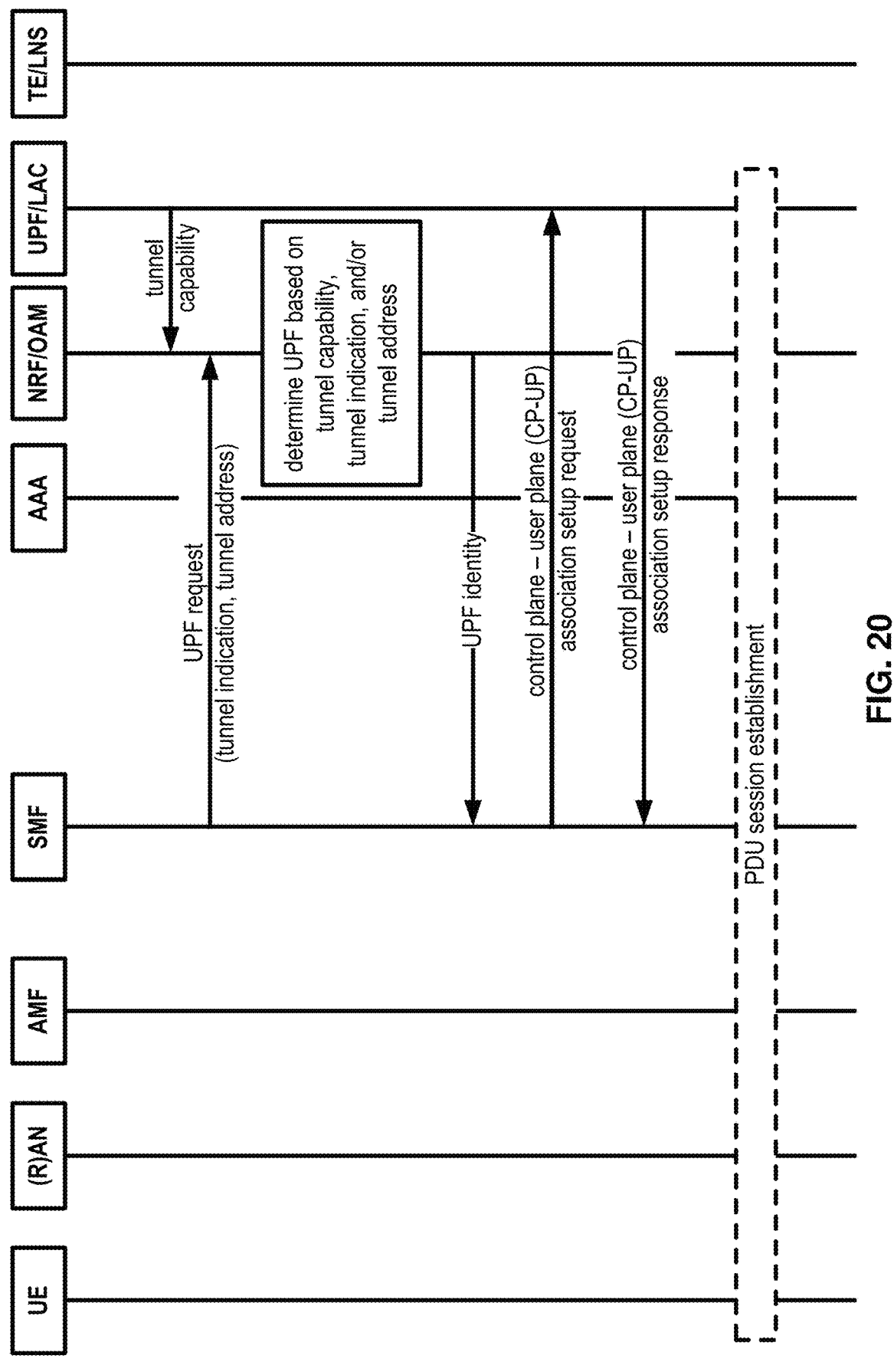
FIG. 20 is an example call flow as per an aspect of an embodiment of the present disclosure.

FIG. 20 is an example call flow which may comprise one or more actions. In an example, a first control plane function may receive a first message from at least one user plane function (UPF), the first message may comprise a tunnel capability of the at least one UPF. In an example, the first message may comprise established tunnel information of at least one established tunnel in the at least one UPF. In an example, the first control plane function may comprise at least one of: an NRF; an OAM; an AAA; and/or a UDR. In an example, the tunnel capability of the at least one UPF may comprise at least one of: supporting a L2TP tunnel version 2; supporting a L2TP tunnel version 3; supporting a generic routing encapsulation (GRE) tunnel; supporting an IP-in-IP tunnel; and/or supporting a GPRS tunnelling protocol (GTP) tunnel. In an example, the established tunnel information may comprise at least one of: a first parameter indicating a tunnel type; a second parameter indicating a tunnel version; a third parameter indicating a tunnel endpoint address; a fourth parameter indicating number of sessions associated with at least one established tunnel; and/or a fifth parameter indicating supported maximum number of sessions associated with the at least one established tunnel. In an example, the tunnel type may indicate a type of a tunnel (e.g., an established tunnel). For example, the tunnel type may comprise at least one of: an L2TP tunnel; a GRE tunnel; an IP-in-IP tunnel; and/or a GTP tunnel. In an example, the tunnel version may indicate a version of a tunnel (e.g., an established tunnel). For example, the tunnel version may comprise a L2TP tunnel version (e.g., L2TP version 2, L2TP version 3). In an example, the tunnel endpoint address may indicate an address of the tunnel endpoint. For example, the tunnel endpoint address may comprise an address of an L2TP Access Concentrator (LAC). For example, the tunnel endpoint address may comprise an address of an L2TP network server (LNS). For example, the tunnel endpoint address may comprise an address of tunnel endpoint of a GRE tunnel, an IP-in-IP tunnel; and/or a GTP tunnel. In an example, a number of sessions associated with at least one established tunnel may indicate how many sessions associated with the at least one established tunnel. For example, a number of sessions associated with at least one established tunnel may comprise a number of L2TP sessions associated with at least one established L2TP tunnel. For example, a number of sessions associated with at least one established tunnel may comprise a number of PDU sessions/PDN connections associated with at least one established L2TP tunnel, established GRE tunnel, established IP-in-IP tunnel and/or established GTP tunnel. In an example, the supported maximum number of sessions associated with the at least one established tunnel may indicate that the at least one established tunnel may only support limited/maximum number of sessions (e.g. L2TP session, PDU session, and/or PDN connection). In an example, the first message may comprise a UPFinfo parameter, wherein the UPFinfo parameter may comprise the tunnel capability and/or the established tunnel information.

FIG. 21 is an example diagram depicting a UPFinfo parameter as per an aspect of an embodiment of the present disclosure.

In an example, an NRF may receive a Nnrf_NFManagement_NFRegister Request message from a UPF, the Nnrf_NFManagement_NFRegister Request message may comprise a L2TP capability of the UPF and/or established L2TP tunnel information of at least one established L2TP tunnel. In an example, the Nnrf_NFManagement_NFRegister Request message may comprise NF type of the UPF, the FQDN and/or IP address of the UPF for N4 interface. The L2TP capability of the UPF may indicate the UPF may support L2TP version 2, L2TP version 3, and/or both. The established L2TP tunnel information of the at least one established L2TP tunnel may comprise at least one of: a parameter indicating L2TP tunnel version; an address of an L2TP Access Concentrator (LAC); an address of an L2TP network server (LNS); number of L2TP session associated with the at least one established L2TP tunnel; number of PDU session associated with the at least one established L2TP tunnel; number of PDN connection associated with the at least one established L2TP tunnel; supported maximum number of the L2TP session associated with the at least one established L2TP tunnel; supported maximum number of the PDU session associated with the at least one established L2TP tunnel; and/or supported maximum number of the PDN connection associated with the at least one established L2TP tunnel.

In an example, the first control plane function may receive a second message from a second control plane function. The second message may indicate requesting a UPF support a tunnel. In an example, the second message may comprise at least one of: a tunnel type of a tunnel; a tunnel address of the tunnel; and/or a tunnel indication requesting discovery of a UPF that supports the tunnel. In an example, the tunnel type may indicate a type of the tunnel. The tunnel type may comprise at least one of: an L2TP tunnel version 2; an L2TP tunnel version 3; a GRE tunnel; an IP-in-IP tunnel; and/or a GTP tunnel. In an example, the tunnel address may indicate an address of the tunnel endpoint. For example, the tunnel address may comprise an address of an L2TP Access Concentrator (LAC). For example, the tunnel endpoint address may comprise an address of an L2TP network server (LNS). For example, the tunnel address may comprise an address of tunnel endpoint of a GRE tunnel, IP-in-IP tunnel; and/or GTP tunnel.

In an example, the NRF may receive a Nnrf_NFDiscovery_Request message from a session management function (SMF), the Nnrf_NFDiscovery_Request message may indicate requesting selecting a UPF supporting a L2TP tunnel. The Nnrf_NFDiscovery_Request message may comprise at least one of: an L2TP tunnel type (e.g., L2TP version 3), an LNS address, and/or an L2TP Tunnel Indication requesting discovery of a UPF that supports the L2TP tunnel.

In an example, based on the first message and the second message, the first control plane function may determine a UPF for the tunnel. For example, based on the tunnel capability of the at least one UPF, the tunnel type, the tunnel address; and/or the tunnel indication, the first control plane function may determine a UPF for the tunnel. For example, based on the message received from the UPF and/or the message received from the SMF, the NRF may determine a UPF for the tunnel. For example, a UPF may indicate to an NRF that the UPF supports a L2TP tunnel version 2 and/or L2TP tunnel version 3, an SMF may request the NRF to select a UPF which supports a L2TP tunnel, based on above information, the SMF may determine the UPF to support the L2TP tunnel. For example, a UPF 1 may indicate to an NRF that the UPF 1 supports a L2TP tunnel version 2 and/or L2TP tunnel version 3, the UPF 2 may indicate to the UPF that that the UPF 2 supports a L2TP tunnel version 2, and the UPF 2 may indicate that the UPF 2 has an established L2TP tunnel with LNS 2; the SMF may request the NRF to select a UPF which supports a L2TP tunnel and has an established L2TP tunnel with LNS 2, based on above information, the SMF may determine the UPF 2 to support the L2TP tunnel.

In an example, the first control plane function may send an identity of the UPF to the second control function. In an example, the identity of the UPF may comprise an IP address (e.g., IPv4 address, and/or IPv6 prefix). In an example, the identity of the UPF may comprise a fully qualified domain name (FQDN). In an example, the identity of the UPF may comprise a node identity. For example, the NRF may send a UPF identity to the SMF.

In an example, in response to receiving the identity of the UPF, the second control plane function may send a CP-UP association request message to the UPF. For example, the SMF may send a PFCP association setup request message to the UPF requesting setup a PFCP association, the PFCP association setup request message may comprise one or more information element/parameters as described in FIG. 18. In an example, the UPF may send a response message (e.g., PFCP association setup response) to the second control plane function (e.g., SMF), wherein the PFCP association setup response may comprise one or more information element/parameters as described in FIG. 18. There may be PDU session establishment procedure after the PFCP association setup procedure.

FIG. 22 is an example diagram depicting the procedures of a first control plane function (CPF) as per an aspect of an embodiment of the present disclosure.

The first CPF may receive, from at least one UPF, a first message comprising a tunnel capability of the at least one UPF.

The first CPF may receive, from a second CPF, a second message comprising a tunnel address of a tunnel; and a tunnel indication requesting discovery of a UPF that supports the tunnel.

The first CPF may determine, based on the first message and the second message, a UPF for the tunnel.

The first CPF may send, to the second CPF, an identity of the UPF.

In existing technologies, an SMF may select a UPF to facilitate, for example, a PDU session. The PDU session may be requested, for example, by a wireless device that requires a tunnel connection with a tunnel endpoint (e.g., an L2TP Network Server (LNS)). In an example, the SMF may select a UPF for the PDU session in accordance with existing techniques. In an example, establishment of the PDU session may fail if the selected UPF does not have the tunnel connection and/or does not support a tunneling capability. Implementation of existing technologies (e.g., based on trial-and-error methodologies) may result in increased signaling overhead within the network and/or increased delay experienced by the user (e.g., caused by failure of PDU session establishment).

Example embodiments of the present disclosure implement an enhanced mechanism to select a UPF that supports a tunnel (e.g., a tunnel associated with a particular tunnel endpoint and/or particular network server). Example embodiments of the present disclosure implement an enhanced mechanism to select a UPF based on dynamic established tunnel information of a UPF. In an example embodiment of the present disclosure, a first control plane function may receive, from at least one UPF, a first message comprising established tunnel information of at least one established tunnel. The tunnel endpoint may be associated with a particular tunnel endpoint and/or a particular network server (e.g., an LNS). The first control plane function may be, for example, an SMF, NRF, OAM, AAA, UDR, or other network function that provides control plane services. In an example, the first control plane function may receive a second message from a second control plane function. The second control plane function may be, for example, an SMF, NRF, OAM, AAA, UDR, or other network function that provides control plane services. In an example, the second message may comprise a tunnel address of a tunnel. In an example, the second message may comprise a tunnel indication requesting discovery of a UPF that supports a tunnel. In an example, based on established tunnel information of at least one established tunnel and the second message, the first control plane function may determine a UPF for the tunnel. In an example, the first control plane function may send an identity of the UPF to the second control function.

Figure 23:
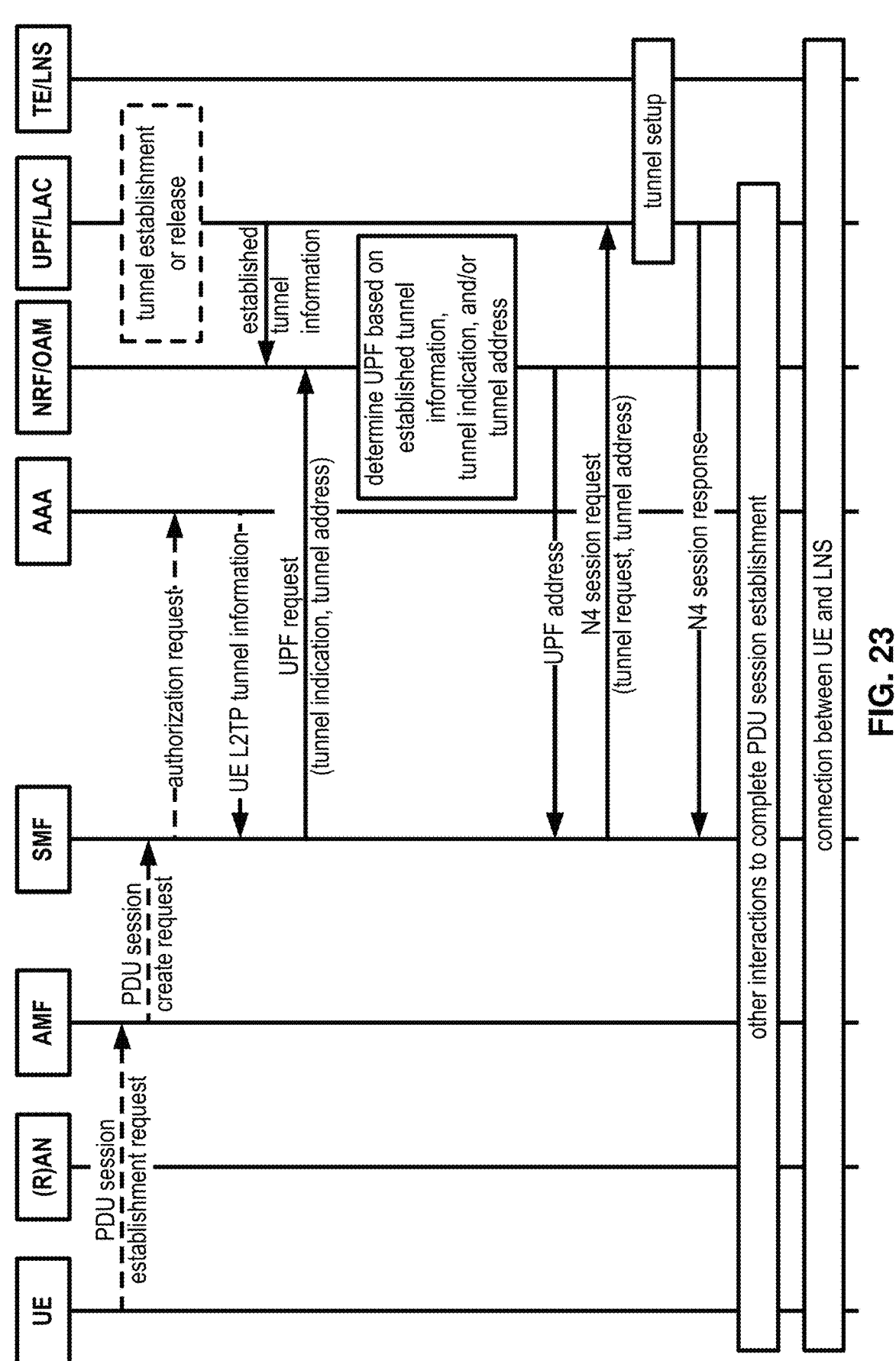
FIG. 23 is an example call flow as per an aspect of an embodiment of the present disclosure.

FIG. 23 is an example call flow which may comprise one or more actions. In an example, based on requests from one or more control plane functions, a UPF may establish and/or release one or more tunnels with one or more tunnel endpoints. For example, one or more SMF may request a UPF/LAC to establish and/or release one or more L2TP tunnels with one or more LNSs. In an example, a first control plane function may receive a first message from at least one user plane function (UPF), the first message may comprise established tunnel information of at least one established tunnel in the at least one UPF. In an example, the first message may comprise a tunnel capability of the at least one UPF. In an example, the first control plane function may comprise at least one of: an NRF; an OAM; an AAA; and/or a UDR. In an example, the tunnel capability of the at least one UPF may comprise at least one of: supporting a L2TP tunnel version 2; supporting a L2TP tunnel version 3; supporting a GRE tunnel; supporting an IP-in-IP tunnel; and/or supporting a GTP tunnel. In an example, the established tunnel information may comprise at least one of: a first parameter indicating a tunnel type; a second parameter indicating a tunnel version; a third parameter indicating a tunnel endpoint address; a fourth parameter indicating number of sessions associated with at least one established tunnel; a fifth parameter indicating supported maximum number of sessions associated with the at least one established tunnel; and/or a sixth parameter indicating a tunnel load condition. In an example, the tunnel type may indicate a type of a tunnel (e.g., an established tunnel). For example, the tunnel type may comprise at least one of: an L2TP tunnel; a GRE tunnel; an IP-in-IP tunnel; and/or a GTP tunnel. In an example, the tunnel version may indicate a version of a tunnel (e.g., an established tunnel). For example, the tunnel version may comprise a L2TP tunnel version (e.g., L2TP version 2, L2TP version 3). In an example, the tunnel endpoint address may indicate an address of the tunnel endpoint. For example, the tunnel endpoint address may comprise an address of an L2TP Access Concentrator (LAC). For example, the tunnel endpoint address may comprise an address of an L2TP network server (LNS). For example, the tunnel endpoint address may comprise an address of tunnel endpoint of a GRE tunnel, an IP-in-IP tunnel; and/or a GTP tunnel. In an example, a number of sessions associated with at least one established tunnel may indicate how many sessions associated with the at least one established tunnel. For example, a number of sessions associated with at least one established tunnel may comprise a number of L2TP sessions associated with at least one established L2TP tunnel. For example, a number of sessions associated with at least one established tunnel may comprise a number of PDU sessions/PDN connections associated with at least one established L2TP tunnel, established GRE tunnel, established IP-in-IP tunnel and/or established GTP tunnel. In an example, the supported maximum number of sessions associated with the at least one established tunnel may indicate that the at least one established tunnel may only support limited/maximum number of sessions (e.g., L2TP session, PDU session, and/or PDN connection). In an example, the tunnel load condition may indicate a load status of the at least one tunnel. In an example, the tunnel load condition may comprise at least one of: light load, normal load, heavy load, congested. In an example, the tunnel load condition may comprise a load metric, wherein the load metric may indicate a percentage of load (e.g., the current load is 10% of total load). In an example, the tunnel load condition may comprise a congestion level indicating a level of congestion (e.g., light congestion, heavy congestion).

In an example, an NRF may receive a Nnrf_NFManagement_NFUpdate Request message from a UPF, the Nnrf_NFManagement_NFUpdate Request message may comprise a L2TP capability of the UPF and/or established L2TP tunnel information of at least one established L2TP tunnel. In an example, the Nnrf_NFManagement_NFUpdate Request message may comprise NF type of the UPF, the FQDN and/or IP address of the UPF for N4 interface. The L2TP capability of the UPF may indicate the UPF may support L2TP version 2, L2TP version 3, and/or both. The established L2TP tunnel information of the at least one established L2TP tunnel may comprise at least one of: a parameter indicating L2TP tunnel version; an address of an L2TP Access Concentrator (LAC); an address of an L2TP network server (LNS); number of L2TP session associated with the at least one established L2TP tunnel; number of PDU session associated with the at least one established L2TP tunnel; number of PDN connection associated with the at least one established L2TP tunnel; supported maximum number of the L2TP session associated with the at least one established L2TP tunnel; supported maximum number of the PDU session associated with the at least one established L2TP tunnel; and/or supported maximum number of the PDN connection associated with the at least one established L2TP tunnel.

In an example, a second control plane function may receive a session request message from a wireless device. For example, an SMF may receive a PDU session request message from a UE. For example, a UE may send to an AMF a NAS message comprising at least one of: S-NSSAI(s), DNN, PDU Session ID, Request type, or N1 SM container (PDU session establishment request). The UE may initiate a UE requested PDU session establishment procedure by the transmission of a NAS message comprising a PDU session establishment request message within the N1 SM container. The PDU session establishment request message may comprise at least one of: a PDU session ID, Requested PDU Session Type, or a Requested SSC mode, etc. In response to the message received from the UE, the AMF may select an SMF and send to the SMF a message (e.g., a PDU session establishment request, a PDUSession_CreateSMContext Request) comprising at least one of: SUPI, DNN, S-NSSAI(s) and/or network slice instance identifier(s), PDU Session ID, AMF ID, Request Type, PCF identifier, Priority Access, N1 SM container (PDU Session Establishment Request), User location information, Access Type, PEI). As an example, the PCF identifier may be an identifier, or an IP address, or FQDN to identify the PCF.

In response to the message received from the AMF/UE, based on a configuration, the SMF may send a message (e.g., authentication request, authorization request) to a server (e.g., a AAA server, a Diameter server, a RADIUS server, a 3rd party server). In an example, the configuration may be based on user subscription, DNN, and/or a S-NSSAI. For example, based on the S-NSSAI, the SMF is configured to send an authentication request message to an AAA server. The authorization/authorization request message may comprise at least one of: a UE identity (e.g., the SUPI); the DNN; the S-NSSAI; and/or the PDU session identifier. In response to the message received, the AAA may determine a tunnel based on the UE identity (e.g., the SUPI); the DNN; the S-NSSAI; and/or the PDU session identifier. For example, the AAA may determine a tunnel is used for the UE; the DNN; the S-NSSAI; and/or the PDU session. The AAA may send a response message (e.g., authorization/authorization response) to the SMF. The authorization/authorization response may comprise at least one of: UE tunnel information, the UE identity; the DNN; the S-NSSAI; and/or the PDU session identifier. In an example, the UE tunnel information may comprise a tunnel endpoint address (e.g., LNS address, LAC address) for at least one tunnel. In an example, the UE tunnel information may comprise username and/or password information for the at least one tunnel.

In an example, in response to the message received from the AAA server, the first control plane function may receive a second message from a second control plane function. The second message may indicate requesting a UPF support a tunnel. In an example, the second message may comprise at least one of: a tunnel type of a tunnel; a tunnel address of the tunnel; and/or a tunnel indication requesting discovery of a UPF that supports the tunnel. In an example, the tunnel type may indicate a type of the tunnel. The tunnel type may comprise at least one of: an L2TP tunnel version 2; an L2TP tunnel version 3; a GRE tunnel; an IP-in-IP tunnel; and/or a GTP tunnel. In an example, the tunnel address may indicate an address of the tunnel endpoint. For example, the tunnel address may comprise an address of an L2TP Access Concentrator (LAC). For example, the tunnel endpoint address may comprise an address of an L2TP network server (LNS). For example, the tunnel address may comprise an address of tunnel endpoint of a GRE tunnel, an IP-in-IP tunnel; and/or a GTP tunnel.

In an example, the NRF may receive a Nnrf_NFDiscovery_Request message from a session management function (SMF), the Nnrf_NFDiscovery_Request message may indicate requesting selecting a UPF supporting a L2TP tunnel. The Nnrf_NFDiscovery_Request message may comprise at least one of: an L2TP tunnel type (e.g., L2TP version 3), an LNS address, and/or an L2TP Tunnel Indication requesting discovery of a UPF that supports the L2TP tunnel.

In an example, based on the first message and the second message, the first control plane function may determine a UPF for the tunnel. For example, based on the tunnel capability of the at least one UPF, the tunnel type, the tunnel address; and/or the tunnel indication, the first control plane function may determine a UPF for the tunnel. For example, based on the message received from the UPF and/or the message received from the SMF, the NRF may determine a UPF for the tunnel. For example, a UPF may indicate to an NRF that the UPF supports a L2TP tunnel version 2 and/or L2TP tunnel version 3, an SMF may request the NRF to select a UPF which supports a L2TP tunnel, based on above information, the SMF may determine the UPF to support the L2TP tunnel. For example, a UPF 1 may indicate to an NRF that the UPF 1 supports a L2TP tunnel version 2 and/or L2TP tunnel version 3, the UPF 2 may indicate to the UPF that that the UPF 2 supports a L2TP tunnel version 2, and the UPF 2 may indicate that the UPF 2 has an established L2TP tunnel with LNS 2; the SMF may request the NRF to select a UPF which supports a L2TP tunnel and has an established L2TP tunnel with LNS 2, based on above information, the SMF may determine the UPF 2 to support the L2TP tunnel.

In an example, the first control plane function may send an identity of the UPF to the second control function. In an example, the identity of the UPF may comprise an IP address (e.g., IPv4 address, and/or IPv6 prefix). In an example, the identity of the UPF may comprise a fully qualified domain name (FQDN). In an example, the identity of the UPF may comprise a node identity. For example, the NRF may send a UPF identity to the SMF.

In an example, the first control plane function may determine one or more UPFs. In an example, the first control plane function may send one or more identities of one or more UPFs to the second control function. For example, the NRF may determine/select one or more UPFs. For example, the NRF may send a response message (e.g., Nnrf_NFDiscovery_Response) to the SMF. The Nnrf_NFDiscovery_Response message may comprise at least one of: one or more identities of one or more UPFs; the established tunnel information; and/or tunnel load condition of at least one tunnel associated with the one or more UPFs. For example, the at least one tunnel associated with the one or more UPFs may indicate that the at least one tunnel established between the one or more UPFs and tunnel endpoint(s).

In an example, in response to receiving the identity of the UPF, the second control plane function may determine a UPF based on the Nnrf_NFDiscovery_Response message. For example, based on the established tunnel information and/or tunnel load condition of at least one tunnel associated with the one or more UPFs, the SMF may determine/select a UPF. For example, the established tunnel information may indicate UPF 1 has established a tunnel 1 with tunnel endpoint 1, where load of the tunnel 1 is 95%; UPF 2 has established a tunnel 2 with tunnel endpoint 1, where load of the tunnel 2 is 20%. Based on above information, the SMF may determine the UPF 2 and/or tunnel 2 for the UE, the DNN, the S-NSSAI, and/or the PDU session/PDN connection.

In an example, in response to receiving the identity of the UPF and/or in response to determining/selecting the UPF, the second control plane function may send a CP-UP association request message to the UPF. For example, the SMF may send a PFCP association setup request message to the UPF requesting setup a PFCP association, the PFCP association setup request message may comprise one or more information element/parameters as described in FIG. 18. In an example, the UPF may send a response message (e.g., PFCP association setup response) to the second control plane function (e.g., SMF), wherein the PFCP association setup response may comprise one or more information element/parameters as described in FIG. 18. There may be PDU session establishment procedure after the PFCP association setup procedure.

In an example, in response to receiving the identity of the UPF and/or in response to determining/selecting the UPF, the SMF may send a message (e.g., N4 session establishment/modify request, PFCP session establishment/modify request) to the UPF. The N4 session establishment/modify request and/or PFCP session establishment/modify request may comprise at least one of: a tunnel request indication requesting establishing a tunnel; a tunnel type of the tunnel; and/or tunnel information of the tunnel, wherein the tunnel information may comprise an address of a tunnel endpoint (e.g., LNS). In an example, the tunnel information may comprise username and/or password of the tunnel. In an example, the N4 session establishment/modify request and/or PFCP session establishment/modify request may comprise a user plane rule, wherein the user plane rule may comprise at least one of: the tunnel request indication; the tunnel type; and/or the tunnel information. In an example, the user plane rule may comprise at least one of: at least one packet detection rule; at least one forwarding action rule; at least one QoS enforcement rule; and/or at least one usage reporting rule.

In an example, the at least one packet detection rule may comprise at least one of: the tunnel request indication; the tunnel type; and/or the tunnel information. In an example, the at least one forwarding action rule may comprise at least one of: the tunnel request indication; the tunnel type; and/or the tunnel information. In an example, the at least one QoS enforcement rule may comprise at least one of: the tunnel request indication; the tunnel type; and/or the tunnel information. In an example, the at least one usage reporting rule may comprise at least one of: the tunnel request indication; the tunnel type; and/or the tunnel information.

In an example, the at least one packet detection rule may comprise data/traffic packet detection information, e.g., one or more match fields against which incoming packets are matched and may apply other user plane rules (e.g., the at least one forwarding action rule, the at least one QoS enforcement rule, and/or the at least one usage reporting rule) to the data/traffic packets matching the packet detection rule. In an example, the at least one forwarding action rule may comprise an apply action parameter, which may indicate whether a second network function (e.g., user plane function) forwards, duplicates, drops or buffers the data/traffic packet respectively. In an example, the at least one usage reporting rule may be used to measure the network resources usage in terms of traffic data volume, duration (i.e., time) and/or events, according to a measurement method in the at least one usage reporting rule. In an example, the at least one QoS enforcement rule may contain instructions to request the user plane function to perform QoS enforcement of the user plane traffic. In an example, the SMF may determine the at least one packet detection rule based on at least one service data flow detection information (e.g., service data flow template, flow information). In an example, the SMF may determine the at least one forwarding action rule based on at least one policy control rule and/or at least one usage monitoring control rule. In an example, the SMF may determine the at least one QoS enforcement rule based on the at least one policy control rule (e.g., at least one QoS control rule). In an example, the SMF may determine the at least one usage reporting rule based on at least one usage monitoring control rule and/or a quota.

In an example, in response to the message received from the SMF, based on the tunnel request indication; the tunnel type; and/or the tunnel information, the UPF may establish a new tunnel with the tunnel endpoint, the new tunnel is associated with the UE, the DNN, the S-NSSAI and/or the PDU session/PDN connection. In an example, the UPF may reuse an existing/established tunnel (e.g., L2TP tunnel) and may establish a new tunnel session (e.g., L2TP tunnel session) with the tunnel endpoint (e.g., LNS). In an example, the new tunnel session may be associated with the existing/established tunnel. In an example, the new tunnel session may be associated with the UE, the DNN, the S-NSSAI and/or the PDU session/PDN connection. In an example, the UPF may send a response message (e.g., N4 session establishment/modify response and/or PFCP session establishment/modify response) to the SMF. The N4 session establishment/modify response and/or PFCP session establishment/modify response message may indicate the tunnel is established successfully.

In an example, there may be other actions to complete the PDU session establishment. After the PDU session establishment, the UE and the tunnel endpoint may establish connection. For example, the UE may establish PPP connection with the LNS.

Figure 24:
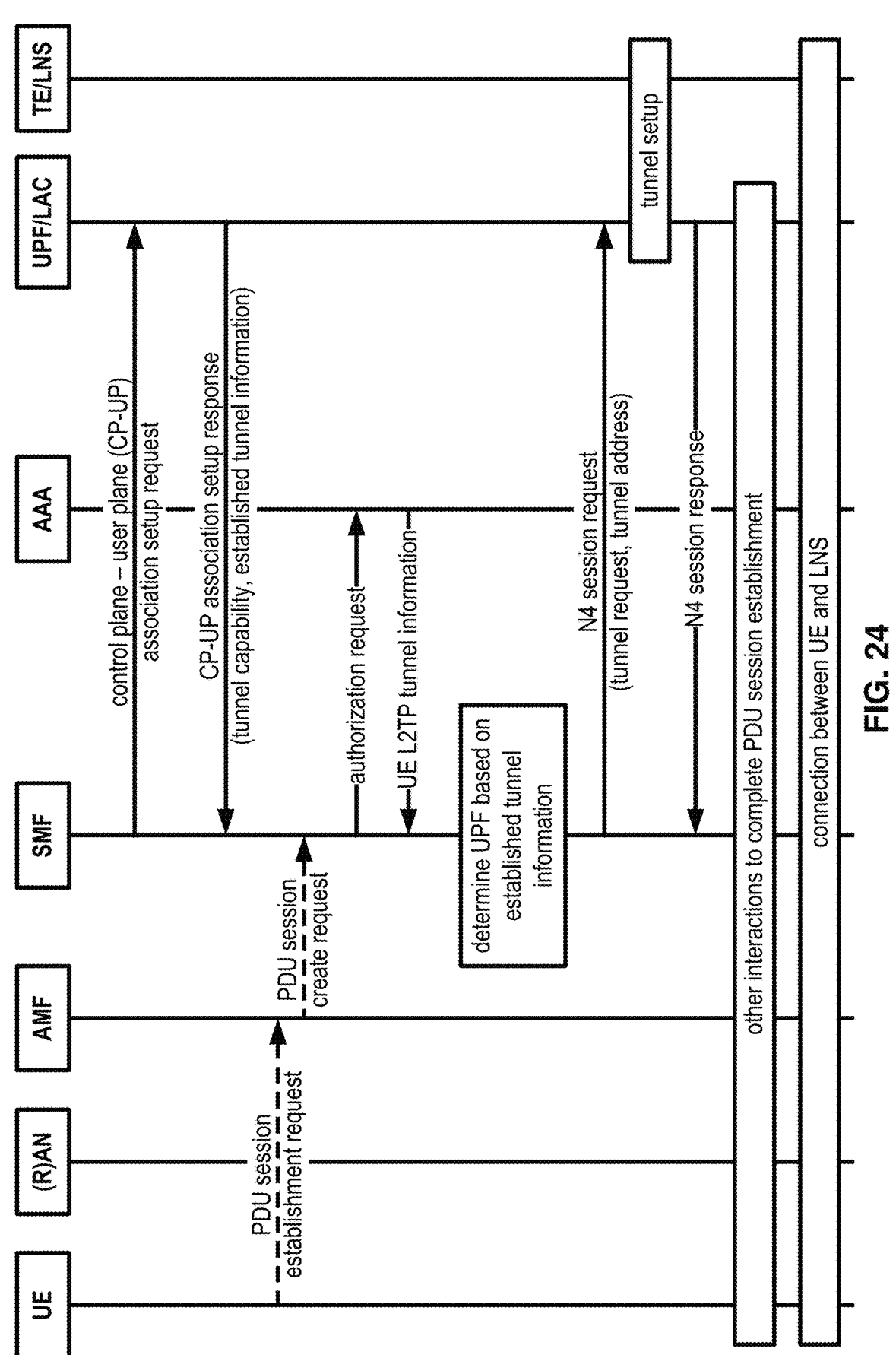
FIG. 24 is an example call flow as per an aspect of an embodiment of the present disclosure.

FIG. 24 is an example call flow which may comprise one or more actions. In an example, a control plane function may send a CP-UP association setup request message to a user plane function requesting setup an association between the control plane function and the user plane function. For example, an SMF may send PFCP Association Setup Request message to a UPF. In response to the message received, the user plane function (e.g., UPF) may send a CP-UP association setup response message (e.g., PFCP Association Setup Response) to the control plane function (e.g., SMF). The CP-UP association setup response message (e.g., PFCP Association Setup Response) may comprise at least one of: established tunnel information of at least one established tunnel in the UPF, and/or a tunnel capability of the UPF. In an example, the tunnel capability of the UPF may comprise at least one of: supporting a L2TP tunnel version 2; supporting a L2TP tunnel version 3; supporting a GRE tunnel; supporting an IP-in-IP tunnel; and/or supporting a GTP tunnel. In an example, the established tunnel information may comprise at least one of: a first parameter indicating a tunnel type; a second parameter indicating a tunnel version; a third parameter indicating a tunnel endpoint address; a fourth parameter indicating number of sessions associated with at least one established tunnel; a fifth parameter indicating supported maximum number of sessions associated with the at least one established tunnel; and/or a sixth parameter indicating a tunnel load condition. In an example, the tunnel type may indicate a type of a tunnel (e.g., an established tunnel). For example, the tunnel type may comprise at least one of: an L2TP tunnel; a GRE tunnel; an IP-in-IP tunnel; and/or a GTP tunnel. In an example, the tunnel version may indicate a version of a tunnel (e.g., an established tunnel). For example, the tunnel version may comprise a L2TP tunnel version (e.g., L2TP version 2, L2TP version 3). In an example, the tunnel endpoint address may indicate an address of the tunnel endpoint. For example, the tunnel endpoint address may comprise an address of an L2TP Access Concentrator (LAC). For example, the tunnel endpoint address may comprise an address of an L2TP network server (LNS). For example, the tunnel endpoint address may comprise an address of tunnel endpoint of a GRE tunnel, an IP-in-IP tunnel; and/or a GTP tunnel. In an example, a number of sessions associated with at least one established tunnel may indicate how many sessions associated with the at least one established tunnel. For example, a number of sessions associated with at least one established tunnel may comprise a number of L2TP sessions associated with at least one established L2TP tunnel. For example, a number of sessions associated with at least one established tunnel may comprise a number of PDU sessions/PDN connections associated with at least one established L2TP tunnel, established GRE tunnel, established IP-in-IP tunnel and/or established GTP tunnel. In an example, the supported maximum number of sessions associated with the at least one established tunnel may indicate that the at least one established tunnel may only support limited/maximum number of sessions (e.g., L2TP session, PDU session, and/or PDN connection). In an example, the tunnel load condition may indicate a load status of the at least one tunnel. In an example, the tunnel load condition may comprise at least one of: light load, normal load, heavy load, congested. In an example, the tunnel load condition may comprise a load metric, wherein the load metric may indicate a percentage of load (e.g., the current load is 10% of total load). In an example, the tunnel load condition may comprise a congestion level indicating a level of congestion (e.g., light congestion, heavy congestion).

In an example, the SMF may establish one or more PFCP associations with one or more UPFs. The SMF may have the established tunnel information of one or more UPFs and/or tunnel capability of the one or more UPF.

In an example, the SMF may receive a PDU session request message from a UE. For example, a UE may send to an AMF a NAS message comprising at least one of: S-NS-SAI(s), DNN, PDU Session ID, Request type, or N1 SM container (PDU session establishment request). The UE may initiate a UE requested PDU session establishment procedure by the transmission of a NAS message comprising a PDU session establishment request message within the N1 SM container. The PDU session establishment request message may comprise at least one of: a PDU session ID, Requested PDU Session Type, or a Requested SSC mode, etc. In response to the message received from the UE, the AMF may select an SMF and send to the SMF a message (e.g., a PDU session establishment request, a PDUSession_CreateSMContext Request) comprising at least one of: SUPI, DNN, S-NSSAI(s) and/or network slice instance identifier(s), PDU Session ID, AMF ID, Request Type, PCF identifier, Priority Access, N1 SM container (PDU Session Establishment Request), User location information, Access Type, PEI). As an example, the PCF identifier may be an identifier, or an IP address, or FQDN to identify the PCF.

In response to the message received from the AMF/UE, based on a configuration, the SMF may send a message (e.g., authentication request, authorization request) to a server (e.g., a AAA server, a Diameter server, a RADIUS server, a 3rd party server). In an example, the configuration may be based on user subscription, DNN, and/or a S-NSSAI. For example, based on the S-NSSAI, the SMF is configured to send an authentication request message to an AAA server. The authorization/authorization request message may comprise at least one of: a UE identity (e.g., the SUPI); the DNN; the S-NSSAI; and/or the PDU session identifier. In response to the message received, the AAA may determine a tunnel based on the UE identity (e.g., the SUPI); the DNN; the S-NSSAI; and/or the PDU session identifier. For example, the AAA may determine a tunnel is used for the UE; the DNN; the S-NSSAI; and/or the PDU session. The AAA may send a response message (e.g., authorization/authorization response) to the SMF. The authorization/authorization response may comprise at least one of: UE tunnel information, the UE identity; the DNN; the S-NSSAI; and/or the PDU session identifier. In an example, the UE tunnel information may comprise a tunnel endpoint address (e.g., LNS address, LAC address) for at least one tunnel. In an example, the UE tunnel information may comprise username and/or password information for the at least one tunnel.

In an example, in response to the message received from the AAA server, the SMF may determine/select a UPF bases on at least one of: the UE tunnel information received from the AAA server, the established tunnel information of one or more UPFs received from the one or more UPFs, and/or tunnel capability of the one or more UPF received from the one or more UPFs. For example, the established tunnel information may indicate UPF 1 has established a L2TP tunnel 1 with LNS 1, where load of the tunnel 1 is 80%; UPF 2 has established a L2TP tunnel 2 with LNS 1, where load of the tunnel 2 is 20%. Based on above information, the SMF may determine the UPF 2 and/or tunnel 2 for the UE, the DNN, the S-NSSAI, and/or the PDU session/PDN connection.

In an example, in response to determining/selecting the UPF, the SMF may send a message (e.g., N4 session establishment/modify request, PFCP session establishment/modify request) to the UPF. The N4 session establishment/modify request and/or PFCP session establishment/modify request may comprise at least one of: a tunnel request indication requesting establishing a tunnel; a tunnel type of the tunnel; and/or tunnel information of the tunnel, wherein the tunnel information may comprise an address of a tunnel endpoint (e.g., LNS). In an example, the tunnel information may comprise username and/or password of the tunnel. In an example, the N4 session establishment/modify request and/or PFCP session establishment/modify request may comprise a user plane rule, wherein the user plane rule may comprise at least one of: the tunnel request indication; the tunnel type; and/or the tunnel information. In an example, the user plane rule may comprise at least one of: at least one packet detection rule; at least one forwarding action rule; at least one QoS enforcement rule; and/or at least one usage reporting rule.

In an example, the at least one packet detection rule may comprise at least one of: the tunnel request indication; the tunnel type; and/or the tunnel information. In an example, the at least one forwarding action rule may comprise at least one of: the tunnel request indication; the tunnel type; and/or the tunnel information. In an example, the at least one QoS enforcement rule may comprise at least one of: the tunnel request indication; the tunnel type; and/or the tunnel information. In an example, the at least one usage reporting rule may comprise at least one of: the tunnel request indication; the tunnel type; and/or the tunnel information.

In an example, in response to the message received from the SMF, based on the tunnel request indication; the tunnel type; and/or the tunnel information, the UPF may establish a new tunnel with the tunnel endpoint, the new tunnel is associated with the UE, the DNN, the S-NSSAI and/or the PDU session/PDN connection. In an example, the UPF may reuse an existing/established tunnel (e.g., L2TP tunnel) and may establish a new tunnel session (e.g., L2TP tunnel session) with the tunnel endpoint (e.g., LNS). In an example, the new tunnel session may be associated with the existing/established tunnel. In an example, the new tunnel session may be associated with the UE, the DNN, the S-NSSAI and/or the PDU session/PDN connection. In an example, the UPF may send a response message (e.g., N4 session establishment/modify response and/or PFCP session establishment/modify response) to the SMF. The N4 session establishment/modify response and/or PFCP session establishment/modify response message may indicate the tunnel is established successfully.

In an example, there may be other actions to complete the PDU session establishment. After the PDU session establishment, the UE and the tunnel endpoint may establish connection. For example, the UE may establish PPP connection with the LNS.

Figure 25:
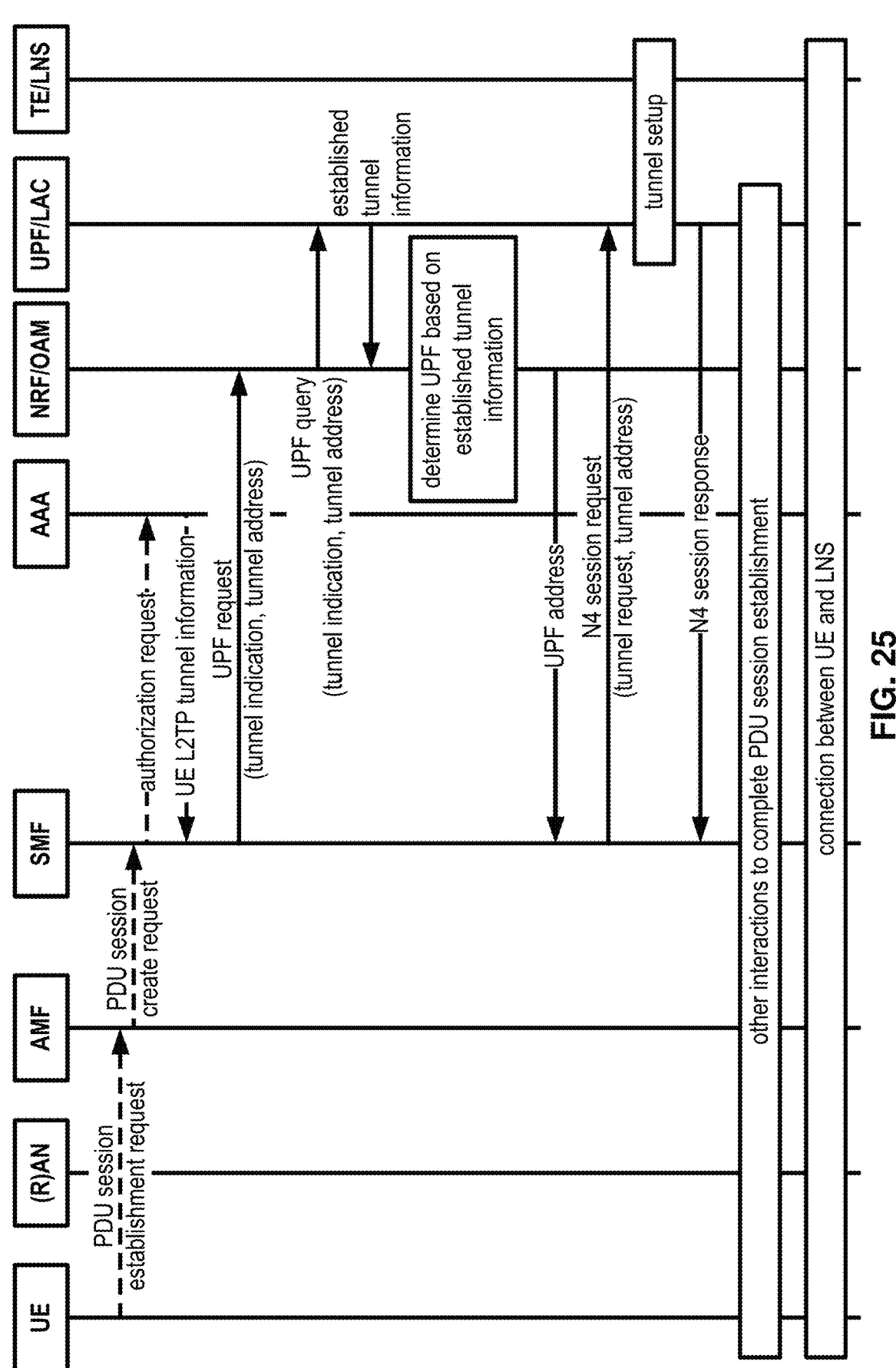
FIG. 25 is an example call flow as per an aspect of an embodiment of the present disclosure.

FIG. 25 is an example call flow which may comprise one or more actions. In an example, a second control plane function (e.g., SMF) may receive a session request message from a wireless device. For example, an SMF may receive a PDU session request message from a UE. For example, a UE may send to an AMF a NAS message comprising at least one of: S-NSSAI(s), DNN, PDU Session ID, Request type, or N1 SM container (PDU session establishment request). The UE may initiate a UE requested PDU session establishment procedure by the transmission of a NAS message comprising a PDU session establishment request message within the N1 SM container. The PDU session establishment request message may comprise at least one of: a PDU session ID, Requested PDU Session Type, or a Requested SSC mode, etc. In response to the message received from the UE, the AMF may select an SMF and send to the SMF a message (e.g., a PDU session establishment request, a PDUSession_CreateSMContext Request) comprising at least one of: SUPI, DNN, S-NSSAI(s) and/or network slice instance identifier(s), PDU Session ID, AMF ID, Request Type, PCF identifier, Priority Access, N1 SM container (PDU Session Establishment Request), User location information, Access Type, PEI). As an example, the PCF identifier may be an identifier, or an IP address, or FQDN to identify the PCF.

In response to the message received from the AMF/UE, based on a configuration, the SMF may send a message (e.g., authentication request, authorization request) to a server (e.g., a AAA server, a Diameter server, a RADIUS server, a 3rd party server). In an example, the configuration may be based on user subscription, DNN, and/or a S-NSSAI. For example, based on the S-NSSAI, the SMF is configured to send an authentication request message to an AAA server. The authorization/authorization request message may comprise at least one of: a UE identity (e.g., the SUPI); the DNN; the S-NSSAI; and/or the PDU session identifier. In response to the message received, the AAA may determine a tunnel based on the UE identity (e.g., the SUPI); the DNN; the S-NSSAI; and/or the PDU session identifier. For example, the AAA may determine a tunnel is used for the UE; the DNN; the S-NSSAI; and/or the PDU session. The AAA may send a response message (e.g., authorization/authorization response) to the SMF. The authorization/authorization response may comprise at least one of: UE tunnel information, the UE identity; the DNN; the S-NSSAI; and/or the PDU session identifier. In an example, the UE tunnel information may comprise a tunnel endpoint address (e.g., LNS address, LAC address) for at least one tunnel. In an example, the UE tunnel information may comprise username and/or password information for the at least one tunnel.

In an example, in response to the message received from the AAA server, a first control plane function (e.g., an NRF; an OAM; an AAA; and/or a UDR) may receive a UPF discovery request message from the second control plane function (e.g., SMF). The UPF discovery request message may indicate requesting a UPF support a tunnel. In an example, the UPF discovery request message may comprise at least one of: a tunnel type of a tunnel; a tunnel address of the tunnel; and/or a tunnel indication requesting discovery of a UPF that supports the tunnel. In an example, the tunnel type may indicate a type of the tunnel. The tunnel type may comprise at least one of: an L2TP tunnel version 2; an L2TP tunnel version 3; a GRE tunnel; an IP-in-IP tunnel; and/or a GTP tunnel. In an example, the tunnel address may indicate an address of the tunnel endpoint. For example, the tunnel address may comprise an address of an L2TP Access Concentrator (LAC). For example, the tunnel endpoint address may comprise an address of an L2TP network server (LNS).

For example, the tunnel address may comprise an address of tunnel endpoint of a GRE tunnel, an IP-in-IP tunnel; and/or a GTP tunnel.

In an example, the NRF may receive a Nnrf_NFDiscovery_Request message from a session management function (SMF), the Nnrf_NFDiscovery_Request message may indicate requesting selecting a UPF supporting a L2TP tunnel. The Nnrf_NFDiscovery_Request message may comprise at least one of: an L2TP tunnel type (e.g., L2TP version 3), an LNS address, and/or an L2TP Tunnel Indication requesting discovery of a UPF that supports the L2TP tunnel.

In response to the message received, the first control plane function (e.g., the NRF) may send a message (e.g., UPF query request, tunnel query request) to at least one UPF. The UPF query request/tunnel query request message may indicate querying tunnel information in the at least one UPF. The UPF query request/tunnel query request message may comprise at least one of: the tunnel type; the tunnel address; and/or the tunnel indication. In response to the message received from the NRF, the at least one UPF may send a reply message (e.g., UPF query response, tunnel query response). In an example, the UPF query response/tunnel query response message may comprise at least one: established tunnel information of at least one established tunnel in the at least one UPF and/or a tunnel capability of the at least one UPF. In an example, the tunnel capability of the at least one UPF may comprise at least one of: supporting a L2TP tunnel version 2; supporting a L2TP tunnel version 3; supporting a GRE tunnel; supporting an IP-in-IP tunnel; and/or supporting a GTP tunnel. In an example, the established tunnel information may comprise at least one of: a first parameter indicating a tunnel type; a second parameter indicating a tunnel version; a third parameter indicating a tunnel endpoint address; a fourth parameter indicating number of sessions associated with at least one established tunnel; a fifth parameter indicating supported maximum number of sessions associated with the at least one established tunnel; and/or a sixth parameter indicating a tunnel load condition. In an example, the tunnel type may indicate a type of a tunnel (e.g., an established tunnel). For example, the tunnel type may comprise at least one of: an L2TP tunnel; a GRE tunnel; an IP-in-IP tunnel; and/or a GTP tunnel. In an example, the tunnel version may indicate a version of a tunnel (e.g., an established tunnel). For example, the tunnel version may comprise a L2TP tunnel version (e.g., L2TP version 2, L2TP version 3). In an example, the tunnel endpoint address may indicate an address of the tunnel endpoint. For example, the tunnel endpoint address may comprise an address of an L2TP Access Concentrator (LAC). For example, the tunnel endpoint address may comprise an address of an L2TP network server (LNS). For example, the tunnel endpoint address may comprise an address of tunnel endpoint of a GRE tunnel, an IP-in-IP tunnel; and/or a GTP tunnel. In an example, a number of sessions associated with at least one established tunnel may indicate how many sessions associated with the at least one established tunnel. For example, a number of sessions associated with at least one established tunnel may comprise a number of L2TP sessions associated with at least one established L2TP tunnel. For example, a number of sessions associated with at least one established tunnel may comprise a number of PDU sessions/PDN connections associated with at least one established L2TP tunnel, established GRE tunnel, established IP-in-IP tunnel and/or established GTP tunnel. In an example, the supported maximum number of sessions associated with the at least one established tunnel may indicate that the at least one established tunnel may only support limited/maximum number of sessions (e.g., L2TP session, PDU session, and/or PDN connection). In an example, the tunnel load condition may indicate a load status of the at least one tunnel. In an example, the tunnel load condition may comprise at least one of: light load, normal load, heavy load, congested. In an example, the tunnel load condition may comprise a load metric, wherein the load metric may indicate a percentage of load (e.g., the current load is 10% of total load). In an example, the tunnel load condition may comprise a congestion level indicating a level of congestion (e.g., light congestion, heavy congestion).

In an example, based on the message received from the first control plane function (e.g., NRF) and/or the message received from the AAA, the first control plane function may determine a UPF for the tunnel. For example, based on the tunnel capability of the at least one UPF, the tunnel type, the tunnel address; and/or the tunnel indication, the first control plane function may determine a UPF for the tunnel. For example, based on the message received from the at least one UPF and/or the message received from the SMF, the NRF may determine a UPF for the tunnel. For example, a UPF may indicate to an NRF that the UPF supports a L2TP tunnel version 2 and/or L2TP tunnel version 3, an SMF may request the NRF to select a UPF which supports a L2TP tunnel, based on above information, the SMF may determine the UPF to support the L2TP tunnel. For example, a UPF 1 may indicate to an NRF that the UPF 1 supports a L2TP tunnel version 2 and/or L2TP tunnel version 3, the UPF 2 may indicate to the UPF that that the UPF 2 supports a L2TP tunnel version 2, and the UPF 2 may indicate that the UPF 2 has an established L2TP tunnel with LNS 2; the SMF may request the NRF to select a UPF which supports a L2TP tunnel and has an established L2TP tunnel with LNS 2, based on above information, the SMF may determine the UPF 2 to support the L2TP tunnel.

In an example, the first control plane function may send an identity of the UPF to the second control function. In an example, the identity of the UPF may comprise an IP address (e.g., IPv4 address, and/or IPv6 prefix). In an example, the identity of the UPF may comprise a fully qualified domain name (FQDN). In an example, the identity of the UPF may comprise a node identity. For example, the NRF may send a UPF identity to the SMF.

In an example, the first control plane function may determine one or more UPFs. In an example, the first control function may send one or more identities of one or more UPFs to the second control function. For example, the NRF may send a response message (e.g., Nnrf_NFDiscovery_Response) to the SMF. The Nnrf_NFDiscovery_Response message may comprise at least one of: one or more identities of one or more UPFs; the established tunnel information; and/or tunnel load condition of at least one tunnel associated with the one or more UPFs. For example, the at least one tunnel associated with the one or more UPFs may indicate that the at least one tunnel established between the one or more UPFs and tunnel endpoint(s).

In an example, in response to receiving the identity of the UPF, the second control plane function may determine a UPF based on the Nnrf_NFDiscovery_Response message. For example, based on the established tunnel information and/or tunnel load condition of at least one tunnel associated with the one or more UPFs, the SMF may determine/select a UPF. For example, the established tunnel information may indicate UPF 1 has established a tunnel 1 with tunnel endpoint 1, where load of the tunnel 1 is 95%; UPF 2 has established a tunnel 2 with tunnel endpoint 1, where load of the tunnel 2 is 20%. Based on above information, the SMF may determine the UPF 2 and/or tunnel 2 for the UE, the DNN, the S-NSSAI, and/or the PDU session/PDN connection.

In an example, in response to receiving the identity of the UPF and/or in response to determining/selecting the UPF, the second control plane function may send a CP-UP association request message to the UPF. For example, the SMF may send a PFCP association setup request message to the UPF requesting setup a PFCP association, the PFCP association setup request message may comprise one or more information element/parameters as described in FIG. 18. In an example, the UPF may send a response message (e.g., PFCP association setup response) to the second control plane function (e.g., SMF), wherein the PFCP association setup response may comprise one or more information element/parameters as described in FIG. 18. There may be PDU session establishment procedure after the PFCP association setup procedure.

In an example, in response to receiving the identity of the UPF and/or in response to determining/selecting the UPF, the SMF may send a message (e.g., N4 session establishment/modify request, PFCP session establishment/modify request) to the UPF. The N4 session establishment/modify request and/or PFCP session establishment/modify request may comprise at least one of: a tunnel request indication requesting establishing a tunnel; a tunnel type of the tunnel; and/or tunnel information of the tunnel, wherein the tunnel information may comprise an address of a tunnel endpoint (e.g., LNS). In an example, the tunnel information may comprise username and/or password of the tunnel. In an example, the N4 session establishment/modify request and/or PFCP session establishment/modify request may comprise a user plane rule, wherein the user plane rule may comprise at least one of: the tunnel request indication; the tunnel type; and/or the tunnel information. In an example, the user plane rule may comprise at least one of: at least one packet detection rule; at least one forwarding action rule; at least one QoS enforcement rule; and/or at least one usage reporting rule.

In an example, the at least one packet detection rule may comprise at least one of: the tunnel request indication; the tunnel type; and/or the tunnel information. In an example, the at least one forwarding action rule may comprise at least one of: the tunnel request indication; the tunnel type; and/or the tunnel information. In an example, the at least one QoS enforcement rule may comprise at least one of: the tunnel request indication; the tunnel type; and/or the tunnel information. In an example, the at least one usage reporting rule may comprise at least one of: the tunnel request indication; the tunnel type; and/or the tunnel information.

In an example, in response to the message received from the SMF, based on the tunnel request indication; the tunnel type; and/or the tunnel information, the UPF may establish a new tunnel with the tunnel endpoint, the new tunnel is associated with the UE, the DNN, the S-NSSAI and/or the PDU session/PDN connection. In an example, the UPF may reuse an existing/established tunnel (e.g., L2TP tunnel) and may establish a new tunnel session (e.g., L2TP tunnel session) with the tunnel endpoint (e.g., LNS). In an example, the new tunnel session may be associated with the existing/established tunnel. In an example, the new tunnel session may be associated with the UE, the DNN, the S-NSSAI and/or the PDU session/PDN connection. In an example, the UPF may send a response message (e.g., N4 session establishment/modify response and/or PFCP session establishment/modify response) to the SMF. The N4 session establishment/modify response and/or PFCP session establishment/modify response message may indicate the tunnel is established successfully.

In an example, there may be other actions to complete the PDU session establishment. After the PDU session establishment, the UE and the tunnel endpoint may establish connection. For example, the UE may establish PPP connection with the LNS.

In an example, a first control plane function may receive from at least one user plane function (UPF), a first message comprising a tunnel capability of the at least one UPF. In an example, the first control plane function may receive from a second control plane function, a second message comprising a tunnel address of a tunnel and/or a tunnel indication requesting discovery of a UPF that supports the tunnel. In an example, based on the first message and the second message, the first control plane function may determine a UPF for the tunnel. In an example, the first control plane function may send an identity of the UPF to the second control function.

In an example embodiment, the first control function may comprise at least one of: an NRF; an OAM; a AAA; and/or a UDR. In an example embodiment, the tunnel capability may comprise at least one of: supporting a L2TP tunnel version 2; supporting a L2TP tunnel version 3; supporting a GRE tunnel; supporting an IP-in-IP tunnel; and/or supporting a GTP tunnel. In an example embodiment, the first message may further comprise established tunnel information of at least one established tunnel. In an example embodiment, the established tunnel information comprises at least one of: a first parameter indicating a tunnel type; a second parameter indicating a tunnel version; a third parameter indicating a tunnel endpoint address; a fourth parameter indicating number of sessions associated with at least one established tunnel; a fifth parameter indicating supported maximum number of the sessions associated with the at least one established tunnel; and/or a sixth parameter indicating a tunnel load status. In an example embodiment, the second message further comprises a tunnel type, wherein the tunnel type comprises at least one of: supporting a L2TP tunnel version 2; supporting a L2TP tunnel version 3; supporting a GRE tunnel; supporting an IP-in-IP tunnel; and/or supporting a GTP tunnel. In an example embodiment, the tunnel address may indicate a tunnel endpoint address, the tunnel endpoint address may comprise at least one of: a L2TP LAC address; a L2TP LNS address; a tunnel destination address of a GRE tunnel; a tunnel destination address of an IP-in-IP tunnel; and/or a tunnel destination address of an GTP tunnel.

In an example embodiment, the identity of the UPF may comprise an IP address. In an example embodiment, the identity of the UPF may comprise a fully qualified domain name (FQDN). In an example embodiment, the identity of the UPF may comprise a node identity. In an example embodiment, the CPF may send a CP-UP association setup request message to the UPF. In an example embodiment, the CPF may receive a CP-UP association setup response message from the UPF. In an example embodiment, the CPF may send a N4 session request message to the UPF. The N4 session request message may comprise at least one of: a tunnel request indication indicating requesting a tunnel; a tunnel type indicating the type of the tunnel; and/or tunnel information of the tunnel. In an example embodiment, the tunnel type may comprise at least one of: a L2TP tunnel version 2; a L2TP tunnel version 3; a GRE tunnel; an IP-in-IP tunnel; and/or a GTP tunnel. In an example embodiment, the tunnel information of the tunnel may comprise at least one of: a L2TP LAC address; a L2TP LNS address; a tunnel destination address of a GRE tunnel; a tunnel destination address of an IP-in-IP tunnel; and/or a tunnel destination address of an GTP tunnel. In an example embodiment, the CPF may receive a N4 session response message from the UPF. In an example embodiment, the determining may be based on the tunnel capability of the at least one UPF. In an example embodiment, the determining may be based on the tunnel capability of the at least one UPF. In an example embodiment, the determining may be based on the tunnel indication. In an example embodiment, the determining may be based on the tunnel address. In an example embodiment, the second message may further comprise a tunnel type of the tunnel.

In an example, a network function may receive from at least one user plane function (UPF), a first message comprising: a layer two tunneling protocol (L2TP) capability of the at least one UPF; and/or established L2TP tunnel information of at least one established L2TP tunnel. In an example, the network function may receive from a session management function (SMF), a second message requesting selecting a UPF supporting a L2TP tunnel, the second message may comprise: an L2TP Tunnel Indication; and/or an LNS address. In an example, based on the first message and the second message, the network function may determine a UPF for the L2TP tunnel. In an example, the network function may send an identity of the UPF to the SMF.

In an example embodiment, the network function may comprise at least one: an NRF; an OAM; an AAA; and/or a UDR. In an example embodiment, the L2TP capability of the at least one UPF comprises at least one: a first parameter indicating the at least one UPF support L2TP version 2; and/or a second parameter indicating the at least one UPF support L2TP version 3. In an example embodiment, the established L2TP tunnel information of the at least one established L2TP tunnel may comprises at least one of: a parameter indicating L2TP tunnel version; an address of an L2TP Access Concentrator (LAC); an address of an L2TP network server (LNS); number of established L2TP session associated with the at least one established L2TP tunnel; number of PDU session associated with the at least one established L2TP tunnel; number of PDN connection associated with the at least one established L2TP tunnel; supported maximum number of the L2TP session associated with the at least one established L2TP tunnel; supported maximum number of the PDU session associated with the at least one established L2TP tunnel; and/or supported maximum number of the PDN session associated with the at least one established L2TP tunnel.

In an example embodiment, the L2TP Tunnel Indication may indicate requesting the UPF supporting a L2TP tunnel. In an example embodiment, the LNS address may indicate the address of the LNS for a L2TP tunnel. In an example embodiment, the identity of the UPF may comprise an IP address of the UPF. In an example embodiment, the identity of the UPF may comprise a fully qualified domain name (FQDN) of the UPF. In an example embodiment, the identity of the UPF may comprise an identifier of the UPF.

In an example, a user plane function (UPF) may receive a first message from a control plane function (CPF). The first message may comprise a tunnel request indication requesting establishing a tunnel; a tunnel type; and/or tunnel information for the tunnel, wherein the tunnel information may comprise an address of a tunnel endpoint. In an example, the UPF may send a second message to a network function. The second message may comprise a tunnel capability indication indicating a tunnel capability of the UPF; and/or established tunnel information of at least one established tunnel. In an example, based on the tunnel information, the UPF may establish the tunnel to the tunnel endpoint. In an example embodiment, the first message may comprise a second parameter requesting releasing a tunnel.

In an example, a session management function (SMF) may receive from a wireless device, a protocol data unit (PDU) session establishment request comprising: a UE identity; a DNN; an S-NSSAI; and/or a PDU session identifier. In an example, the SMF may send an authentication request message to an AAA server, the authentication request message may comprise: the UE identity; the DNN; the S-NSSAI; and/or the PDU session identifier. In an example, the SMF may receive from the AAA server, an authentication response comprising UE tunnel information, wherein the UE tunnel information may comprise a tunnel address. In an example, the SMF may send a first message to an NRF. The first message may request selecting a UPF supporting a tunnel. The first message may comprise: a tunnel indication; and/or the tunnel address. In an example, the SMF may receive from the NRF, a response message comprising: one or more identities of one or more UPFs; established tunnel information; and/or tunnel load condition of at least one tunnel associated with the one or more UPFs. In an example, based on the response message, the SMF may determine a UPF. In an example, the SMF may send to the UPF, a user plane message comprising: a tunnel request indication requesting establishing a tunnel; a tunnel type; and/or tunnel information for the tunnel, wherein the tunnel information may comprise an address of a tunnel endpoint.

In an example, a session management function (SMF) may receive a first message from at least one user plane function. The first message may comprise: one or more identities of the at least one UPF; established tunnel information of at least one tunnel in the at least one UPF; and/or tunnel load condition of the at least one tunnel associated with the at least one UPF. In an example, the SMF may receive from a wireless device, a protocol data unit (PDU) session establishment request comprising: a UE identity; a DNN; an S-NSSAI; and/or a PDU session identifier. In an example, the SMF may send to a AAA server, an authentication request message comprising: the UE identity; the DNN; the S-NSSAI; and/or the PDU session identifier. In an example, the SMF may receive from the AAA server, an authentication response comprising UE tunnel information, wherein the UE tunnel information may comprise a tunnel address. In an example, the SMF may determine a UPF based on at least one of: the first message; and/or the authentication response. In an example, the SMF may send to the UPF, a user plane message comprising: a tunnel request indication requesting establishing a tunnel; a tunnel type; and/or tunnel information for the tunnel, wherein the tunnel information comprises an address of a tunnel endpoint.

The invention claimed is:

1. A method comprising:
   receiving, by a network repository function (NRF) from a session management function (SMF), a discovery request for at least one user plane function (UPF) that supports a layer 2 tunneling protocol (L2TP) tunnel;
   determining, by the NRF and in response to the discovery request, a first UPF that supports the L2TP tunnel; and
   transmitting, by the NRF to the SMF, a discovery response comprising an identity of the first UPF that supports the L2TP tunnel.

2. The method of claim 1, wherein the L2TP tunnel comprises at least one of:
   a generic routing encapsulation (GRE) tunnel; or
   an IP-in-IP tunnel.

3. The method of claim 1, wherein the discovery request comprises one or more of a tunnel type or a tunnel address.

4. The method of claim 3, wherein the tunnel type comprises at least one of:

a L2TP tunnel version 2;

a L2TP tunnel version 3;

a generic routing encapsulation (GRE) tunnel;

an IP-in-IP tunnel; or a GPRS tunnelling protocol (GTP) tunnel.

5. The method of claim 3, wherein the tunnel address comprises a tunnel endpoint address.

6. The method of claim 5, wherein the tunnel endpoint address comprises at least one of:

a L2TP access concentrator (LAC) address;

a L2TP network server (LNS) address;

a tunnel destination address of a generic routing encapsulation (GRE) tunnel;

a tunnel destination address of an IP-in-IP tunnel; or a tunnel destination address of a GPRS tunnelling protocol (GTP) tunnel.

7. The method of claim 1, wherein the discovery request for the at least one UPF comprises a tunnel indication requesting discovery of the at least one UPF that supports the L2TP tunnel.

8. A network repository function (NRF) comprising:

one or more processors; and memory storing instructions that, when executed by the one or more processors, cause the NRF to:

receive, from a session management function (SMF), a discovery request for at least one user plane function (UPF) that supports a layer 2 tunneling protocol (L2TP) tunnel;

determine, in response to the discovery request, a first UPF that supports the L2TP tunnel; and transmit, to the SMF, a discovery response comprising an identity of the first UPF that supports the L2TP tunnel.

9. The NRF of claim 8, wherein the L2TP tunnel comprises at least one of:

a generic routing encapsulation (GRE) tunnel; or an IP-in-IP tunnel.

10. The NRF of claim 8, wherein the discovery request comprises one or more of a tunnel type or a tunnel address.

11. The NRF of claim 10, wherein the tunnel type comprises at least one of:

a L2TP tunnel version 2;

a L2TP tunnel version 3;

a generic routing encapsulation (GRE) tunnel;

an IP-in-IP tunnel; or a GPRS tunnelling protocol (GTP) tunnel.

12. The NRF of claim 10, wherein the tunnel address comprises a tunnel endpoint address.

13. The NRF of claim 12, wherein the tunnel endpoint address comprises at least one of:

a L2TP access concentrator (LAC) address;

a L2TP network server (LNS) address;

a tunnel destination address of a generic routing encapsulation (GRE) tunnel;

a tunnel destination address of an IP-in-IP tunnel; or a tunnel destination address of a GPRS tunnelling protocol (GTP) tunnel.

14. The NRF of claim 8, wherein the discovery request for the at least one UPF comprises a tunnel indication requesting discovery of the at least one UPF that supports the L2TP tunnel.

15. A non-transitory computer-readable storage medium comprising instructions that, when executed by a processor, cause a network repository function (NRF) to:

receive, from a session management function (SMF), a discovery request for at least one user plane function (UPF) that supports a layer 2 tunneling protocol (L2TP) tunnel;

determine, in response to the discovery request, a first UPF that supports the L2TP tunnel; and transmit, to the SMF, a discovery response comprising an identity of the first UPF that supports the L2TP tunnel.

16. The non-transitory computer-readable storage medium of claim 15, wherein the L2TP tunnel comprises at least one of:

a generic routing encapsulation (GRE) tunnel; or an IP-in-IP tunnel.

17. The non-transitory computer-readable storage medium of claim 15, wherein the discovery request comprises one or more of a tunnel type or a tunnel address.

18. The non-transitory computer-readable storage medium of claim 17, wherein the tunnel type comprises at least one of:

a L2TP tunnel version 2;

a L2TP tunnel version 3;

a generic routing encapsulation (GRE) tunnel;

an IP-in-IP tunnel; or a GPRS tunnelling protocol (GTP) tunnel.

19. The non-transitory computer-readable storage medium of claim 17, wherein the tunnel address comprises a tunnel endpoint address.

20. The non-transitory computer-readable storage medium of claim 19, wherein the tunnel endpoint address comprises at least one of:

a L2TP access concentrator (LAC) address;

a L2TP network server (LNS) address;

a tunnel destination address of a generic routing encapsulation (GRE) tunnel;

a tunnel destination address of an IP-in-IP tunnel; or a tunnel destination address of a GPRS tunnelling protocol (GTP) tunnel.

* * * * *